United States Patent
Batori et al.

(10) Patent No.: US 7,127,324 B2
(45) Date of Patent: Oct. 24, 2006

(54) INFORMATION PROCESSING APPARATUS AND INFORMATION PROCESSING METHOD

(75) Inventors: Yoshiyuki Batori, Shizuoka (JP); Ryozo Yanagisawa, Shizuoka (JP); Kazuma Shimizu, Ibaraki (JP); Yoshikazu Sasago, Shizuoka (JP); Masanari Morioka, Shizuoka (JP); Hiroshi Takarada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/079,441

(22) Filed: Feb. 19, 2002

(65) Prior Publication Data

US 2002/0118187 A1    Aug. 29, 2002

(30) Foreign Application Priority Data

Feb. 20, 2001    (JP)    ............ 2001-044145
Jun. 15, 2001    (JP)    ............ 2001-182346
Feb. 14, 2002    (JP)    ............ 2002-037035

(51) Int. Cl.
G06T 17/00    (2006.01)
G06F 17/10    (2006.01)

(52) U.S. Cl. .............. 700/182; 700/181; 345/420; 345/427

(58) Field of Classification Search .......... 700/182, 700/181; 345/420, 427
See application file for complete search history.

(56) References Cited

U.S. PATENT DOCUMENTS 5,945,995 A        8/1999 Higuchi et al.
5,999,185 A *    12/1999 Kato et al. .............. 345/420
2001/0033281 A1 * 10/2001 Yoshida et al. .......... 345/420

FOREIGN PATENT DOCUMENTS

EP    0 306 989 A2    3/1989
JP    8-77386          3/1996
JP    8-314985        11/1996
JP    2000-3379        1/2000

OTHER PUBLICATIONS

"AutoCAD 2000—3D Modeling, A Visual Approach"—John Wilson, AUTODESK Press—Thomson Learning USA, XP002254455, Sep. 1999.*
"AutoCAD 2000: The Complete Reference" David Cohn—McGraw Hill, New York XP002244456, Sep. 1999.*
Dec. 26, 2003 Korean Office Action.
Wilson, John "AutoCAD 2000-3D Modeling , A Visual Approach" 2000, Autodesk Press-Thomson Learning, USA XP00225445.
Cohn S. David. "AutoCAD 2000: The Complete Reference" 2000, McGraw-Hill; New York XP002254456.

(Continued)

Primary Examiner—Michael D. Masinick
(74) Attorney, Agent, or Firm—Morgan & Finnegan, LLP

(57) ABSTRACT

Provided are an information processing apparatus and a method, and in particular, an information processing apparatus and a method for employing a 3D model generated using 3D-CAD.

When attribution information (a distance, an angle, the diameter of a hole, a dimensional tolerance, etc.) is added to a 3D model, as the amount of additional information is increased, it becomes difficult for the geometry of a 3D model and the attribution information to be seen on a display screen.

The visual direction (the attribution allocation plane) is set for a generated 3D model, and attribution information is entered that is to be positioned on an attribution allocation plane. By designating the attribution allocation plane, the designated attribution information, together with the geometry of the 3D model, is displayed on the screen.

6 Claims, 47 Drawing Sheets

OTHER PUBLICATIONS

European Search Report, dated Sep. 16, 2003.
English Abstract of JP 8-77386 (Item A).
Office Action dated Oct. 12, 2004 issued in counterpart Chinese Patent Application No. 02124565.7.

Translation of Office Action issued in counterpart Chinese Application No. 02124565.7 (Item BB).

* cited by examiner

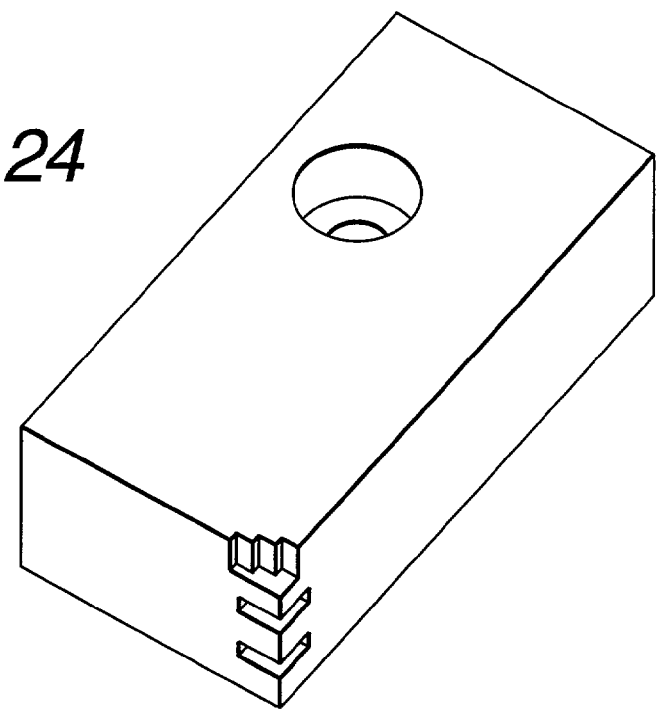
FIG. 24
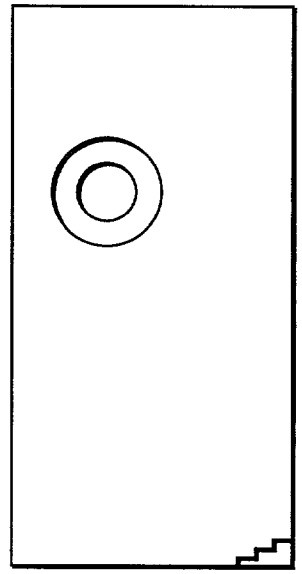
PLANE VIEW
SIDE VIEW
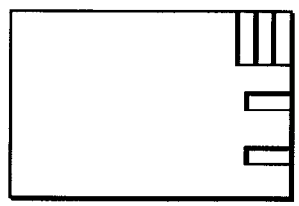
FRONT VIEW
FIG. 25

| PLANE VIEW | FRONT VIEW | SIDE VIEW |

FIG. 52

- ☐ THE VIEW ON CURRENT DISPLAY
- ☐ VIEW A
- ☐ VIEW B
- ☐ VIEW C
- ☐ VIEW D

FIG. 53

- ☐ THE ATTRIBUTION ALLOCATION PLANE ON CURRENT ACTIVATION
- ☐ ATTRIBUTION ALLOCATION PLANE A
- ☐ ATTRIBUTION ALLOCATION PLANE B

INFORMATION PROCESSING APPARATUS AND INFORMATION PROCESSING METHOD

BACKGROUND OF THE INVENTION

1. Field of the Invention

The present invention relates to an information processing apparatus and a method therefor, and in particular to an information processing apparatus for using a 3D model (computer aided geometry model in 3D) generated by using 3D-CAD, and a method therefor.

2. Related Background Art

Conventionally, a CAD apparatus (especially, a 3D-CAD apparatus) is employed to design objects (hereinafter simply referred to as parts) having a three-dimensional shape, such as parts for goods or products. Further, based on this design, metal molds for manufacturing parts are generated.

Before using the design information prepared by the CAD apparatus, attribution information, such as dimensions, dimensional tolerances, geometric tolerances, annotations and symbols, are entered for a 3D model (3D geometry).

In order to enter this attribution information for the 3D model, planes, ridge lines, center lines and vertexes of the 3D model are selected. For example, attribution information shown in FIG. 26 is entered for a 3D model shown in FIG. 24 (the front view, the plan view and the side view of this 3D model are shown in FIG. 25). The attribution information includes:

- distances (lengths, widths and thicknesses), angles, hole diameters, radii, chamfering dimensions, and dimensional tolerances accompanied by dimensions;
- geometric tolerances and dimensional tolerances to be added to planes and ridge lines, without dimensions being entered;
- annotations to be transmitted or instructed for machining or manufacturing parts, units and products; and
- symbols that are determined in advance as a premise for representing, for example, surface roughness.

For adding attribution information to a 3D model, roughly two methods, as follow, are employed.

(1) Method for adding dimensions, dimensional tolerances, geometric tolerances, annotations and symbols Dimension lines and projection lines are required for the entry of dimensions and dimensional tolerances.

Leader lines are required for the entry of geometric tolerances, annotations and symbols.

(2) Method for adding dimensional tolerances, geometric tolerances, annotations and symbols without dimensions being provided.

Dimension lines and projection lines are not required.

Leader lines are required for the entry of dimensional tolerances, geometric tolerances, annotations and symbols.

Further, a metal mold is produced by using a 3D model. In this case, an examination must be performed to determine whether a metal mold and a product for which the metal mold is used are obtained as designed.

The following problem has arisen with the conventional method for adding attribution information to the 3D model.

In case (1) described above, a dimension and a dimensional tolerance, and a dimension line and a projection line used to enter the dimension and the dimensional tolerance, become complicated, and it is difficult to see the geometry of a 3D model and the attribution information.

If, as is shown in FIG. 24, the 3D model has a comparatively simple shape and there are only several tens of attribution information sets, they can somehow be identified. However, since several hundreds or thousands, as needed, of attribution information sets are provided for a 3D model having a complicated or large shape, the reading of attribution information is extremely difficult because "attribution information sets are overlapped", "attribution information is overlapped with the dimension line, the projection line or the leader line", or "the position of the dimension line, the projection line or the leader line is not easily apprehended". It is rather difficult to see even the step-shaped corner shown in FIG. 26.

In the above case, since it is difficult for an operator to see attribution information that is input, the operator can not confirm the contents of input information, i.e., the input of attribution information becomes difficult.

In addition, the reading of associated attribution information is also extremely difficult. Further, since the space occupied by attribution information is increased for a 3D model, the geometry of the 3D model and the attribution information can not be seen at the same time on a display screen having a limited size.

Furthermore, for the attribution information (e.g., the depth of a 12±0.1 counter bore in FIG. 24) that is to be designated in the cross-sectional view, for example, the location whereat the attribution information is provided for the 3D model does not appear and is hard to be understood.

In case (2), since the leader line is employed while the dimension line and the projection line are not required, as in case (1), the leader lines are complicated and it is difficult to see the geometry of the 3D model and the attribution information. Further, since several hundreds to several thousands, as needed, of attribution information sets are provided for a 3D model having a complicated or large shape, the reading of attribution information is extremely difficult.

In addition, the measurement of dimensions is required in the process for examining a manufactured metal mold and a product obtained using the metal mold. Therefore, the operation using the measurement function for 3D geometry is required in order to read the dimensional values.

In this case, a portion that is used as a reference dimension must be selected to read a desired plane or ridge line. In order to read the dimensions of a plurality of portions, many operations and a long processing time are required. Further, erroneous readings due to mistakes can not be avoided. Furthermore, an extremely large amount of labor is required to read the dimensions of all the portions.

Originally, a 3D model and attribution information are data for the machining or manufacture of parts, units and products, and must be transmitted efficiently and accurately by a data input operator, i.e., a designer, to a recipient operator, i.e., a machining, production or inspection engineer, so that the data can be easily understood. The conventional technique does not satisfy these requests, and is not industrially effective.

It is, therefore, one object of the present invention to add attribution information to 3D data generated by a CAD apparatus, so that the information can be transmitted efficiently and accurately and can therefore be easily understood. It is another object of the invention to add attributions to data to improve the operation.

It is an additional object of the invention to efficiently employ an attribution that is added.

It is a further objective of the invention to efficiently produce parts by utilizing data created by a CAD apparatus.

It is a still further object of the present invention to efficiently perform an inspection process by using data created by a CAD apparatus.

SUMMARY OF THE INVENTION

Accordingly, one object of the present invention is to provide an information processing apparatus comprising:

visual line setting means for setting an arbitrary visual direction for a 3D model;

attribution input means for entering attribution information so as to position the attribution information in the arbitrary visual direction set by the setting means; and storage means for storing the arbitrary visual direction and the attribution information in correlation with each other.

Another object of the present invention is to provide an information processing method comprising:

a visual line setting step of setting an arbitrary visual direction for a 3D model;

an attribution input step of entering attribution information so as to position the attribution information in the arbitrary visual direction set at the setting step; and a storage step of storing the arbitrary visual direction and the attribution information in correlation with each other.

A further object of the present invention is to provide an information processing apparatus comprising:

attribution input means for entering attribution information for a 3D model;

attribution allocation plane setting means for setting a virtual plane with which the attribution information is correlated; and storage means for storing the virtual plane and the attribution information in correlation with each other.

Yet another object of the present invention is to provide an information processing method comprising:

an attribution input step of entering attribution information for a 3D model;

an attribution allocation plane setting step of setting a virtual plane with which the attribution information is correlated; and a storage step of storing the virtual plane and the attribution information in correlation with each other.

Other features and advantages of the present invention will become apparent during the course of the following description given in conjunction with the accompanying drawings, throughout which the reference characters provided for the figures thereof designate the same or similar parts.

BRIEF DESCRIPTION OF THE DRAWINGS

FIG. 24 is a diagram showing an example 3D model;

FIG. 25 is a front view, a plan view and a side view of the 3D model in FIG. 24;

FIG. 52 is a diagram showing a menu prepared to automatically correlate generated attribution information with a view that is set in advance; and FIG. 53 is a diagram showing a menu prepared to automatically correlate generated attribution information with an attribution allocation plane that is set in advance.

DETAILED DESCRIPTION OF THE PREFERRED EMBODIMENTS

One embodiment of the present invention will now be described in detail while referring to the accompanying drawings.

General Processing for Metal Mold Production

Figure 1:
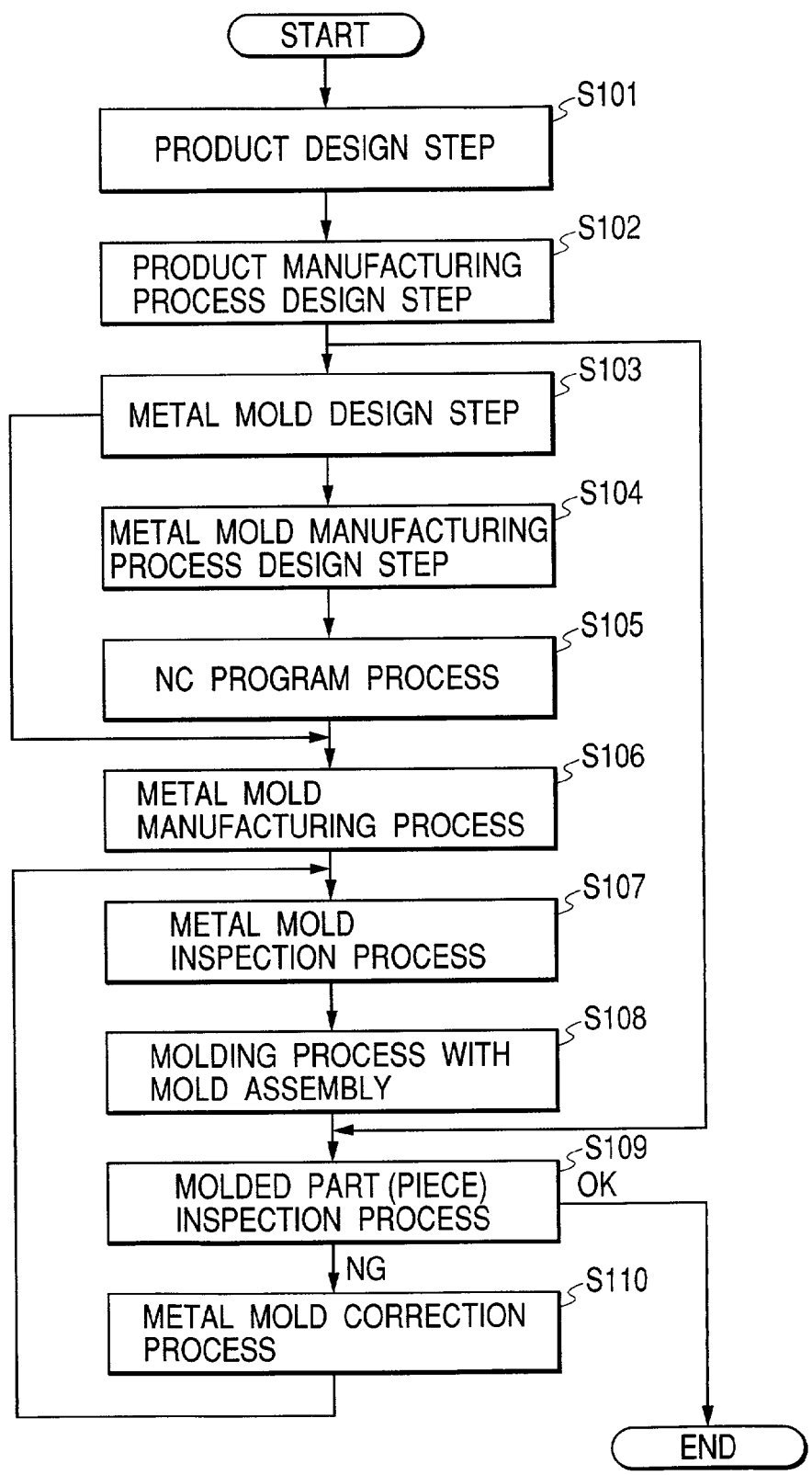
FIG. 1 is a flowchart showing the general processing for molded metal part mold production.

FIG. 1 is a flowchart showing the general processing performed when the present invention is applied for the production of a metal mold for molded parts.

In FIG. 1, at step S101 a product is designed and design drawings for individual parts are prepared. The design drawings of the parts include required information for the production of parts and limitations. The design drawings of the parts are generated by a Computer Aided Design in 2 Dimension (2D-CAD) or a Computer Aided Design in 3 Dimension (3D-CAD) system, and the drawing (3D drawing) generated by the 3D-CAD system includes attribution information such as geometric and dimensional tolerances. The dimensional tolerances can be correlated with the geometry (a plane, a ridge line, a point), and is used to instruct the inspection of a product and to instruct metal mold accuracy.

At step S102, the manufacturing, such as the assembly or the molding of a product, is studied, and a process drawing is generated for each part. The process drawing for a part includes detailed inspection instructions in addition to information required for parts manufacture. A 2D-CAD or a 3D-CAD system is employed to generate the process drawing for the part.

Example inspection instructions are:

numbering of items to be measured (dimensions or dimensional tolerances); and an instruction for a measurement point or a measurement method for an item to be measured.

At step S103, a metal mold is designed based on the process drawing (a step drawing and a metal mold specification) for the part prepared at step S102, and a metal mold drawing is generated. The metal mold drawing includes information required for metal mold manufacture and a restriction condition. The metal mold drawing is generated by a 2D-CAD or a 3D-CAD system, and the metal mold drawing (3D drawing) generated by the 3D-CAD system includes attribution information, such as dimensions and dimensional tolerances.

At step S104 the process for the manufacture of the metal mold is studied based on the metal mold drawing generated at step S103, and a metal mold process drawing is generated. The metal mold manufacturing process includes NC machining and general machining. For the steps of the NC manufacturing (automatic machining using numerical control), an instruction for generating an NC program is issued. For the general machining (manual machining), an instruction for performing the general machining is issued.

At step S105, an NC program is generated based on the metal mold drawing.

At step S106, a machine is used to manufacture a metal mold part.

At step S107, the obtained metal mold part is inspected based on the information generated at step S103.

At step S108, metal mold parts are assembled>to form a mold.

At step S109, a part obtained by molding is inspected based on the information generated at steps S101 and S102. If the inspection results satisfy a predetermined reference level (OK), the processing for producing a metal mold for a molded part is thereafter terminated.

When the inspection results do not satisfy the predetermined level, at step S110, based on the inspection results at step S109, a metal mold is corrected for which the accuracy of the molded product is insufficient.

Product Design

An explanation will now be given for the design of a product and the generation of a design drawing for each part. The design drawing for the part is generated using a 2D-CAD or a 3D-CAD system.

First, the design of a part will be explained by using an information processing apparatus illustrated in FIG. 2, e.g., a CAD apparatus.

Figure 2:
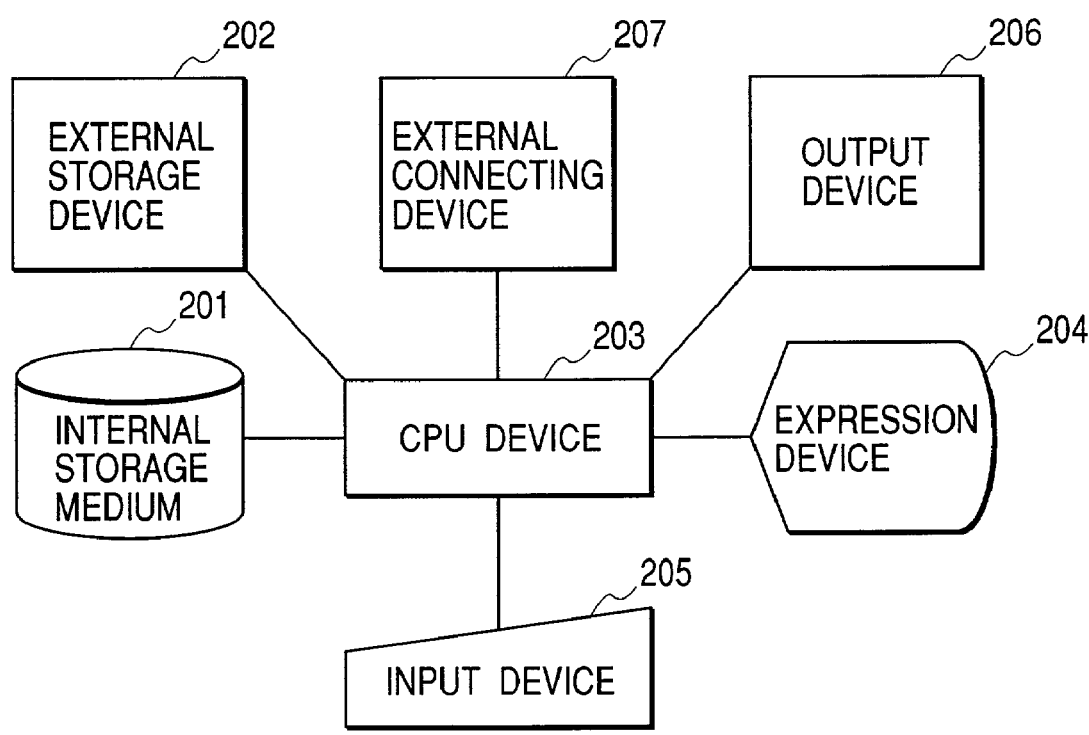
FIG. 2 is a block diagram showing a CAD apparatus.

FIG. 2 is a block diagram of a CAD apparatus. In FIG. 2, an internal storage medium 201 and an external storage device 202 are semiconductor storage devices or magnetic storage devices, such as RAMs, for storing CAD data and a CAD program.

A CPU device 203 controls the individual blocks of the CAD apparatus, and also performs the processing in accordance with a CAD program command.

A display device 204 is used to display various drawings (a 3D drawing and a 2D drawing), and buttons and instructions necessary for the operation.

An input device 205, such as a mouse or a keyboard, is used to provide an instruction for the CAD program.

An output device 206, such as a printer, outputs a drawing sheet in accordance with a command received from the CPU device 203.

An external connecting device 207 connects the CAD apparatus to an external device, supplies data received from the CAD apparatus to an external device, or permits an external device to control the CAD apparatus. Further, the external connecting device 207 is used to download, from an external device, a CAD program for the processing in this embodiment.

Figure 3:
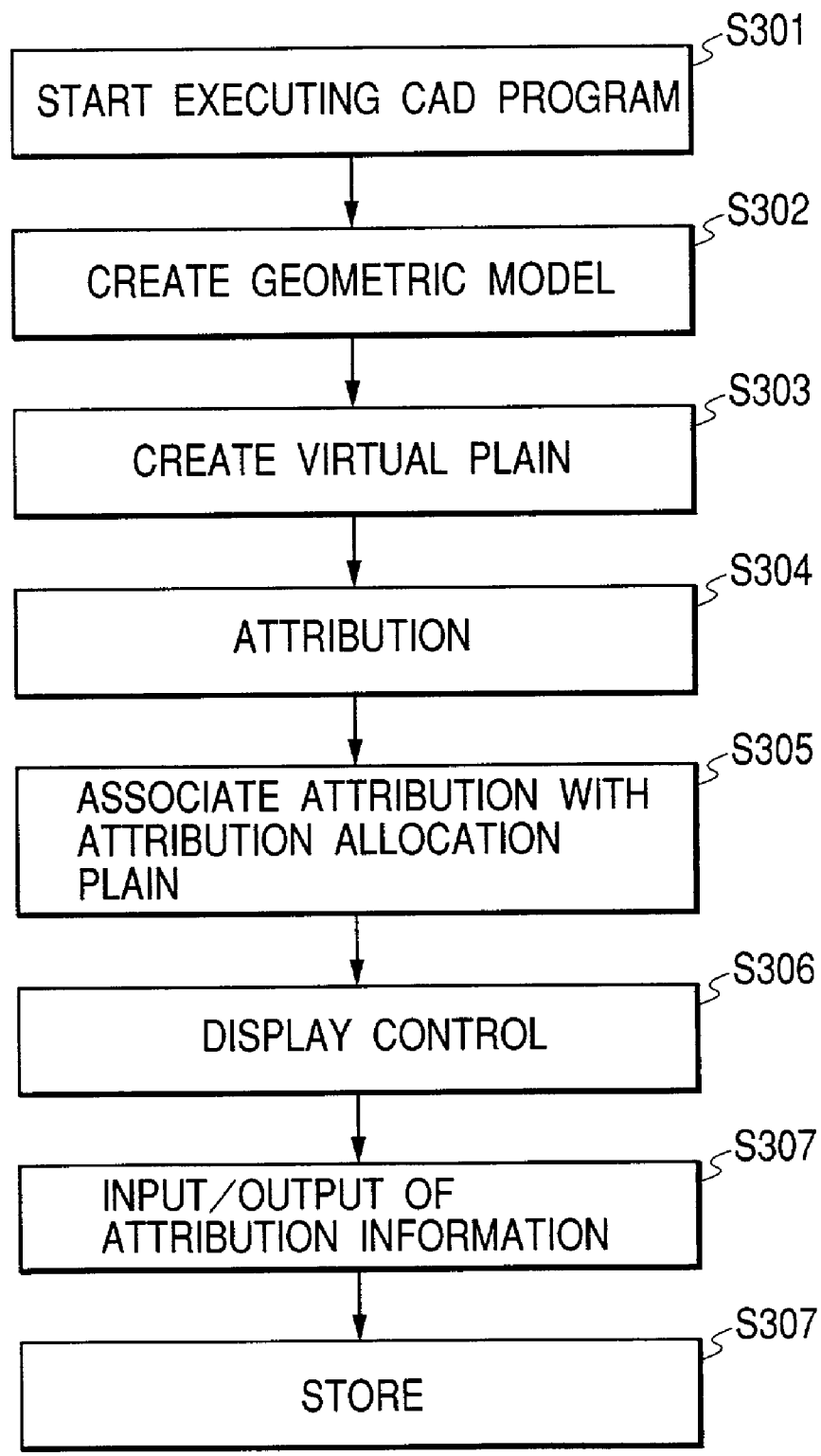
FIG. 3 is a flowchart showing the processing performed by the CAD apparatus in FIG. 2.

FIG. 3 is a flowchart showing the processing performed by the CAD apparatus in FIG. 2.

First, when an operator uses the input device 205 to enter an instruction to activate the CAD program, the CAD program stored in the external storage device 202 is read into the internal storage medium 201 and is executed by the CPU device 203 (step S301).

Then, in consequence with instructions interactively entered by the operator using the input device 205, a geometric model, which will be described later, is generated in the internal storage medium 201 and is displayed as an image on the display device 204 (step S302). Further, when the operator uses the input device 205 to designate a file name, the previously prepared geometric model stored in the external storage device 202 can be read into the internal storage medium 201 where it can be handled by the CAD program.

The operator employs the input device 205 to generate, in a three-dimensional space wherein a geometry model is prepared, an attribution allocation plane constituting a virtual plan for which attributions allocated or with which attributions are correlated (step S303).

The attribution allocation plane is displayed as image data, such as a frame (a double frame for which the interior is painted with a solid color), so that the location of the attribution allocation plane is easily discerned. Further, information for setting the attribution allocation plane is stored on the internal storage device 201 in correlation with the geometry model.

Furthermore, it is preferable that, as needed, a name be provided for an attribution allocation plane that is generated.

The operator employs the input device 205 to add attribution information, such as a dimensional tolerance, to the geometry model (step S304). The added attribution information can be displayed as image data (text, symbols, or labels) on the display device 204, and also is stored on the internal storage deicer 201, in correlation with the geometry model.

The operator employs the input device 205 to correlate the attribution information with the attribution allocation plane (step S305).

"Correlation" is implemented as follows. Unique identifiers are allocated for the attribution information, while unique identifiers are allocated for the attribution allocation planes. The identifiers for the attribution information are correlated with those for the attribution allocation planes, and correlation information is generated between the attribution information and the attribution allocation plane. In this manner, "correlation" is performed.

The correlation information between the attribution information and the attribution allocation plane is stored on the internal storage medium 201.

The operator may designate an attribution allocation plane in advance, and may add attributions while correlating the attribution information with an attribution allocation plane. Further, the operator can employ the input device 205 to set or cancel the correlation of the attribution information with the attribution allocation plane.

Then, the operator designates an attribution allocation plane by using the input device 205, and either controls the display/non-display of an attribution allocation plane and attribution information, such as a dimensional tolerance, that is correlated with the attribution allocation plane, or controls the coloring (step S306).

When the operator generates an attribution allocation plane using the input device 205, the operator sets display information (the visual position, the visual direction and the magnification) for an attribution allocation plane. When the display information for the attribution allocation plane is set and the attribution allocation plane is designated, a geometry model can be displayed in accordance with the designated visual position, visual direction and magnification. Then, since the attribution allocation plane and the attribution information are correlated, the attribution information correlated with the designated attribution allocation plane can be selectively displayed. The display information for the attribution allocation plane is stored on the internal storage medium 201.

In accordance with an operator's instruction, the attribution information can also be stored in the external storage device 202 (step S307).

The identifier can be added to the attribution information, and together with identifier, the attribution information can be stored in the external storage device 202.

This identifier is an attribution value that is added to the attribution information in order to distinguish it from other attribution information. When data concerning the attribution information are to be exchanged by a plurality of programs, unique identifiers are added to the attribution information to permit the data concerning the attribution information to be handled in correlation with the attribution information.

As an example, when the measurement results output by a measurement instrument are correlated with attribution information, such as a dimension, measurement results that are added to the dimension correspond to those added to the identifier. As a result, the measurement results can be read in correlation with the dimension.

Further information can be added to the attribution information in the external storage device 202, and the resultant data can be read to the internal storage medium 201 to update the attribution information.

Finally, the operator employs the input device 205 to store in the external storage device 202 a CAD attribution model obtained by adding, to a geometry model, the position information for the attribution allocation plane, the display information for the attribution allocation plane and the attribution information (step S308).

A Geometry Model and a CAD Attribution Model

The geometric model and the CAD attribution model will now be described.

Figure 4:
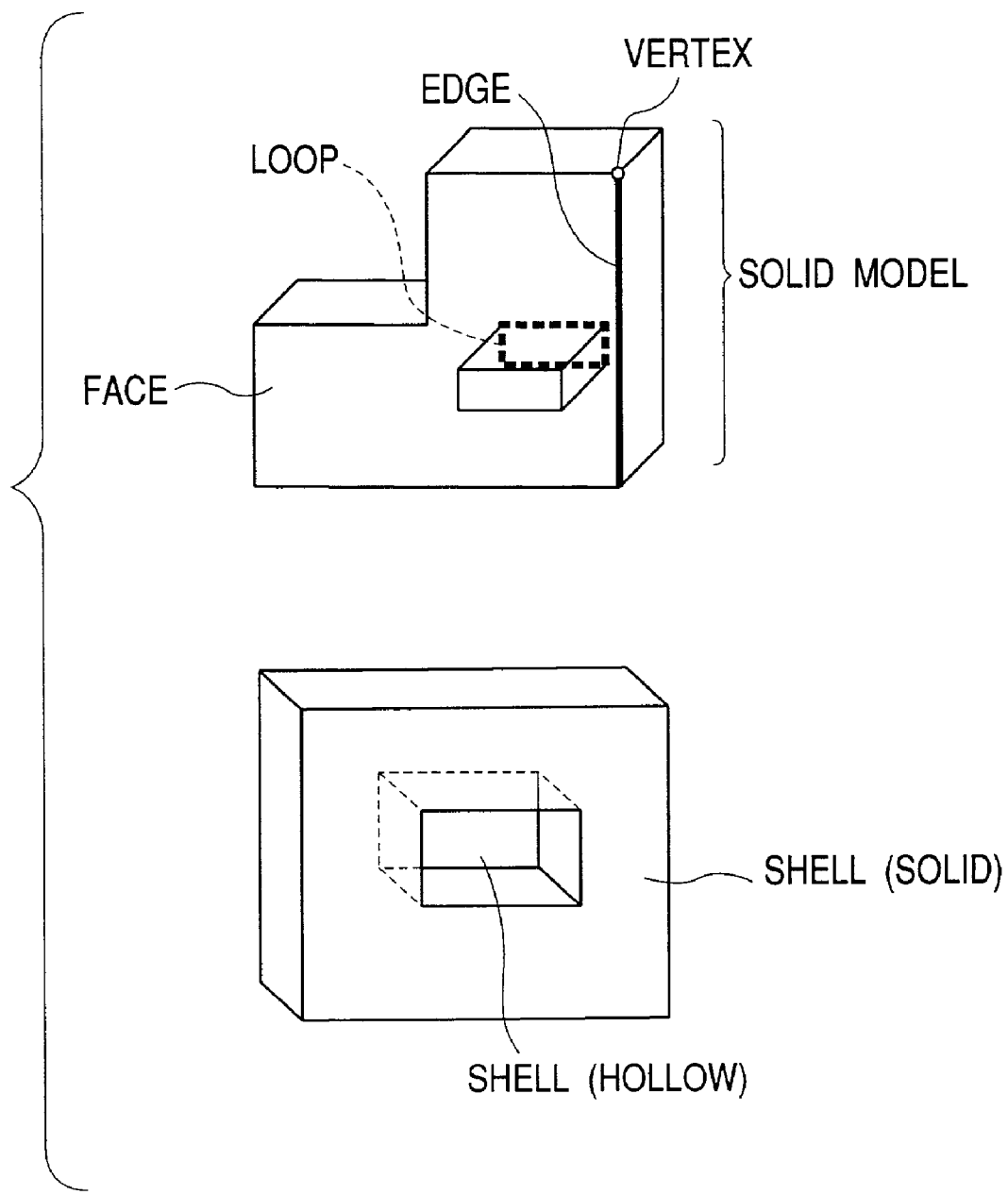
FIG. 4 is a diagram showing an example geometry model.
Figure 5:
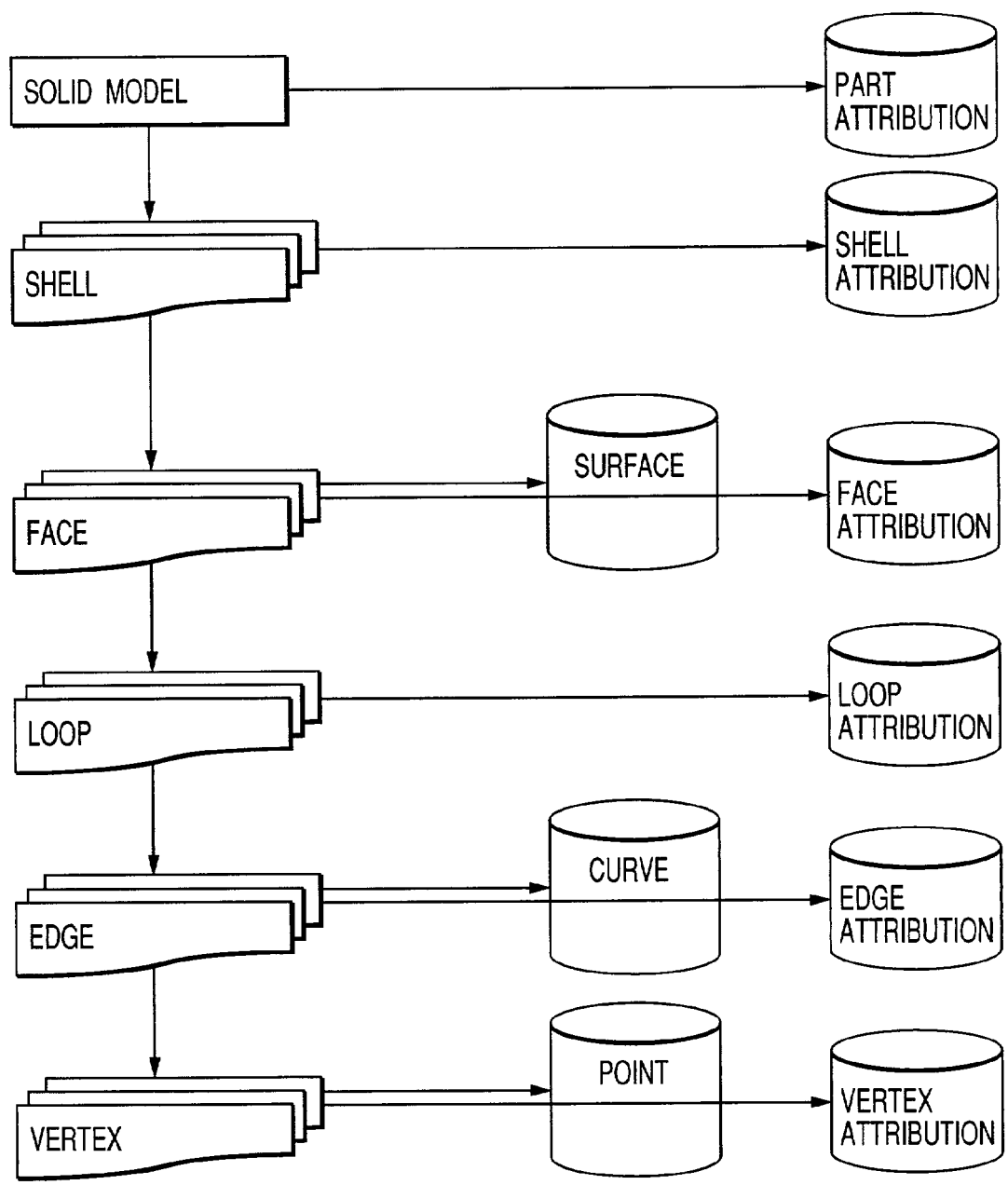
FIG. 5 is a conceptual diagram showing the correlation of individual sections constituting a geometry model.

FIG. 4 is a diagram showing an example geometric model, and FIG. 5 is a conceptual diagram showing the correlation of the individual portions that constitute the geometric model.

In FIG. 4, SolidModel is shown as a typical example for the geometric model. As is shown in FIG. 4, the SolidModel information is used as an expression method whereby CAD is employed to define in a three-dimensional space the geometry of a part, which includes topological information (Topology) and geometric information (Geometry). As is shown in FIG. 5, the topological information for the Solid-Model is hierarchically stored on the internal storage medium 201, and includes one or more than Shell, one or more than Face for one Shell, one or more than Loop for one Face, one or more than Edge for one Loop and two Vertexes for Edge.

Further, Surface information that expresses the Face geometry, such as a flat plane or a cylindrical plane, is stored on the internal storage medium 201 in correlation with the Face. Also, Curve information that expresses Edge geometry, such as a linear line or an arc, is stored on the internal storage medium 201 in correlation with the Edge. And in addition, the coordinates in the three-dimension space are stored on the internal storage medium 201 in correlation with the Vertexes.

For the topological elements of the Shell, the Face, the Loop and the Vertex, correlated attribution information is stored on the internal storage medium 201.

As an example, the method for storing the Face information on the internal storage medium 201 will now be described.

Figure 6:
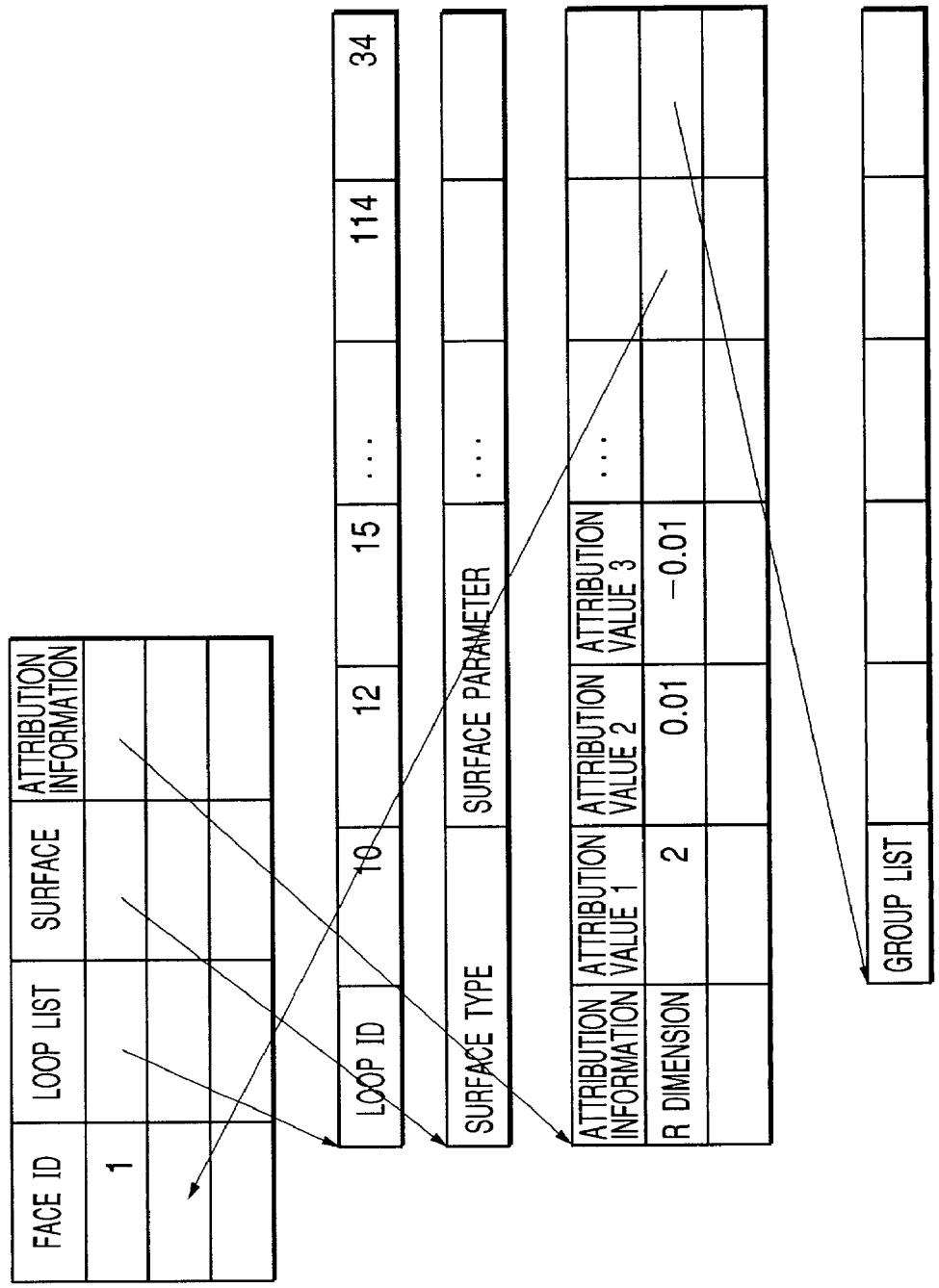
FIG. 6 is a conceptual diagram showing a method used for storing Face information in an internal storage medium 201.

FIG. 6 is a conceptual diagram showing the method for storing the Face information on the internal storage medium 201.

As is shown in FIG. 6, the Face information includes a FaceID, a pointer to LoopList, which constitutes the Face, a pointer to the Surface data, which represents the Face geometry, and a pointer to the attribution information.

LoopList is a list of the IDs of all the Loops that constitute the Face. The Surface data includes SurfaceType and SurfaceParameter, which is consonant with SurfaceType. The attribution information includes an attribution type and an attribution value consonant with the attribution type, and the attribution information includes a pointer to the Face and a pointer to a group to which an attribution belongs.

Input and Display of Attribution Information for a 3D Model
(Attribution Allocation Plane)

A detailed explanation will now be given for the processing for entering attribution information for a 3D model, for generating an attribution allocation plane, and for displaying a 3D model to which the attribution information is added.

Figure 11A:
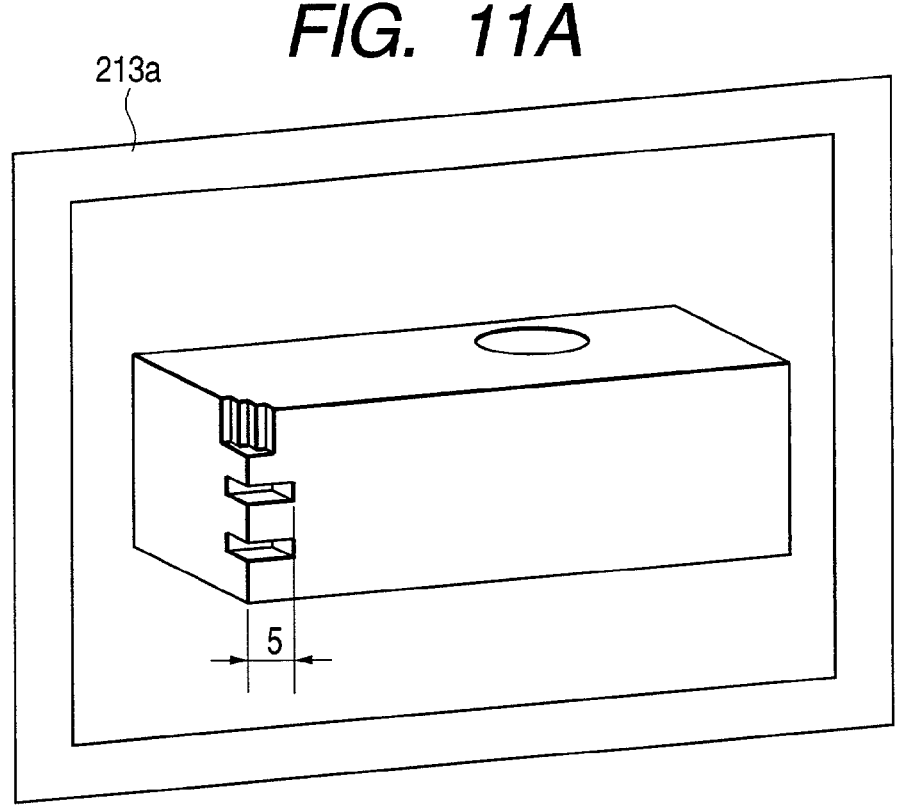
FIGS. 11A and 11B are diagrams showing a 3D model and accompanying attribution information.
Figure 11B:
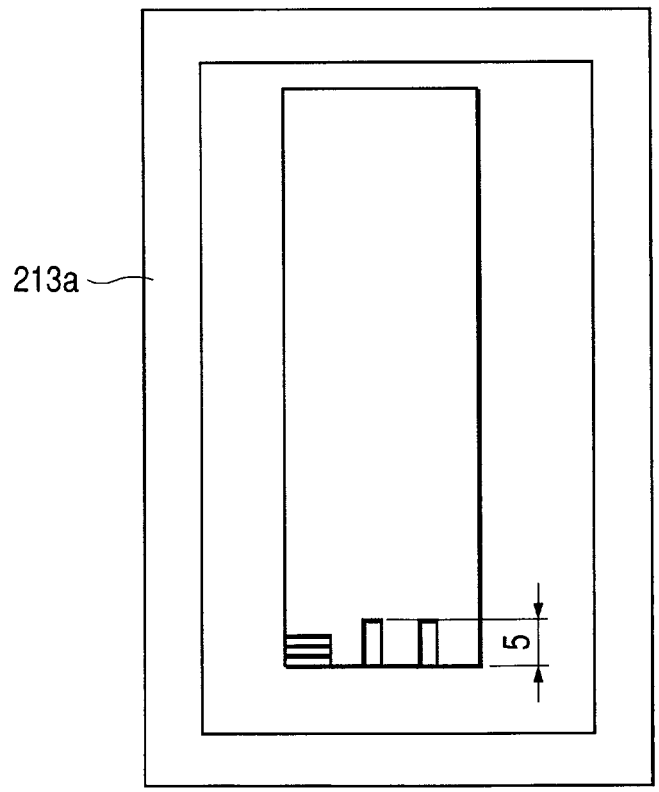
Figure 12:
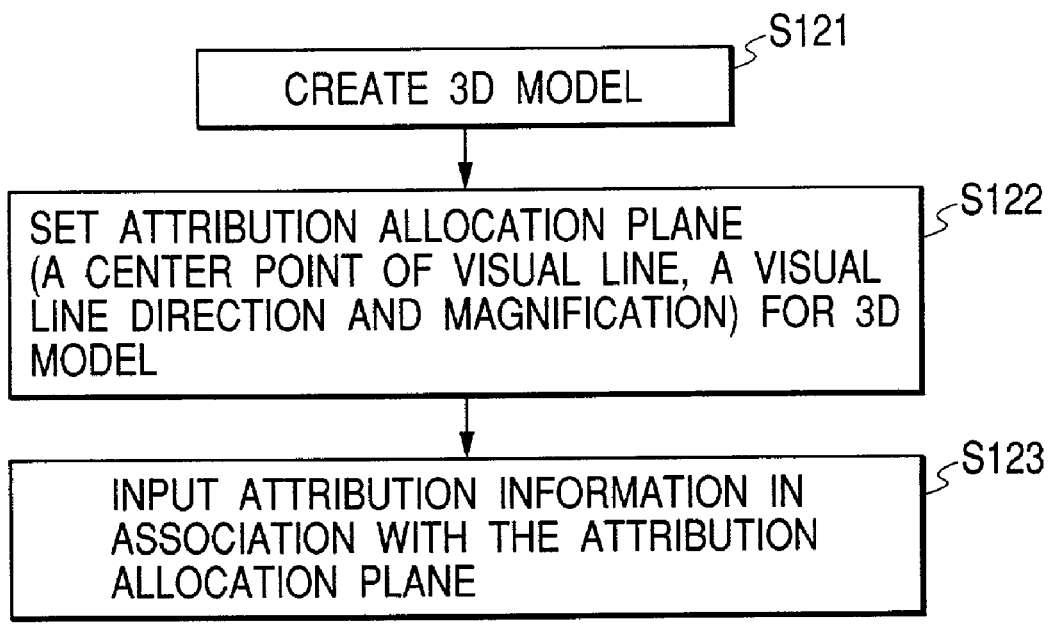
FIG. 12 is a flowchart showing the processing for adding attribution information to a 3D model.
Figure 13:
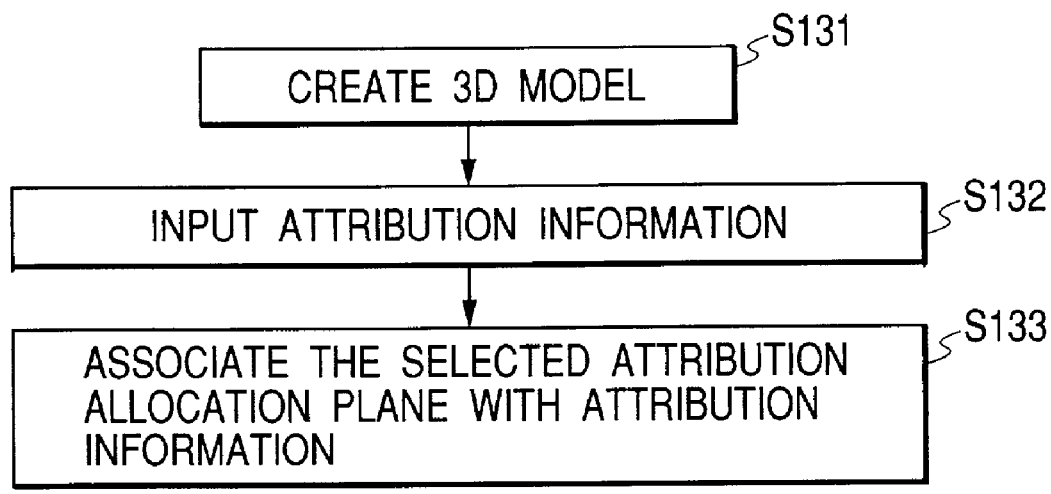
FIG. 13 is a flowchart showing the processing for adding attribution information to a 3D model.
Figure 14:
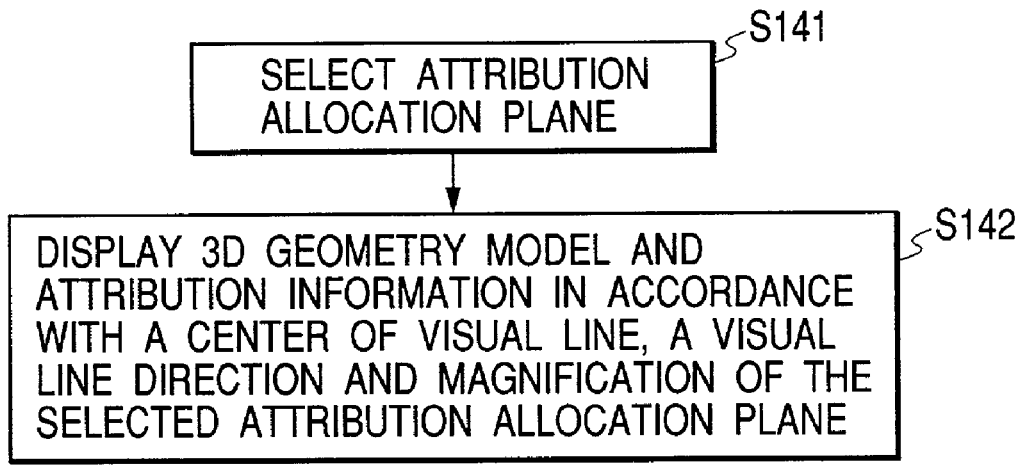
FIG. 14 is a flowchart showing the processing for adding attribution information to a 3D model.

FIGS. 7 to 11 are diagrams showing a 3D model, attribution information and an attribution allocation plane, and FIGS. 12 to 14 are flowcharts for the processing for adding an attribution allocation plane and attribution information to a 3D model.

Figure 7:
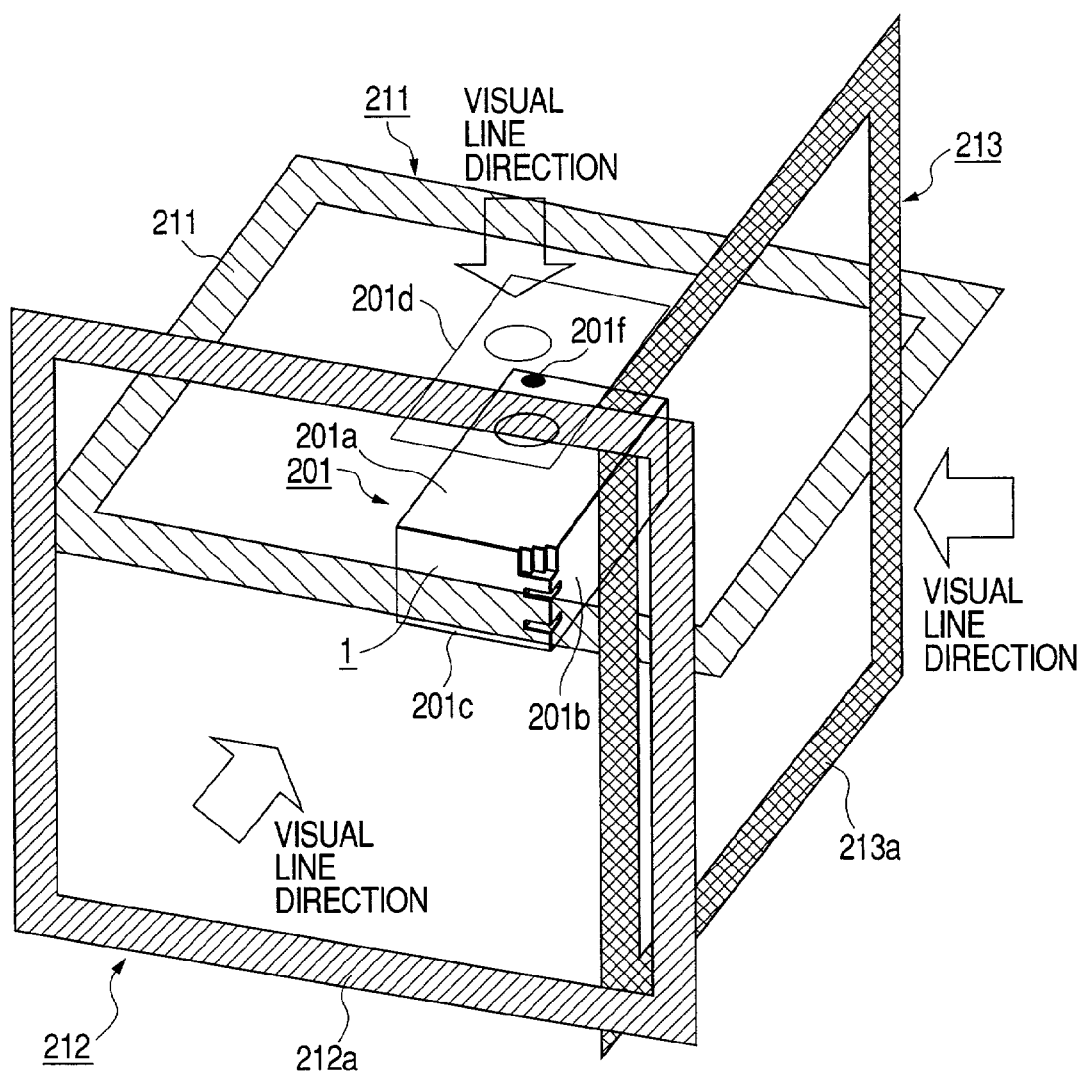
FIG. 7 is a plan view of a 3D model and an attribution allocation plane.

At step S121 in FIG. 12, a 3D model 1 in FIG. 7 is generated, and at step S122, a required attribution allocation plane is established.

The attribution allocation plane is used to define a condition concerning the display of the 3D model 1 and the attribution information added to the 3D model 1.

In this invention, the attribution allocation plane is defined by using the position of one point (hereinafter referred to as a visual point) in (virtual) three-dimensional space and the normal direction (matching the visual direction) of a plane to be generated. Further, information for the display magnification (hereinafter refereed to simply as a magnification) of the 3D model 1 and the attribution information added to the 3D model 1 is also included.

The visual point is used to define the position from which the 3D model 1 is seen, i.e., is displayed in the visual direction. For example, an attribution allocation plane 212 is set at a position located 60 mm from the outline of a front view 201 of the 3D model 1 (FIG. 7).

It should be noted, however, that, as regards a perspective view (a front view, a plan view, right and left side views, a bottom view and a rear view) presented by the so-called trigonometry, the display contents are not affected so long as the visual position is located outside the 3D model 1.

Further, when the 3D model 1 and the attribution information added to the 3D model are displayed, the visual position of the visual line corresponds to the center of the display of the display device 204, regardless of the preceding display state.

Then, the normal direction of the attribution plane corresponds to the visual direction, extended from the visual point, in which the 3D model 1 and the attribution information added to the 3D model 1 are displayed.

Further, the magnification is defined as a magnification at which the 3D model in the (virtual) three-dimensional space is enlarged for display on the display device 204.

The visual position, the visual direction (the normal direction of the attribution allocation plane) and the magnification, which are parameters for the attribution allocation plane, are set as variables as needed.

For example, in FIG. 7, an attribution allocation plane 211 is determined that is perpendicular to a face 201a in the plan view in FIG. 25 and for which the direction from the outside to the inside of the 3D model matches the visual direction. The visual position and the magnification are determined so that the geometry of the 3D model 1, and substantially all the attribution information that is provided, can be displayed on the screen of the display device 204. For instance, in this embodiment, the magnification is "1", and a visual position 201f is defined substantially as the center of the face 201a in the plan view (a chained line 201d in FIG. 7 indicates the state wherein the contour of the front view is substantially projected onto the attribution allocation plane 211). Similarly, an attribution allocation plane 212 is set in the visual direction perpendicular to the face 201c in the front view, and an attribution allocation plane 213 is set in the visual direction perpendicular to a face 201b in the side view.

In order to clearly identify the positions of the individual attribution allocation planes, these planes are represented using square double frames. In this embodiment, the frames are employed as means for clearly indicating the position of the attribution allocation information. However, the present invention is not limited to the use of the square double frames, and polygons other than squares, or circles may be employed. The attribution allocation plane 211 is positioned in parallel to an upper plane 201a of the 3D model 1, the attribution allocation plane 212 is positioned in parallel to a front plane 201b of the 3D model 1, and the attribution allocation plane 213 is positioned in parallel to a side plane 201c of the 3D model 1.

(Method for Entering Attribution Information)

Figure 8:
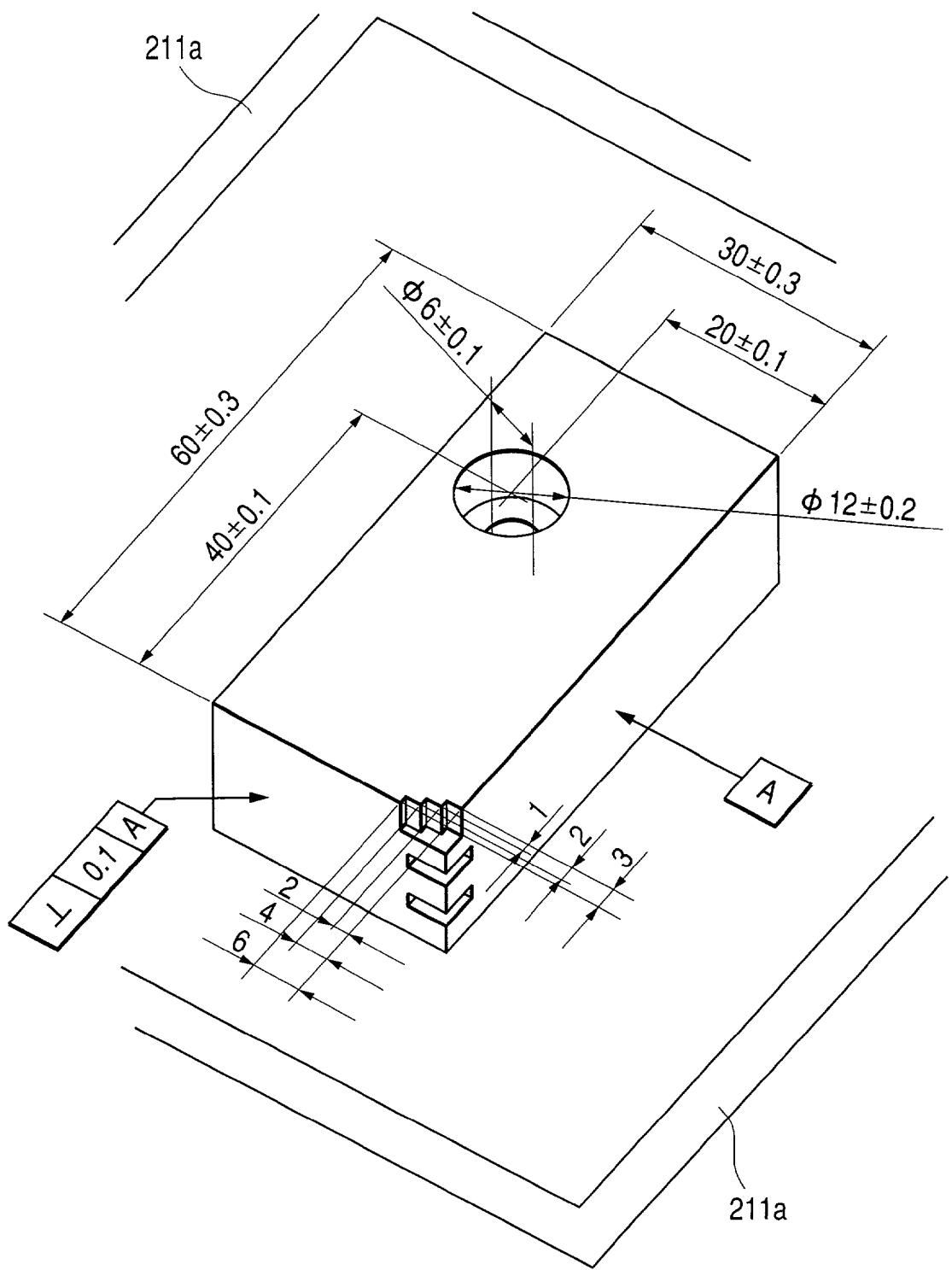
FIG. 8 is a diagram showing a 3D model and accompanying attribution information.
Figure 9:
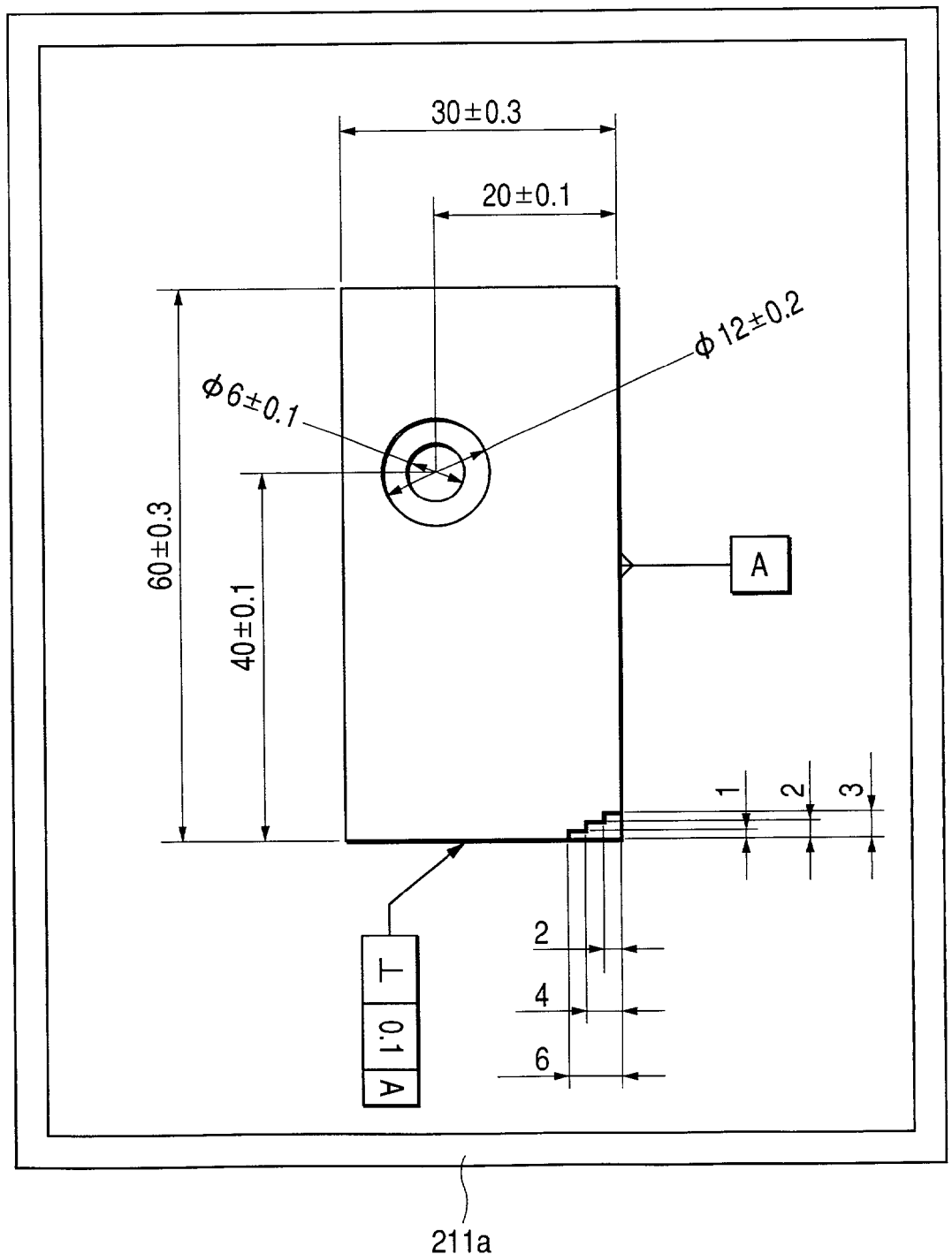
FIG. 9 is a diagram showing a 3D model and accompanying attribution information.
Figure 10A:
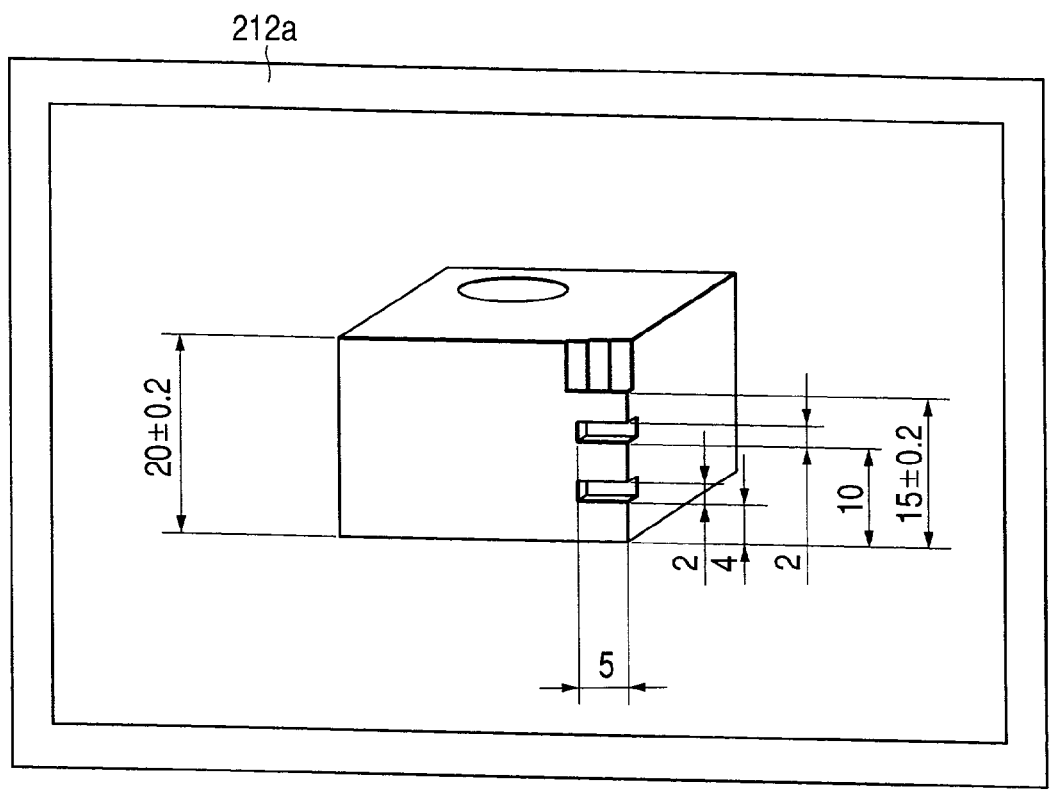
FIGS. 10A and 10B are diagrams showing a 3D model and accompanying attribution information.
Figure 10B:
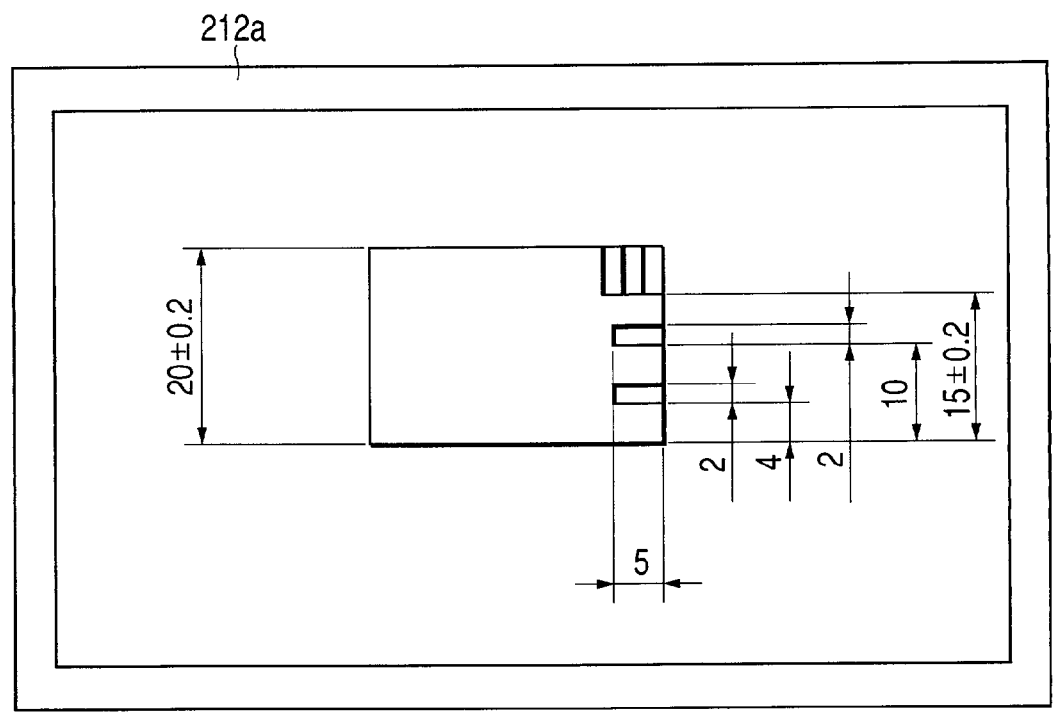

Attribution information is entered in correlation with each attribution allocation plane set at step S123. At this time, the attribution information is allocated on the attribution allocation plane. FIGS. 8, 10A and 11A are diagrams showing the state wherein attribution information is provided for a 3D model in correlation with the attribution allocation planes 211, 212 and 213. FIGS. 9, 10B and 11B are diagrams showing the 3D model 1 and attribution information that are displayed at the visual positions, in the visual directions and at the magnifications of the attribution allocation planes 211, 212 and 213.

The size of attribution information (the height of a character or a symbol) correlated with the attribution allocation plane is changed in accordance with the magnification used for the attribution allocation plane. The size (mm) of the attribution information is defined as the size in the virtual three-dimensional space wherein the 3D model is present (not the size when the attribution information is displayed on the display device 204).

The correlation of the attribution allocation plane and the attribution information may be performed after the attribution information is entered. For example, a 3D model is prepared as in the flowchart in FIG. 13 (step S131), at step S132 attribution information is input, and at step S133 attribution information is correlated with a desired attribution allocation plane. Further, as needed, corrections such as addition or deletion are performed for the attribution information correlated with the attribution allocation plane.

When the attribution information is correlated with another attribution allocation plane, the size of the attribution information is changed in accordance with the magnification used for the pertinent attribution allocation plane.

The attribution information may be entered while the 3D model 1 is displayed two-dimensionally in the visual direction defined by each attribution allocation plane. This input process can be performed in exactly the same manner as is performed at the step for the creation of a two-dimensional drawing using so-called 2D-CAD. Further, as needed, the attribution information may be input while the 3D model is displayed three-dimensionally. Since an operator can input attribution information while observing the 3D model 1 in three dimensions, an efficient input process can be performed without any errors.

An explanation will now be given for a case wherein the attribution information for the 3D model 1 is read. At step S141 in FIG. 14, a desired attribution allocation plane is selected. At step S142, the geometry of the 3D model 1 and the attribution information correlated with the attribution allocation plane selected at step S141 are displayed, based on the visual position, the visual direction and the magnification used for the selected attribution allocation plane. For example, when the attribution allocation plane 211, 212 or 213 is selected, the 3D model 1 and the attribution information shown in FIG. 9, 10B or 11B are displayed, so that regardless of the preceding display state, the attribution allocation plane is positioned in the normal direction of the screen. At this time, the attribution information is displayed in the visual direction of the selected attribution allocation plane, i.e., is positioned normally on the screen. Thus, the 3D model and the attribution information on the display screen can be seen so that they can extremely easily be understood.

(Method for Selecting an Attribution Allocation Plane)

An explanation will now be explained for a case wherein an attribution allocation plane can be easily selected. First, as one method (FIG. 7), the frame of the attribution allocation plane of a selectable 3D model is displayed, and an operator employs the input device 205, including a pointing device such as a mouse, for the selection of the attribution allocation plane.

As another method (not shown), the names of selectable attribution allocation planes are displayed as a list for the selection of a desired attribution allocation plane.

Figure 27:
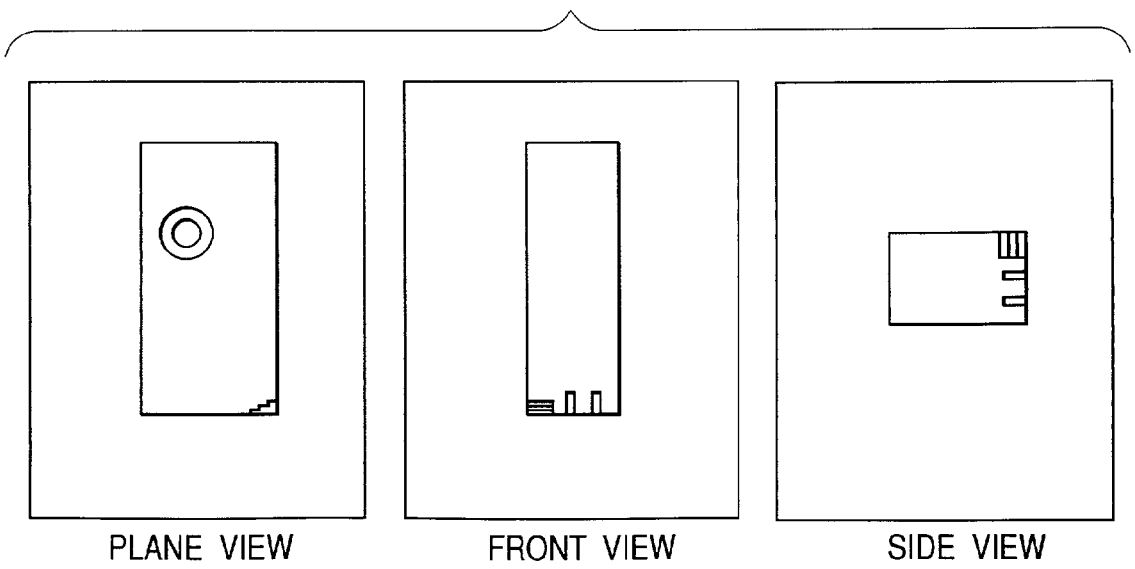
FIG. 27 is a diagram for explaining the state wherein icons are employed to display the contents viewed from the individual attribution allocation planes.

As an additional method (FIG. 27), the attribution allocation plane (FIG. 9, 10B or 11B), as seen in the visual direction, is displayed as a thumbnail image icon and selected.

(Another Method for Entering Attribution Information)

In the attribution information entering processing described above while referring to FIGS. 11 to 14, the attribution information is correlated with the individual attribution allocation planes. The correlation means is not limited to this arrangement, however, and the attribution information may be sorted into groups, for example, and the groups correlated with the attribution allocation planes.

Figure 15:
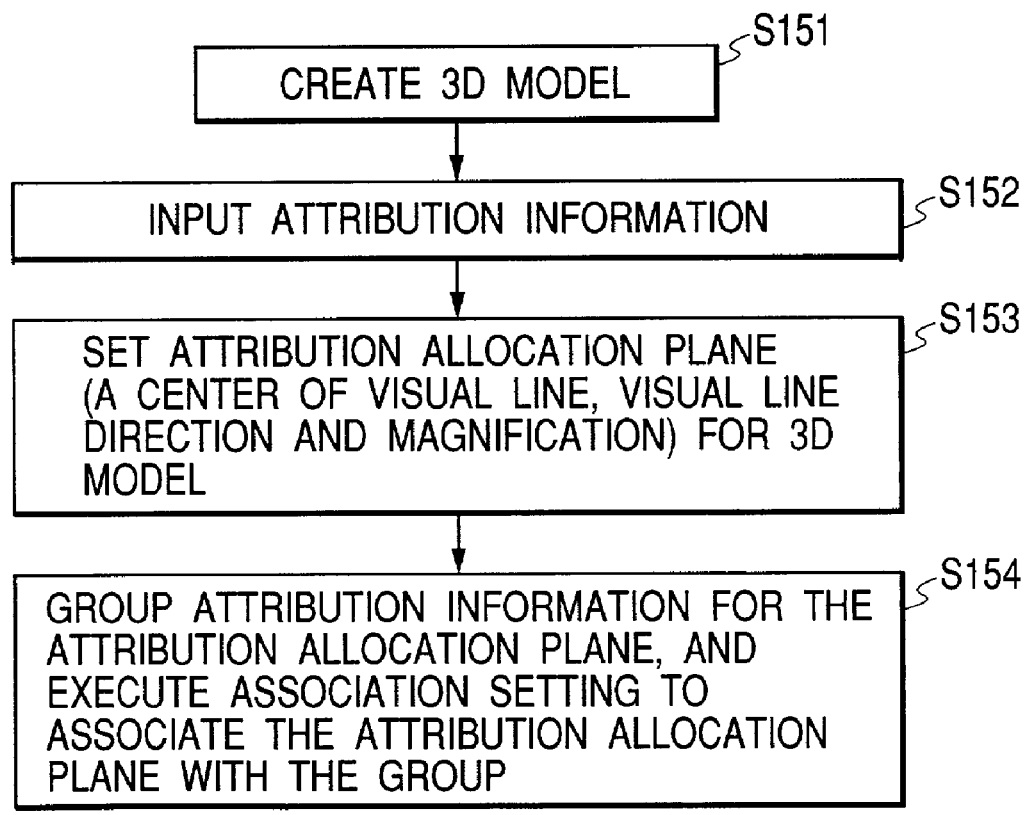
FIG. 15 is a flowchart showing the processing for adding attribution information to a 3D model.

This process will now be described while referring to the flowcharts in FIGS. 15 and 16.

The attribution information input in advance either is sorted into groups selectively or is based on the search results, and each group is correlated with an arbitrary attribution allocation plane. As a result, the same results and effects as described above can be obtained. Further, when the attribution information is corrected, i.e., is added to a group or is deleted therefrom, attribution information correlated with the attribution allocation plane can be manipulated.

That is, the 3D model 1 is generated (step S151), the attribution information is entered (step S152), and the visual position and the visual direction of the attribution allocation plane, and the magnification are set for the 3D model 1 (step S153). Then, the attribution information input at step S152 is assembled into a group, and the selected attribution allocation plane is correlated with the grouped attribution information (step S154).

Figure 16:
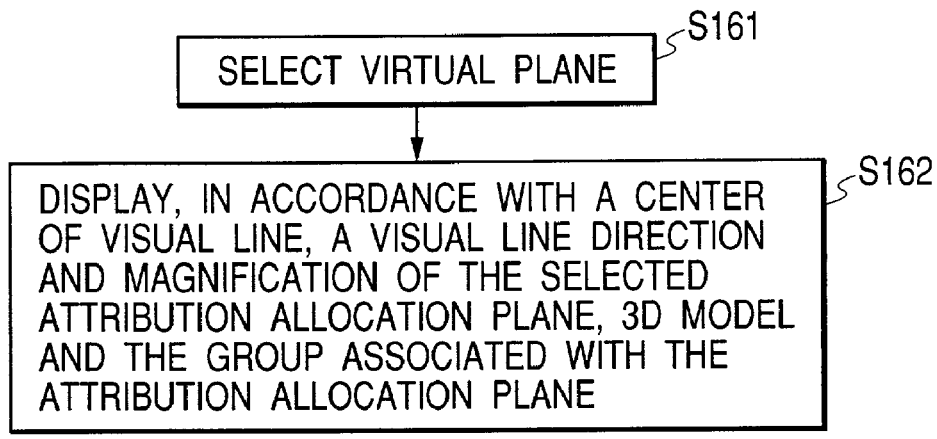
FIG. 16 is a flowchart showing the processing for adding attribution information to a 3D model.

As is shown in FIG. 16, the attribution allocation plane to be displayed is selected (step S161), and the attribution information correlated with the selected attribution allocation plane is displayed, while being positioned in accordance with the visual point and the visual direction of the attribution allocation plane and the magnification (step S162).

(Setting up a Plurality of Attribution Allocation Planes)

An explanation will now be given for the processing for setting up a plurality of attribution allocation planes with the same visual direction orientation (these attribution allocation planes are set parallel to each other).

Figure 17:
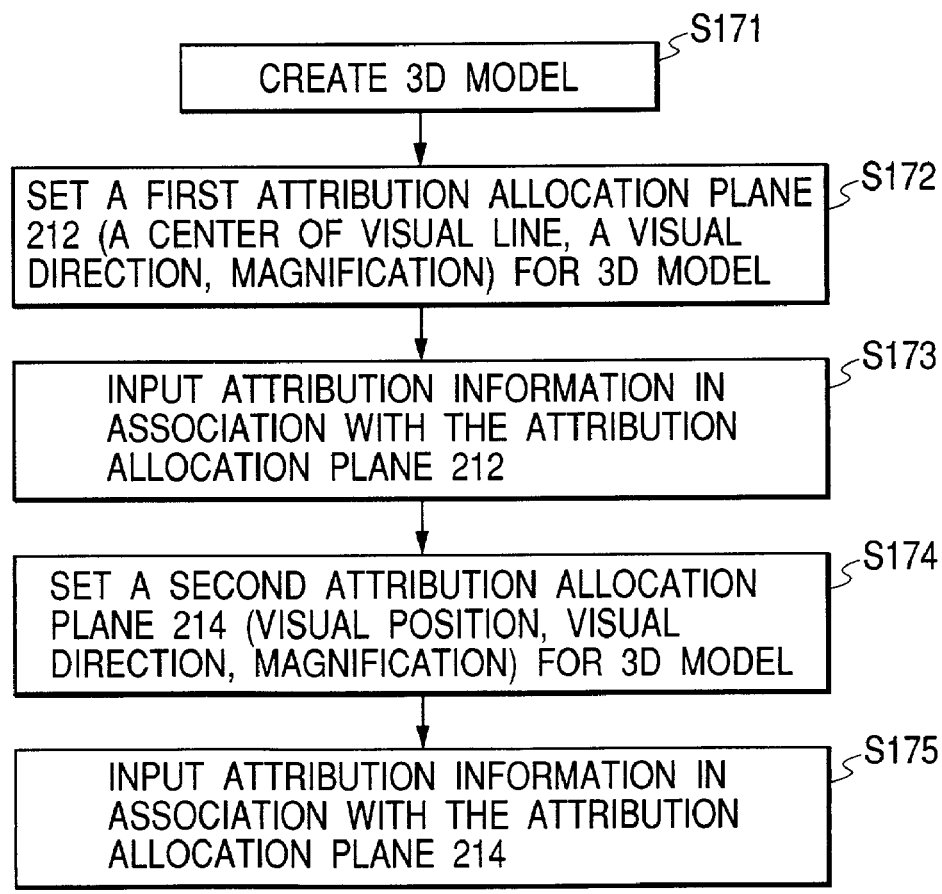
FIG. 17 is a flowchart showing the processing for setting a plurality of attribution allocation planes to a 3D model.
Figure 18A:
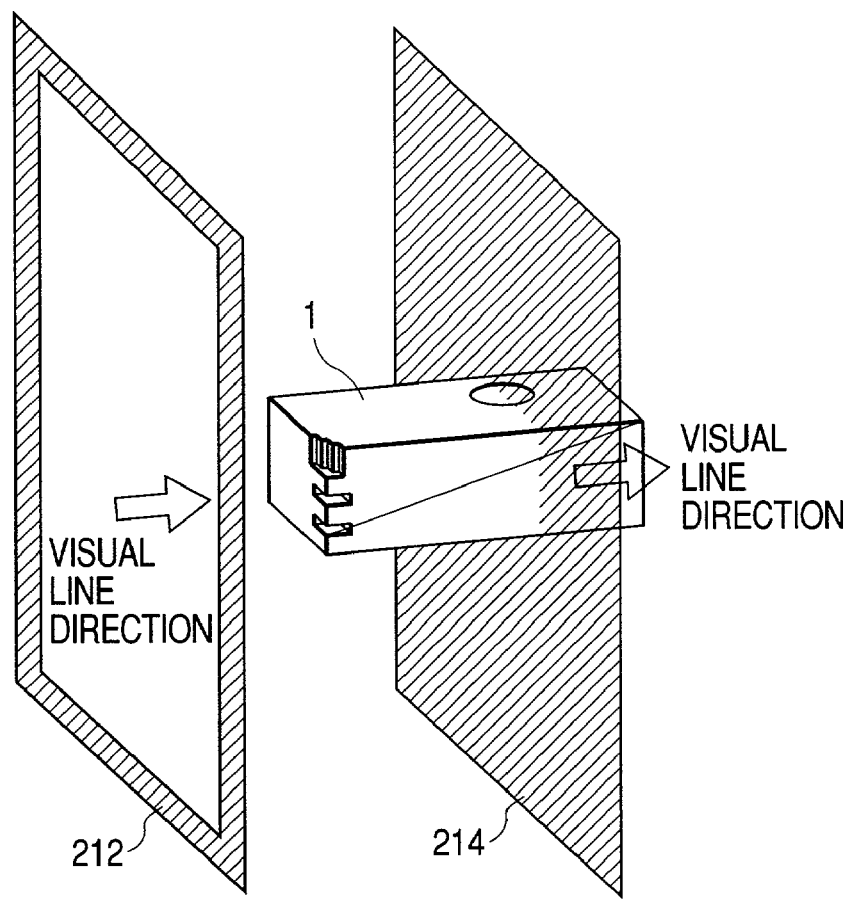
FIGS. 18A and 18B are diagrams showing the state wherein a plurality of views are established for a 3D model.
Figure 18B:
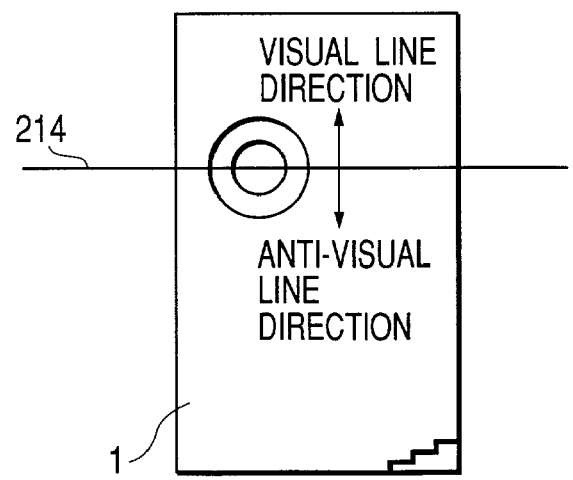

FIG. 17 is a flowchart for the processing for setting up a plurality of attribution allocation planes with the same visual direction orientation. FIG. 18 is a diagram showing a 3D model when a plurality of attribution allocation planes with the same visual direction orientation are to be set up.

An explanation will be given for a case wherein a plurality of attribution allocation planes are set up for which the perspective direction is that of the front view of the 3D model 1 in FIG. 7.

As is described above, the 3D model 1 is created (step S171), and at step S172, the attribution allocation plane 212 (the visual position, the visual direction and the magnification), which is a first attribution allocation plane, is set. The visual direction of the attribution allocation plane 212 is perpendicular to the plane 201b in the front view, the magnification is, for example, "1", and the visual point is located at a distance of 30 mm from the exterior surface of the front view, and is substantially in the center of the plane 201b of the front view.

At step S173, the attribution information in FIG. 10A is entered in correlation with the attribution allocation plane 212, so that, as is shown in FIG. 10B, the 3D model 1 and the attribution information can extremely easily be seen two-dimensionally in the visual direction of the attribution allocation plane 212.

At step S174, the attribution allocation plane (the visual position, the visual direction and the magnification) of the attribution allocation plane 214, which is the second attribution allocation plane, is set. The visual direction of the attribution allocation plane 214 is set so it is parallel to the plane 201b in the front view, the magnification is set to "1", for example, and the visual position is set so that it includes the center axis of the hole in the 3D model.

Figure 19A:
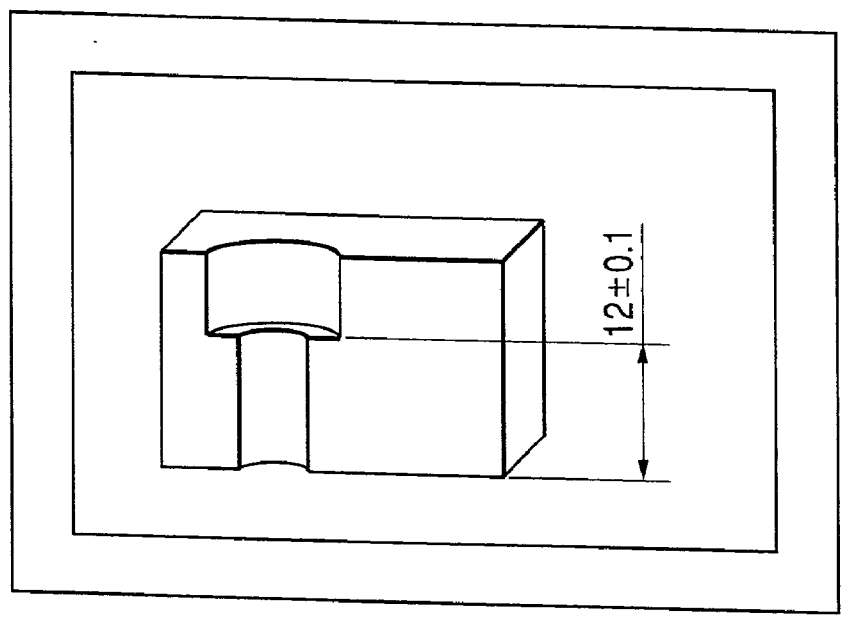
FIGS. 19A and 19B are diagrams of the 3D model viewed from an attribution allocation plane 214 in FIGS. 18A and 18B.
Figure 19B:
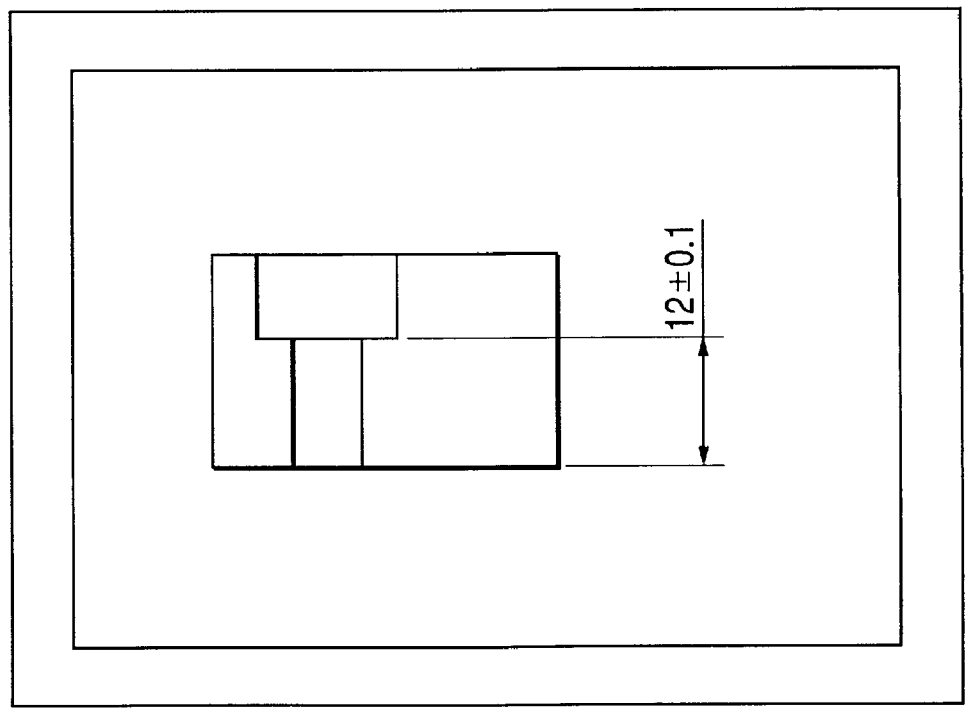

The attribution allocation plane 214 is painted as a square shaped solid color. At this time, as is shown in FIG. 19B, the 3D model 1 viewed from the attribution allocation plane 214 is a cross-sectional view cut along the virtual plane 214. Then, the attribution information (e.g., the size 12±0.1 of the hole in FIG. 19B) is input in correlation with the attribution allocation plane 214. Further, when the attribution allocation plane 214 is selected, the cross section of the 3D model 1 and the attribution information correlated with the attribution allocation plane 214 are positioned and displayed as shown in FIG. 19B.

When the 3D model is moved or rotated, the three-dimensional display as shown in FIG. 19B can be obtained.

Specifically, when the attribution allocation plane 214 is selected, the 3D model 1, which is located in the visual direction of the attribution allocation plane 214, and the attribution information, which is correlated with the attribution allocation plane present in the area in the visual direction, are displayed, and the 3D model geometry and the attribution in the area opposite from the visual direction (see FIG. 18B) are not displayed.

According to the embodiment, not only the attribution information related to the external geometry, but also the attribution related to the cross-sectional shape in the same visual direction can be handled. Therefore, since the attribution information can be entered and displayed by referring to the cross-sectional shape, the portion indicated by the attribution information can be easily and immediately identified.

Figure 20:
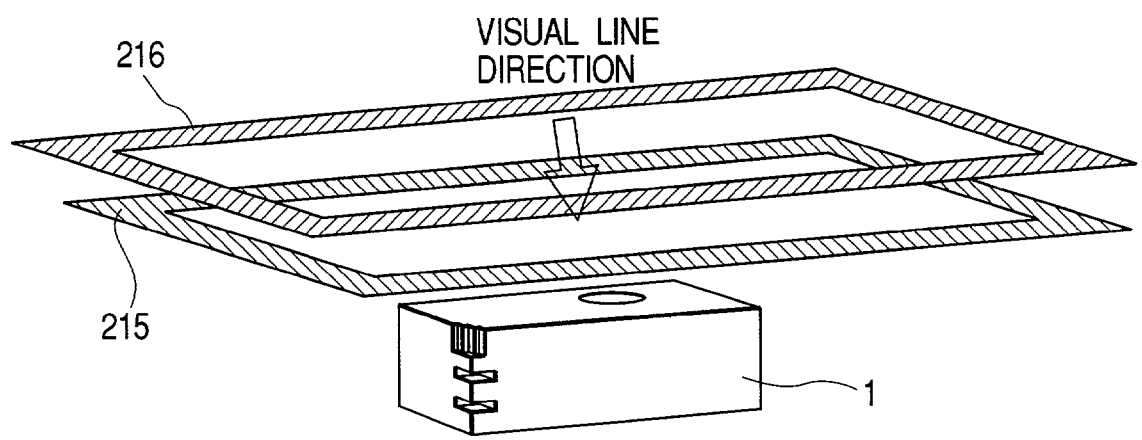
FIG. 20 is a diagram showing the state wherein a 3D model and a plurality of attribution allocation planes are set.
Figure 21:
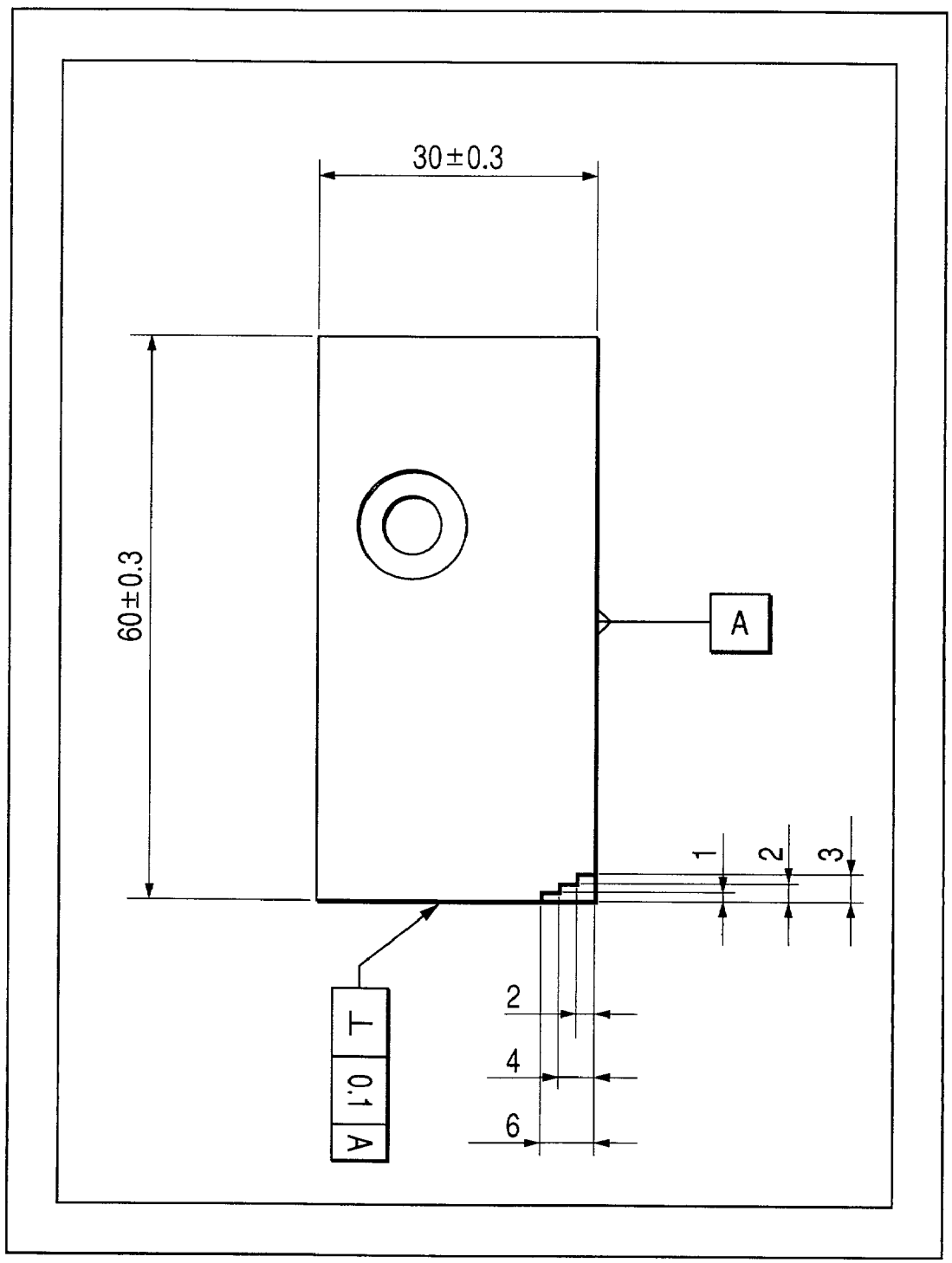
FIG. 21 is a diagram of the 3D model viewed from an attribution allocation plane 215 in FIG. 20.

In addition, a plurality of attribution allocation planes whereon the geometry of the 3D model 1 appears the same may be employed. FIG. 20 is a diagram showing attribution allocation planes 215 and 216 having the same visual direction. In this example, the attribution allocation planes 215 and 126 are directed to the front view of the 3D model 1. When the attribution information is, for example, grouped to be correlated with the individual attribution allocation planes, the attribution information can be more easily seen. For example, in FIG. 21 for the plan view of the 3D model 1, the attribution information sets related to the external dimension are grouped.

Figure 22:
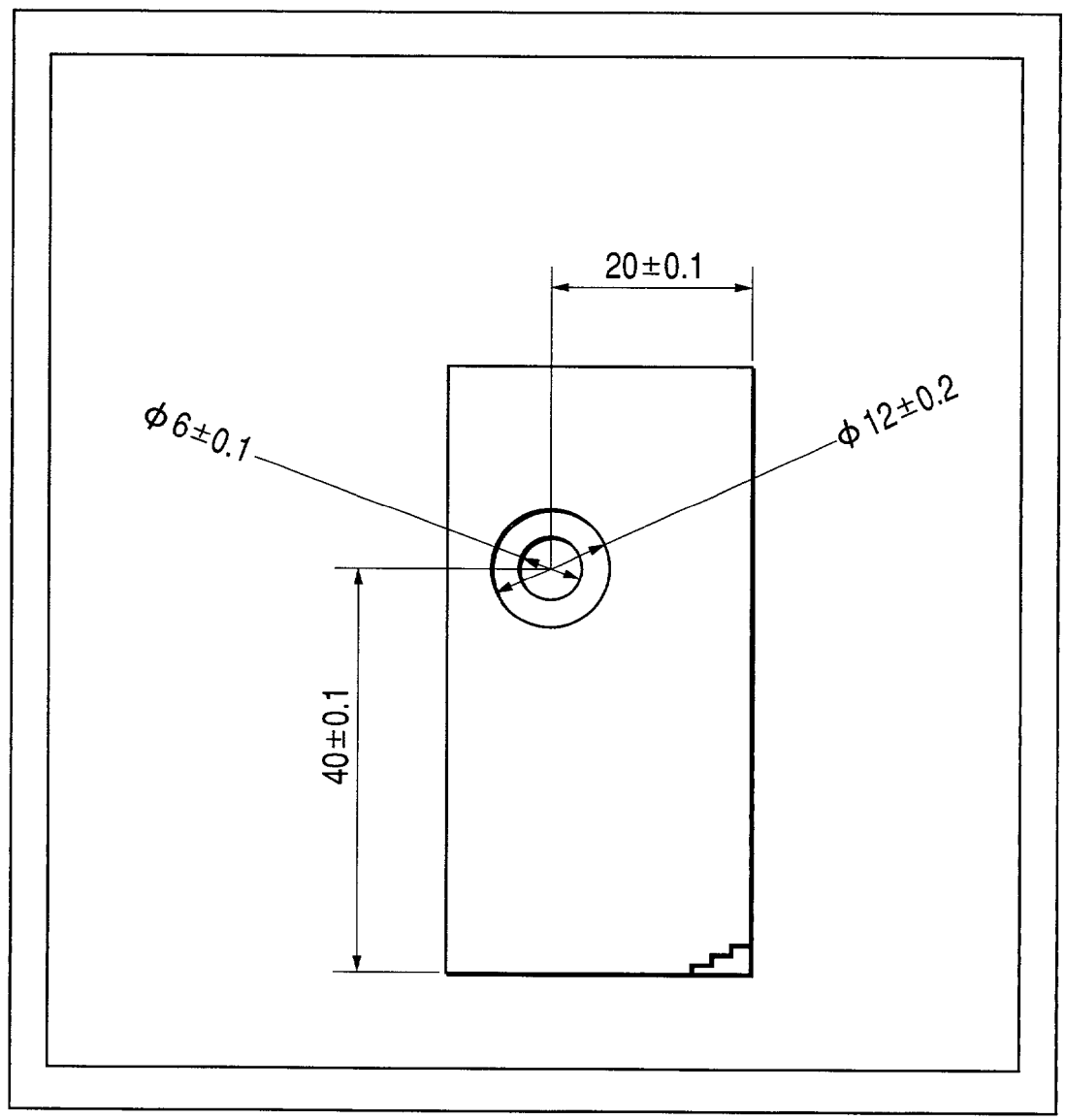
FIG. 22 is a diagram of the 3D model viewed from an attribution allocation plane 216 in FIG. 20.

FIG. 22 is a diagram showing attribution information groups concerning the position and the shape of the hole. The attribution information groups are correlated with the attribution allocation planes 215 and 216. Since the related attribution information is grouped and is allocated to the attribution allocation plane, the associated attribution information can be more easily seen.

(Location of Attribution Information)

In order to express a 3D model and attribution information to be added thereto so that they can be easily seen as a two-dimensional drawing, an operator selects or groups a plurality of attribution information for the portion of a 3D model to be expressed, and correlates the attribution information with the attribution allocation plane. So long as a two-dimensional drawing method is employed, the attribution information need only be allocated in an area in the visual direction of the correlated attribution allocation plane. However, for a so-called "3D drawing" where attribution information is added to a 3D model, some devices are required to satisfactorily demonstrate the merits of the 3D model.

One of the merits of the 3D model 1 is that, since the 3D model 1 can be three-dimensionally expressed on a display screen so its appearance is near that of the real object, the process (conventionally performed mainly in the mind of the operator) for the transformation from two dimensions to three dimensions, which is required for the preparation of a two-dimensional drawing, is not required for an operator who prepares a 3D model or an operator (a step designer, a metal mold designer/manufacturer, a measurer, etc.) who performs the next step using the 3D model. This transformation process depends greatly on the skill of the operator, and accordingly, erroneous transformations and the loss of transformation time occur.

In order to prevent the loss of the merit of the 3D model 1 represented by the three-dimensional expression of a model in a 3D drawing, certain devices are required for the three-dimensional display of attribution information (the location of attribution information).

A point to be contrived will now be described while referring to FIGS. 28A to 28D.

Figure 28A:
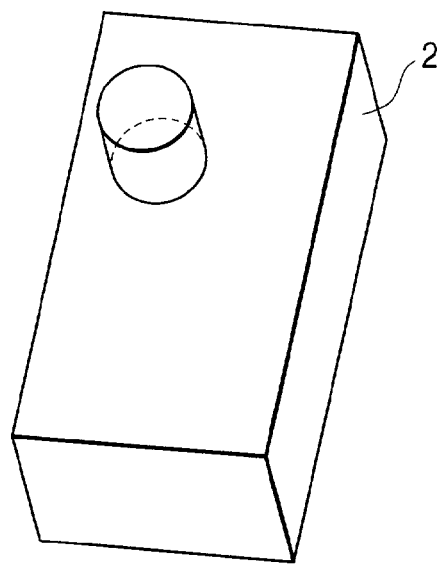
FIGS. 28A, 28B, 28C and 28D are diagrams showing an example 3D model.
Figure 28C:
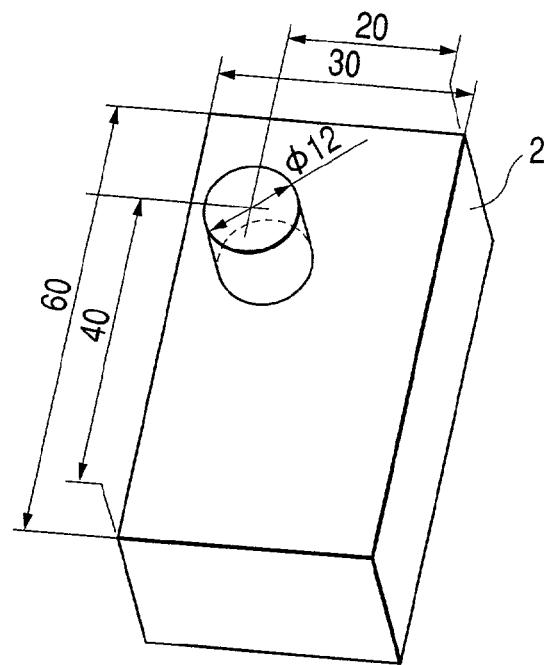
Figure 28B:
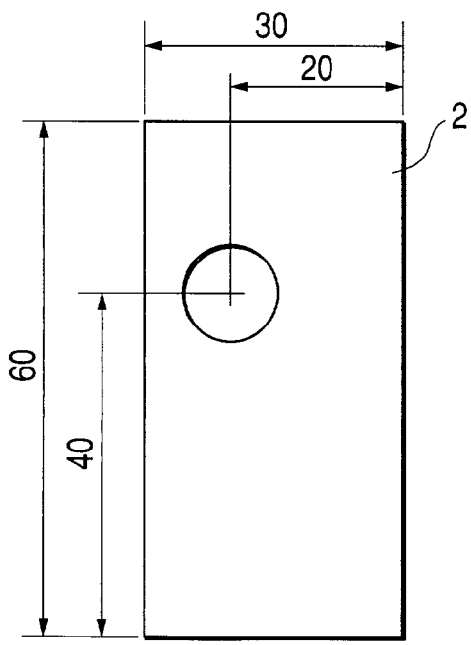
Figure 28D:
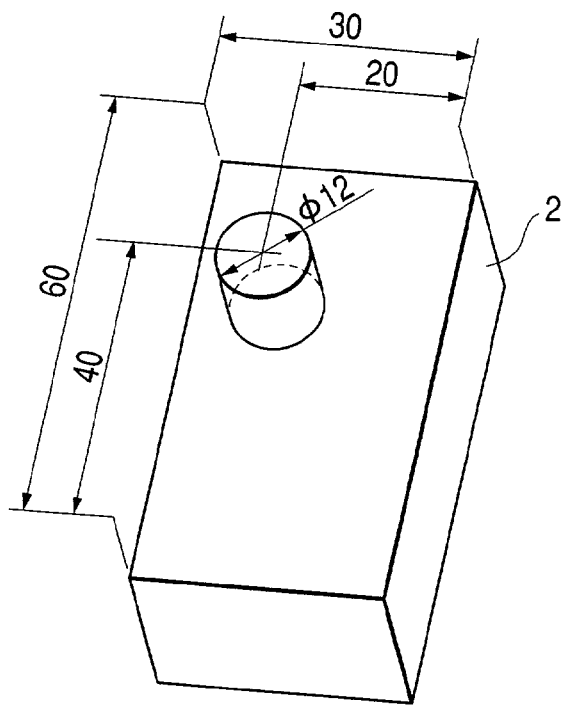
Figure 29A:
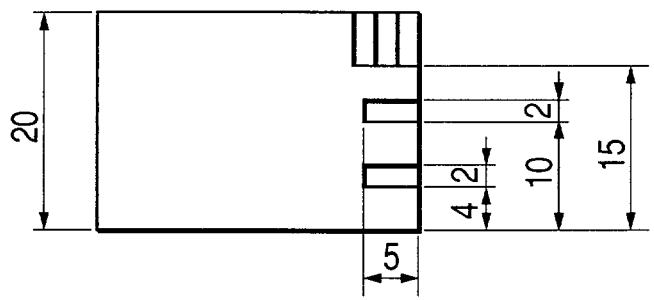
FIGS. 29A, 29B, 29C, 29D and 29E are diagrams for explaining the state wherein a 3D model and attribution information are represented two-dimensionally.
Figure 29B:
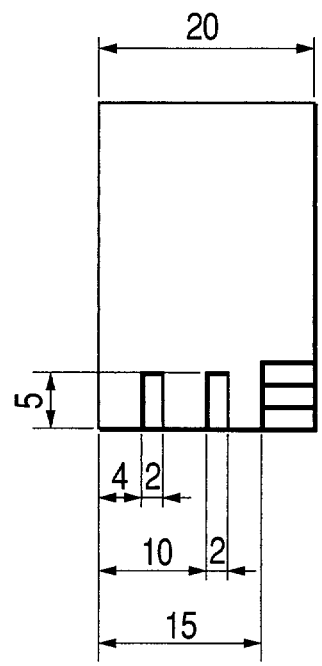
Figure 29C:
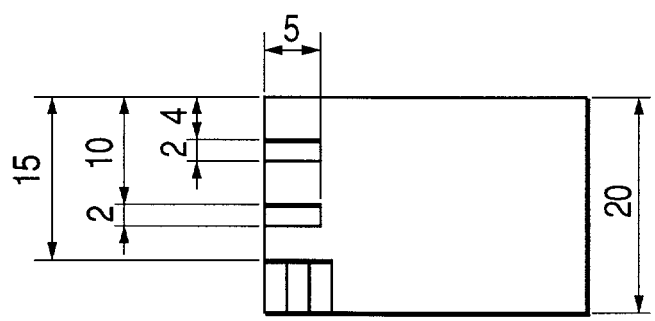
Figure 29D:
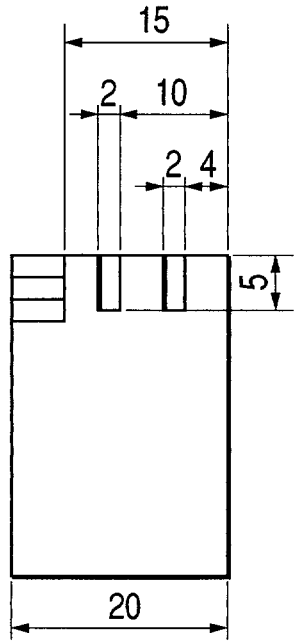
Figure 29E:
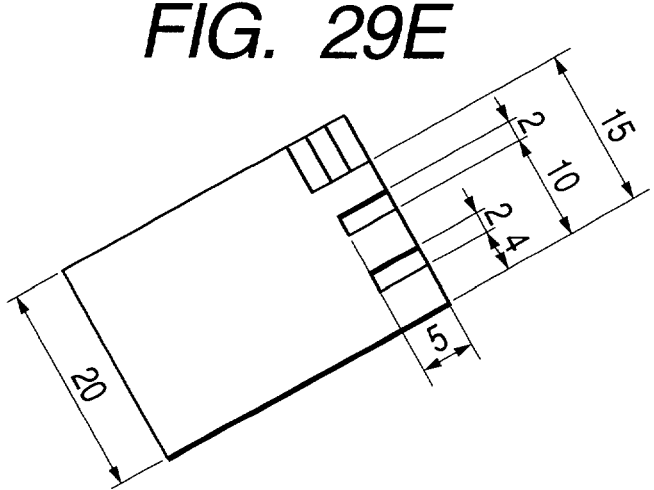

FIG. 28A is a perspective view of a 3D model 2 used for the explanation. FIG. 28B is a plan view of the 3D model 2. FIG. 28C is a perspective view for explaining the state wherein attribution information is added to the 3D model 2 without an allocation system being devised. FIG. 28D is a perspective view of the attribution information for which an allocation system has been devised.

First, an attribution allocation plane 218 is prepared and attribution information is entered in order to generate a two-dimensional plan view for the 3D model 2. The state wherein the 3D model 2 is displayed along the visual line of the attribution allocation plane 218 is shown in FIG. 28B.

When a plurality of attribution information allocation planes are alternately arranged as is shown in FIG. 28C in order to input attribution information, the attribution information sets are overlapped and it is difficult to identify the contents of the attribution information. Since as in FIG. 28C the contents of the attribution information are not easily seen even when only a small number of attributions is provided, it is easily assumed that, for a more complicated geometry, the attribution information will not be effective and that it will not be possible to establish the perspective state as a drawing.

However, when as is shown in FIG. 28D the attribution information sets are allocated on the same plane, the attribution information sets do not overlap each other and can be easily identified, as in the representation of the two-dimensional drawing in FIG. 28B.

In this manner, when the attribution information is added to the 3D model, as in the two-dimensional representation, the attribution information can be easily identified, while the merit of the 3D model, i.e., the three-dimensional representation, is employed. Thus, the obtained drawing can be used as a three-dimensional drawing.

Further, it is preferable that the plane whereon attribution information is to be allocated be the same plane as the attribution allocation plane.

In this example, a simple 3D model has been employed; however, when a more complicated 3D model is handled, a plurality of attribution allocation planes must be set in the same visual direction.

Assume that a plurality of attribution allocation planes and correlated attribution information are displayed together in order to select a desired attribution allocation plane or desired attribution information.

In this case, if the face whereon the attribution information is allocated is at a distance from the attribution allocation plane, the correlation of the attribution information and the attribution allocation plane is not easily perceived, and the attribution allocation plane or the attribution information may be erroneously selected. In order to prevent such an erroneous selection and make it easy to visually perceive the correlation, the attribution information should be allocated on the same plane as the attribution allocation plane.

Further, to generate the attribution allocation plane in the same visual direction as explained while referring to FIG. 20, a plurality of attribution allocation planes should be allocated in the same visual direction. When the attribution allocation planes and the correlated attribution information are displayed at the same time, and when the attribution allocation planes are generated on the same face, the face on which the attribution information is allocated is also on the same plane, the attribution information sets are overlapped and not easily identified, not only in the visual direction, but also in an oblique direction shifted away from the visual direction. Originally, because a large number of attribution information sets are provided in one direction, the attribution information sets are allocated for a plurality of attribution allocation planes, so that the overlapping of attribution information sets can not be avoided when they are displayed at the same time.

Even when no means is available to resolve the problem that attribution information can not easily be seen in the visual direction, arranging the attribution allocation planes at a distance in the same visual direction is an effective means for easily identifying the attribution information in the perspective state.

(Magnification)

When the attribution allocation plane is displayed at a desired magnification, a complicated or a detailed shape can more easily be seen.

Figure 23A:
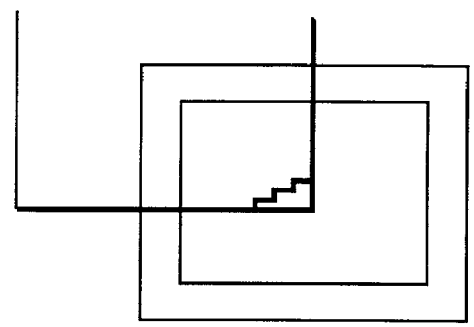
FIGS. 23A, 23B and 23C are diagrams showing the state wherein an attribution allocation plane is assigned for one part of a 3D model.
Figure 23B:
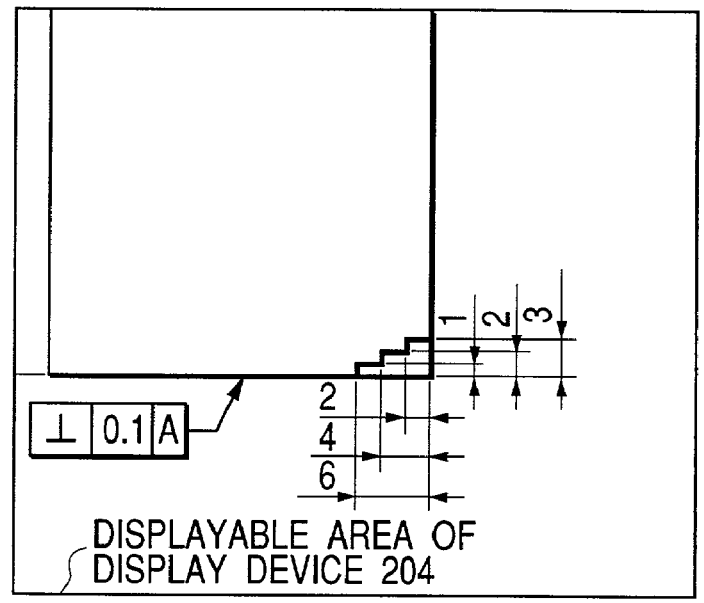
Figure 23C:
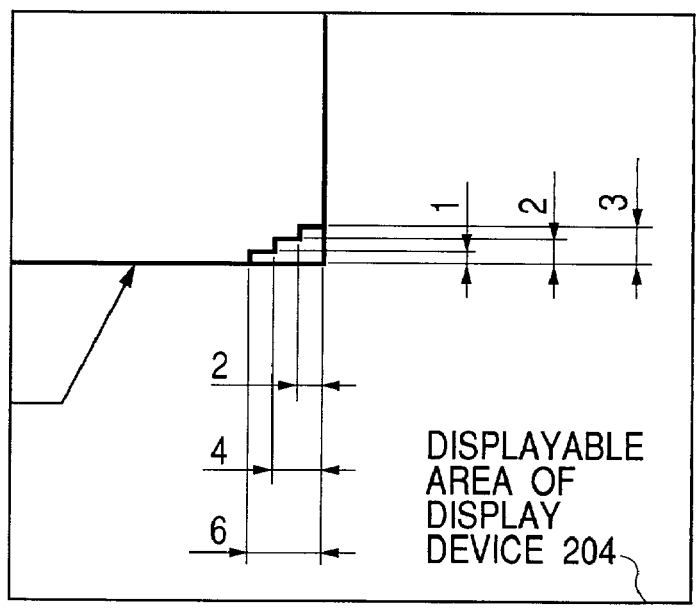
Figure 26:
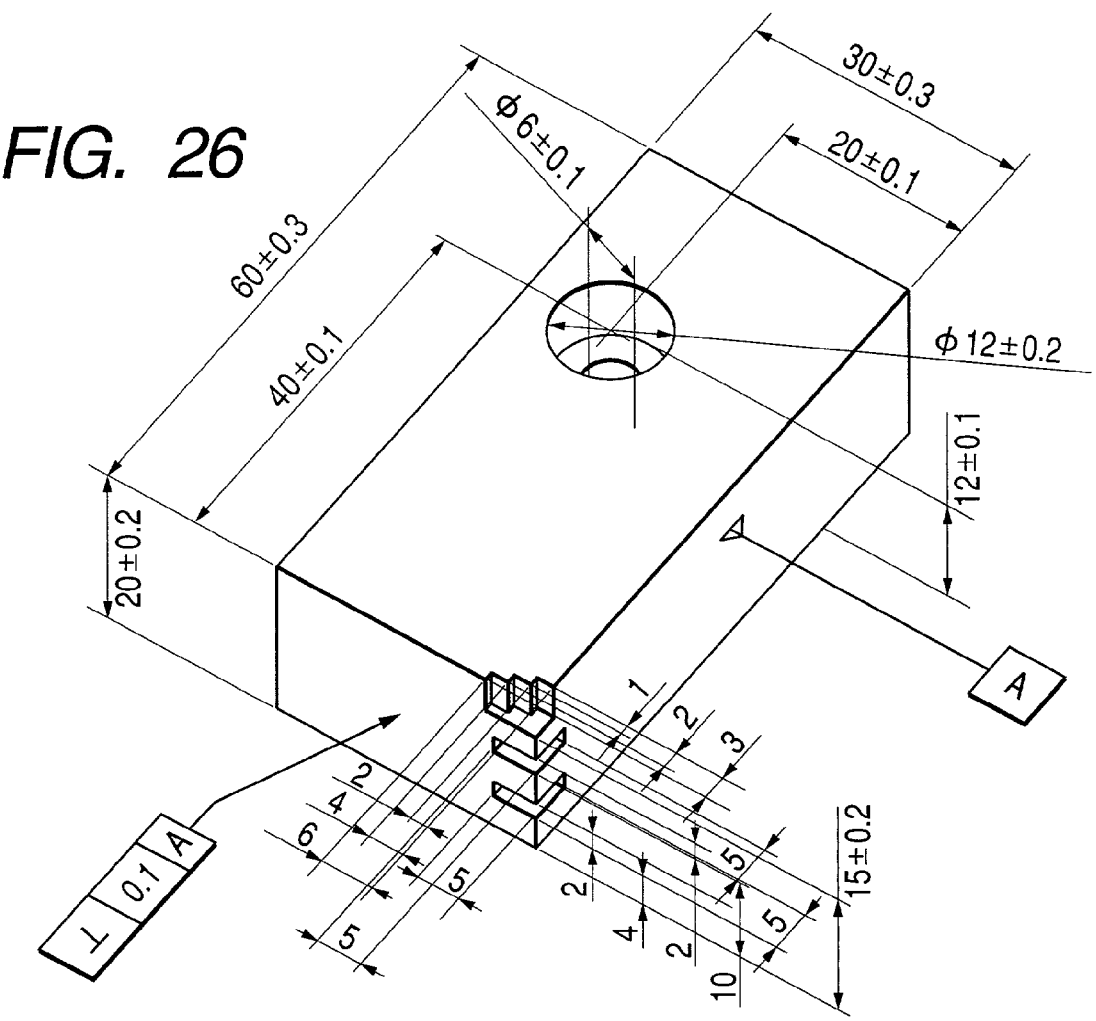
FIG. 26 is a diagram showing the state wherein attribution information is provided for the 3D model in FIG. 24.

FIGS. 23A to 23C are diagrams showing the state wherein the 3D model 1 is partially enlarged and displayed. As is shown in FIG. 23A, while the visual direction of the 3D model 1 is oriented toward the plan view, the visual line position is set near the corner and the magnification is set to 5, the attribution allocation plane 217 is provided for the 3D model 1, and the step-shape and the attribution information can be displayed so they are easily understood (FIG. 23B).

This embodiment is effective for all 3D-CAD and 2D-CAD systems, regardless of the hardware constituting a 3D-CAD apparatus or the method used to form a 3D model.

(Magnification and the Size of Attribution Information)

The size of attribution information (the height of a character or a symbol) correlated with an attribution allocation plane is changed in accordance with the magnification used for the attribution allocation plane (FIG. 23B).

The size (mm) of the attribution information is defined as the size in the virtual three-dimensional space wherein the 3D model is present (not the size when the attribution information is displayed on the display device 204).

Assume that the size of the attribution information is 3 mm for the attribution allocation plane 211 (magnification of 1). FIG. 23C is a diagram showing an example wherein the attribution information is also displayed with the character height of 3 mm for the attribution allocation plane 217 (a magnification of 5).

Since the attribution information correlated with the attribution allocation plane 217 is displayed at a magnification of "5", the size of the attribution information is 15 mm.

The square lines in FIGS. 23B and 23C indicate available display range for the display device 204.

When the attribution information sets are arranged so they are not overlapped, the position of the 3D model 1 is separated from that of the attribution information, so that the geometry of the 3D model 1 and the correlation with the attribution information are not easily understood, and an erroneous reading may occur. Further, when there are many attribution information sets to be displayed, all the attribution information sets can not be displayed on the display device 204, and extra labor for changing the display range is required in order for the attribution information to be seen outside the display available range.

If the size of a character is not changed for the display of a reduced size (magnification of less than "1"), the display area of the attribution information on the display device 204 becomes smaller while the image at the reduced size is displayed. As a result, the contents of the attribution information can not be read.

Therefore, it is preferable that, while taking into account the time that the attribution information is to be displayed, the size of the attribution information be changed in accordance with the magnification.

Thus, the magnification should be approximately inversely proportional to the size of the attribution. As an example, when the magnification of the attribution allocation plane 211 is "1" and the size of the attribution information is 3 mm, the size of the attribution information correlated with the attribution allocation plane 217 is set to 0.6 mm.

Selection of a Plurality of Attribution Allocation Planes

In this embodiment, to display attribution information correlated with an attribution allocation plane, only one attribution allocation plane is selected. An explanation will now be given for a case where a plurality of attribution allocation planes are selected.

Since there is only one visual position and one visual direction when a single attribution allocation plane is selected, only one display method is employed for the display device. When a plurality of attribution allocation planes are selected, a plurality of display methods must be employed, so that some display means is required. For example, all the attribution information correlated with a plurality of selected attribution allocation planes may be displayed, and the setting for a specific attribution allocation plane can be selected and used for the visual position and the visual direction.

Further, the attribution information can be displayed by using a different color for each correlation attribution allocation plane, so that different attribution information groups can be easily identified.

Horizontal or Vertical Setting of an Attribution Allocation Plane

Thus far, only the setting of the visual position, the visual direction and the magnification according to the present invention has been explained, and no explanation has been given for the horizontal or vertical setting of the attribution allocation plane.

In the two-dimensional drawing, rules are provided for the allocation of views (a plan view, a front view and a side view) obtained in the individual visual directions in FIG. 25. This is because the positional relationship viewed in each visual direction must be easily understood in order to represent the actual three-dimensional geometry on a two-dimensional plane.

For the 3D drawing, whereat the attribution information is added to the 3D model, it is possible to provide not only the two-dimensional representations (FIGS. 9, 10B and 11B) viewed in the direction perpendicular to the external face of the 3D model, but also the three-dimensional representations (FIGS. 10A and 11A) that are viewed in the oblique direction by rotating the 3D model in the two-dimensional state.

Therefore, in the three-dimensional representation, the horizonal or vertical direction (it is assumed that the horizontal and vertical directions match the corresponding directions on the display screen) of the attribution allocation plane need not be specifically defined in order to display the plan view, the front view and the side view. So long as the 3D model and the attribution information attached thereto are correctly expressed, all the representations in FIGS. 29A to 29E can be correct representations. Further, when the 3D model is rotated slightly, the 3D model can be displayed three-dimensionally, and it is easy to identify in what part of the 3D model the currently displayed portion is located, and to easily understand the plan view and the side view taken in another visual direction. Thus, no special problem is encountered when the 3D model is displayed in the horizontal or vertical direction of the attribution allocation plane without taking into account the positional relationship of the visual directions.

However, in the three-dimensional drawing wherein attribution information is added to the 3D model, not all the operator conditions can be such that the operators can be freely rotated to display a 3D model. This is because there are some offices that do not require that a 3D drawing be corrected, and that need only store and read, as digital data, the two-dimensional image data displayed on each attribution allocation plane. Furthermore, there are also offices that can cope with only conventional paper drawings.

On this assumption, a rule used for the two-dimensional drawing must be employed for the display viewed in each visual direction.

Thus, before generating the attribution allocation plane, the horizontal or vertical direction for the display of the 3D model on the display device 204 must be set.

Figure 30:
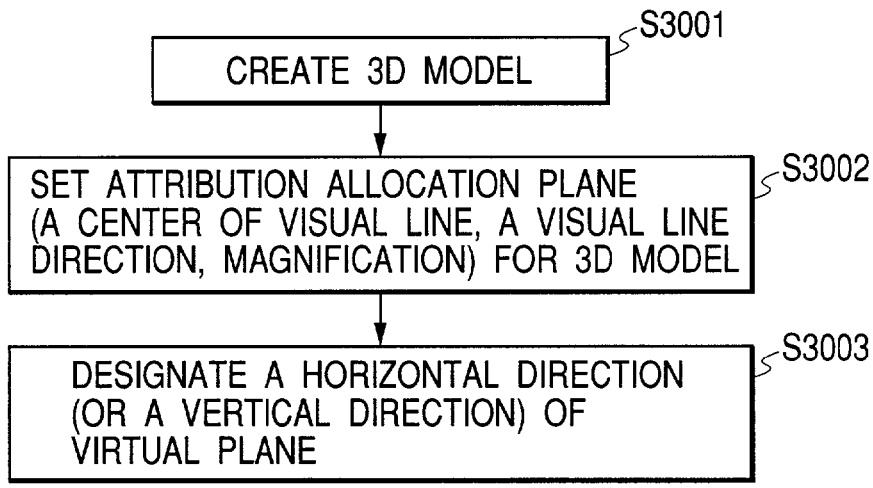
FIG. 30 is a flowchart showing the processing for setting a direction in which an attribution allocation plane is displayed.

FIG. 30 is a flowchart for this process.

First, a 3D model is created (step S3001).

Then, the visual position, the visual direction and the magnification for the 3D model are set, and the attribution allocation plane is generated (step S3002).

The horizontal direction (or the vertical direction) of the attribution allocation plane is designated (step S3003). For this designation, the three axial directions (X, Y and Z) present in the (virtual) three-dimensional space may be selected, or the direction of the ridge line of the 3D model or the vertical direction of the plane of the 3D model may be selected.

When the horizontal direction (or the vertical direction) of the attribution allocation plane is designated, the positions whereat the 3D model and the attribution information are displayed are determined by selecting the attribution allocation plane.

To create another attribution allocation plane, the horizontal direction (or the vertical direction) need only be designated while maintaining the visual direction of the created attribution allocation plane.

(Method for Displaying Attribution Information)

In the explanation given for the embodiment, as a method for selectively displaying attribution information entered for the 3D model, first, an attribution allocation plane is selected, and then, attribution information correlated with the attribution allocation plane is displayed as needed. The embodiment is not limited to this method, however. As another effective method, attribution information is selected, and the 3D model and the attribution information are displayed at the visual position, in the visual direction and at the magnification for the attribution allocation plane correlated with the attribution information.

Figure 31:
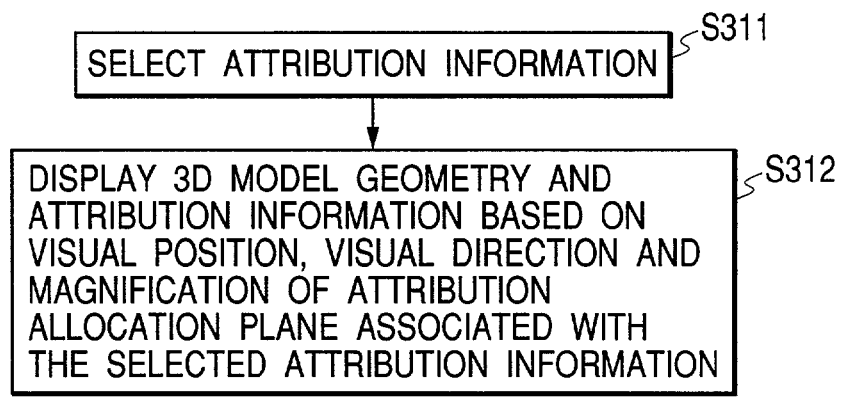
FIG. 31 is a flowchart showing the processing for displaying a 3D model using attribution information as a key.

FIG. 31 is a flowchart showing the processing sequence for the selection and display of attribution information.

When the 3D model and the attribution information in the plan view in FIG. 8 are displayed, a cylindrical projection ϕ12±0.2 is selected (step S311).

The 3D model and the attribution information correlated with the attribution allocation plane 211 are displayed based on the visual position, the visual direction and the magnification that are set for the attribution allocation plane 211 (step S312). In this case, the front view in FIG. 9 is positively displayed.

Therefore, since the relationship of the selected attribution information and the 3D model is displayed two-dimensionally, the relationship can be easily identified.

(Plane Selection Method)

In this embodiment, as a method for selectively displaying attribution information entered for the 3D model, first, an attribution allocation plane or attribution information is selected, and then, the attribution information correlated with the attribution allocation plane is displayed as needed, based on the setting for the attribute allocation plane. The embodiment is not limited to this method, however. As another effective method, the geometric information (Geometry) for the 3D model is selected, the attribution information correlated with the geometric information is displayed, and the 3D model and the attribution information are displayed at the visual position, in the visual direction and at the magnification for the attribution allocation plane correlated with the attribution information.

Figure 32:
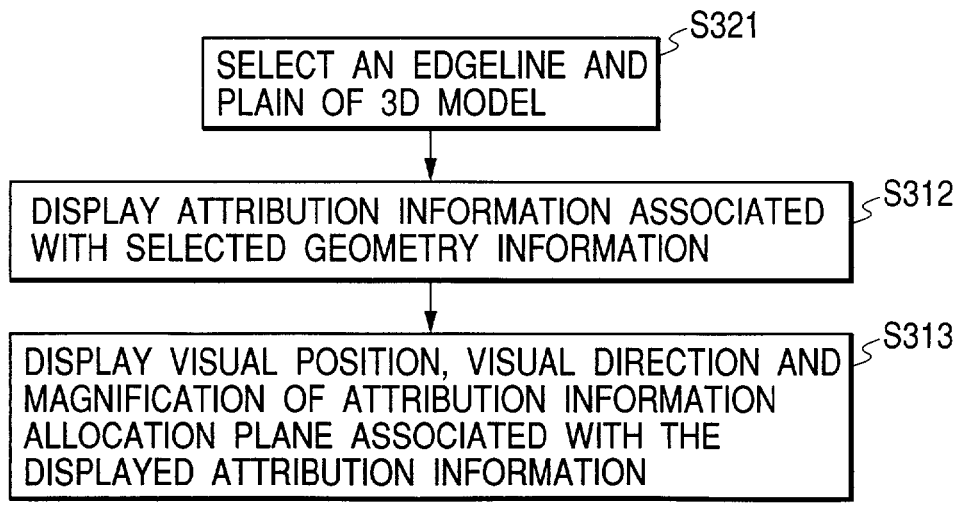
FIG. 32 is a flowchart showing the processing for displaying a 3D model using geometry information as a key.

FIG. 32 is a flowchart showing the processing sequence for the selection and the display of attribution information.

Geometric information (ridge lines, planes and vertexes) for the 3D model is selected (step S321).

Attribution information correlated with the selected geometric information is then displayed (step S322).

When there are a plurality of correlated attribution information sets, all of them may be displayed. Further, all the attribution information belonging to attribution information planes with which attribution information is correlated may be displayed.

Next, the 3D model and the attribution information are displayed based on the visual position, the visual direction and the magnification (the horizontal direction of the attribution allocation plane) of the attribution allocation plane correlated with the displayed attribution information. At this time, when a plurality of attribution allocation planes are to be selected, the operator is permitted to select the planes that are to be displayed.

Since correlated attribution information can be searched for and displayed using the geometry of the 3D model as a key, this is a very practical method.

Selection of geometric information→display of correlated attribution information (single set)→display of attribution information at a position on a correlated attribution allocation plane.

Selection of geometric information→display of correlated attribution information (single set). Display all the attribution information correlated with an attribution allocation plane.

Selection of geometric information→display of correlated attribution information (multiple sets)→display of attribution information sets at positions on a single correlated attribution allocation plane.

Selection of geometric information→display of correlated attribution information (multiple sets). Display all the attribution information sets correlated with attribution allocation planes.

Selection of geometric information→display of correlated attribution information (multiple sets)→display of attribution information sets at positions on multiple correlated attribution allocation planes.

Selection of geometric information→display of correlated attribution information (multiple sets). Display all the attribution information sets correlated with attribution allocation planes.

(Display and Use)

An explanation will now be given for the processing for displaying and employing a 3D model to which the thus generated attribution information is added.

Data for a 3D model, to which the attribution information prepared by the information processing apparatus in FIG. 1 is added, can be transmitted by the information processing apparatus directly or via an external connecting device, and can be displayed by another information processing apparatus, as in FIG. 2, at the steps in FIG. 1.

First, an operator, a design engineer who designs products/units/parts, positively displays a generated 3D model in the manner shown in FIGS. 9, 10B and 11B, so that new attribution information can be added to a 3D model as though a two-dimensional drawing was being prepared. For example, when the shape of a 3D model is complicated, as needed, the three-dimensional representation and the two-dimensional representation for the 3D model are alternately displayed, or are displayed on the same plane. Thus, desired attribution information can be entered efficiently and accurately.

Further, an operator who is to examine/approve the generated 3D model displays and examines it by displaying the representations of the 3D model shown in FIGS. 9, 10B and 11B on the same plane or alternately. Then, marks or symbols indicating "inspected", "OK", "NG", "suspended" and "re-examination required", or attribution information, such as coloring, are added. In this case, it is natural for the operator to examine the 3D model by, as needed, comparing it with or referring to a plurality of products/units/parts.

Furthermore, a design engineer or a designer other than the creator of a 3D model may refer to the generated 3D model to design another product/unit/part. By referring to the 3D model, it is easy to apprehend the intent of the creator or the design method.

Further, when preparing a 3D model for use in manufacturing, an operator can add to it required information or attribution information. In this case, the operator is an engineer tasked with setting up the processing for the manufacture of products/units/parts. The operator instructs the use of a process type and tools, or adds corners R or the chamfering of ridge lines, angular portions or corners that is required for the machining of the 3D model. Either this, or the operator instructs a measurement method to be used for a dimension or a dimensional tolerance, adds measurement points to a 3D model, or enters measurement notes. The operator can efficiently perform this operation by referring to the representations shown in FIGS. 10B and 11B, which are easy to apprehend visually, and by, as needed, confirming the geometry three-dimensionally.

An operator can obtain information required for a desired preparation from the 3D model or the attribution information. In this case, the operator is a design engineer tasked with designing metal molds, tools and various types of devices required for manufacturing the 3D model. The operator apprehends the shape of the 3D model by referring to its representation in three-dimensional space, and extracts required information, which is easily perceived visually, from the representations shown in FIGS. 9, 10B and 11B. Then, based on the attribution information, the operator designs metal molds, tools and devices. When, for example, the operator is a metal mold designer, based on the 3D model and the attribution information, the operator designs metal molds by examining their structure, and adds, as needed, the corners R and the chamfering to ridge lines, angular portions and corners that are required for the manufacture of metal molds. Further, when a metal mold is a resin injection molded type, the operator adds a draft angle required for the molding of the 3D model.

Furthermore, an operator who is responsible for the manufacture of products/units/parts can also employ this embodiment. In this case, the operator will be a product/unit/part machining or assembly engineer. While referring to the representations in FIGS. 9, 10B and 11B, which are easily apprehended visually, and, as needed, confirming the shape three-dimensionally, the operator efficiently and accurately obtains the measurement method used for dimensions or dimension tolerances, the measurement points and the notes provided for the measurements and begins to perform the inspection, measurement and evaluation operation. Then, again as needed, the operator can add to the 3D model, as attribution information, the inspection, measurement and evaluation results that are thus provided. The operation can provide, for example, measurement results corresponding to the dimensions. In addition, the operator enters marks or symbols for the attribution information or for portions of the 3D model for which the dimensional tolerances are exceeded, or to indicate defects, such as scratches. Further, in addition to the examination results, marks or symbols indicting "inspected", "measured" and "evaluated" or coloring may be provided.

Moreover, an operator who works for a department, or is responsible for the manufacture of products/units/parts can employ this embodiment. In this case, the operator is a person tasked with analyzing manufacturing costs, a person responsible for the ordering of products/units/parts or various associated parts, or a person charged with overseeing the creation of operation manuals or the preparation of packing materials for products/units/parts. In this case, also while referring to the 3D model three dimensionally, the operator can easily apprehend the shape of a product/unit/part, and can efficiently perform his or her job by referring to the representations in FIGS. 9, 10B and 11B, which are easily perceived visually.

Input an Inspection Instruction

An inspection instruction will now be described.

As is described above, in order to inspect a produced metal mold or part, a 3D model is displayed for which dimensions have previously been allocated.

During this processing, attribution information is entered for an attribution allocation plane that was previously designated so that a position to be inspected is clearly displayed.

Specifically, a 3D model is formed, and the sequential inspection order, the positions to be inspected and the inspection entries for planes, lines and ridge lines are input. By conducting the inspection in the order designated, the number of inspection steps is reduced.

First, the entries and positions to be inspected are entered and the overall display is presented. Then, using a predetermined method, the inspection order is assigned for the individual entries. For an actual inspection, an attribution allocation plane is selected by designating the inspection order, and on the attribution allocation plane, in order to clearly identify the inspection positions, faces at the positions to be inspected are displayed in different forms (different colors).

Then, the inspection results provided and whether remolding is required are input for the individual designated inspection entries.

As is described above, according to the embodiment, an easy to see screen can be obtained by performing a simple operation for which attribution allocation planes and attribution information are used. Further, the relationship between the visual direction and the attribution information can also be perceived at a glance. Furthermore, since dimensional values are input in advance, erroneous readings, the result of operator manipulation errors, can be reduced.

In addition, since only information correlated with the visual direction can be read, required information can be easily obtained.

Moreover, since a large amount of attribution information in the same visual direction is allocated to a plurality of attribution allocation planes, an easy to see screen can be presented, and required information can be easily obtained.

Also, since an attribution allocation plane is set inside the 3D model, i.e., in its cross section, correlated attribution information can be displayed so that it is easily understood.

Since the size of attribution information is changed in accordance with the display magnification for the attribution allocation plane, the attribution information can be appropriately represented so it can be identified easily.

Further, since the attribution information is provided on the attribution allocation plane, it can be read even from a three-dimensional oblique view of the 3D model.

Furthermore, since by using the attribution information as a key the attribution allocation plane can be searched and only information correlated with the attribution allocation plane can be read, required information can be easily obtained.

And in addition, since by using the geometric information as a key the attribution information and the attribution allocation plane can be searched for and only information correlated with the attribution allocation information can be read, required information can be easily obtained.

(View)

Figure 33:
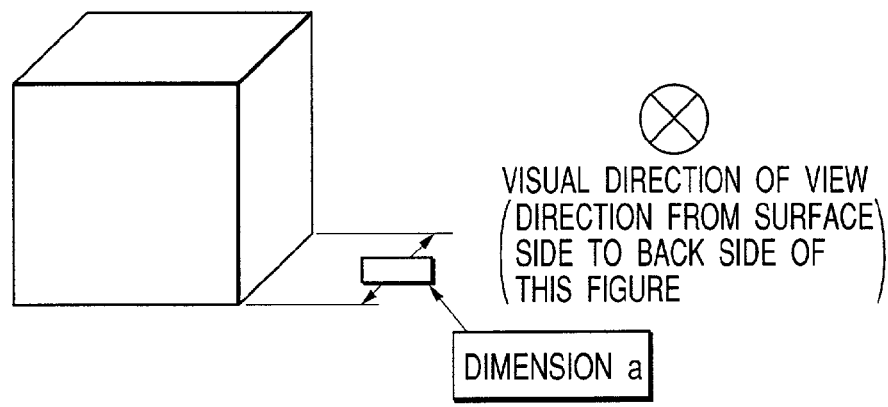
FIG. 33 is a diagram showing the state wherein a view is displayed in correlation with attribution information.

FIG. 33 is a diagram showing the state wherein a dimension a, which is attribution information, is correlated with a view.

As is shown in FIG. 33, the attribution information is positioned in the visual direction of the view (the perpendicular direction from the surface side of the paper to the face of the paper).

As well as the attribution allocation plane, the view is defined by the visual direction, the visual position and the magnification, and is correlated with the attribution information. However, unlike the attribution allocation plane, the attribution information is not located on the same plane as the view.

Figure 34A:
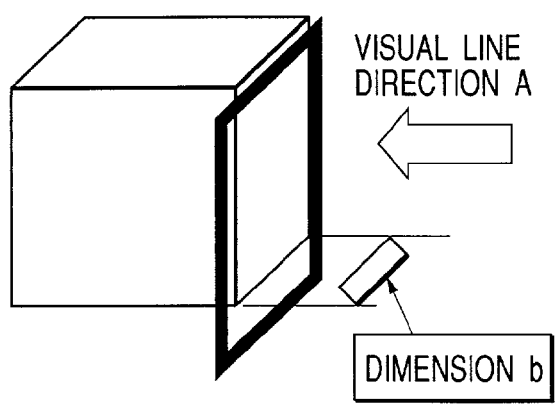
FIGS. 34A and 34B are diagrams showing the state wherein attribution information is displayed in correlation with an attribution allocation plane.
Figure 34B:
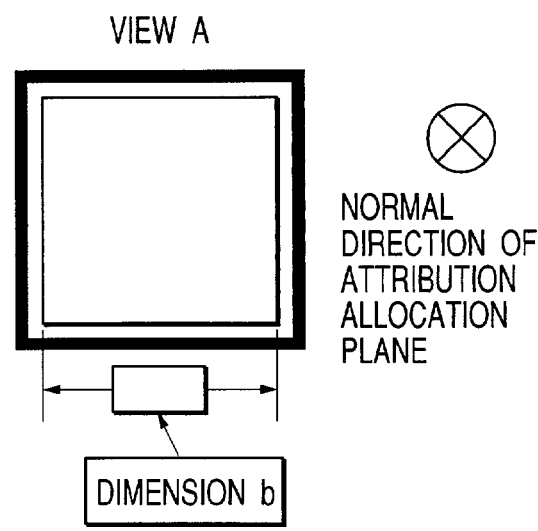

Similarly, FIGS. 34A and 34B are diagrams showing the state wherein a dimension b, which is attribution information, is correlated with the attribution allocation plane. The plane in FIG. 34B is the one viewed in the visual direction indicated by an arrow A in FIG. 34A. As is shown in FIGS. 34A and 34B, the dimension b, which is the attribution information, is positioned in the normal direction indicated by the arrow A of the attribution allocation plane.

Figure 35A:
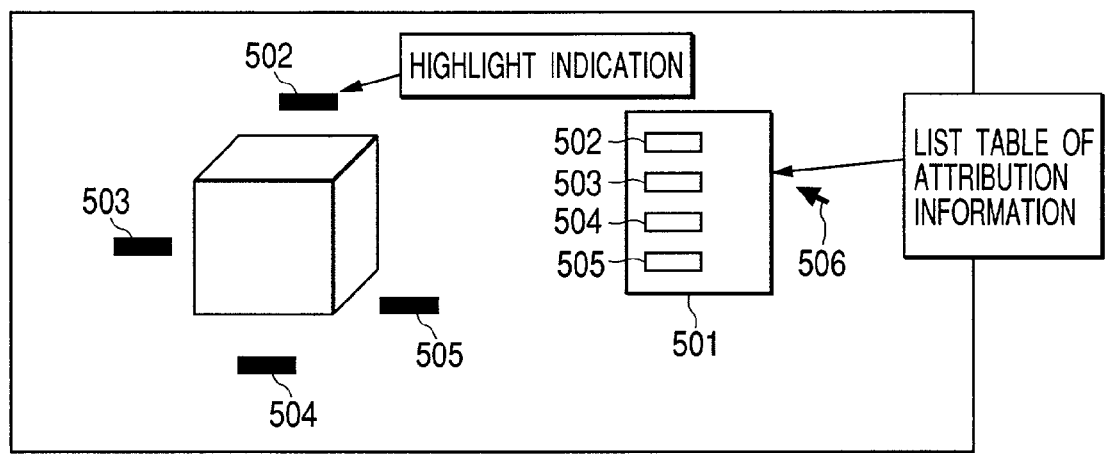
FIGS. 35A and 35B are diagrams showing the state wherein attribution information is correlated with a view.
Figure 35B:
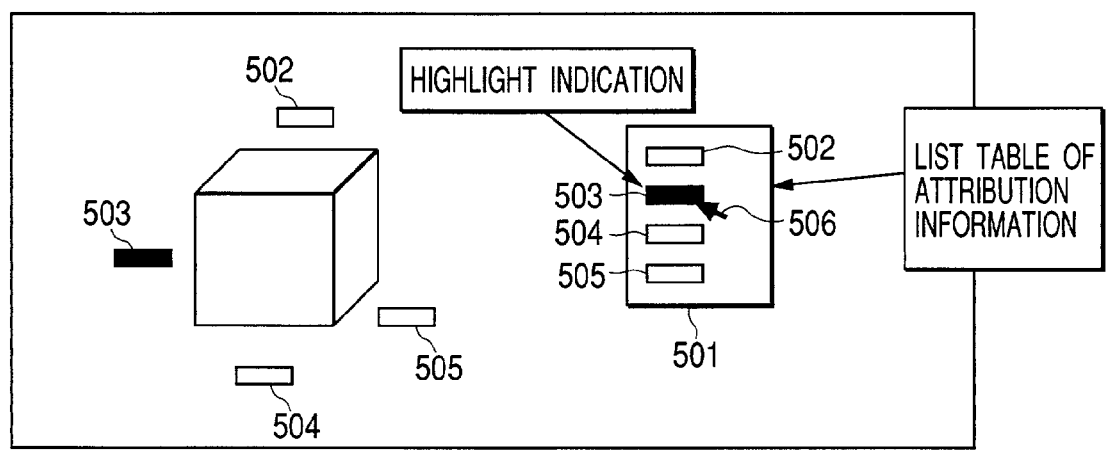

FIGS. 35A and 35B are diagrams showing the state wherein the attribution information correlated with the views are displayed. When one view is selected, a list 501, including attribution information sets 502 to 505 correlated with the selected view, is displayed. When a view is selected in accordance with a view selection command, all the attribution information sets 502 to 505 correlated with the selected view are highlighted (FIG. 35A). When a pointer 506 is provided for each attribution information set on the list 501, only the attribution information 503 is highlighted (FIG. 35B). The current state on the screen may be either the state of a view to which the attribution information sets 502 to 505 are correlated, or the state of another view.

Figure 36A:
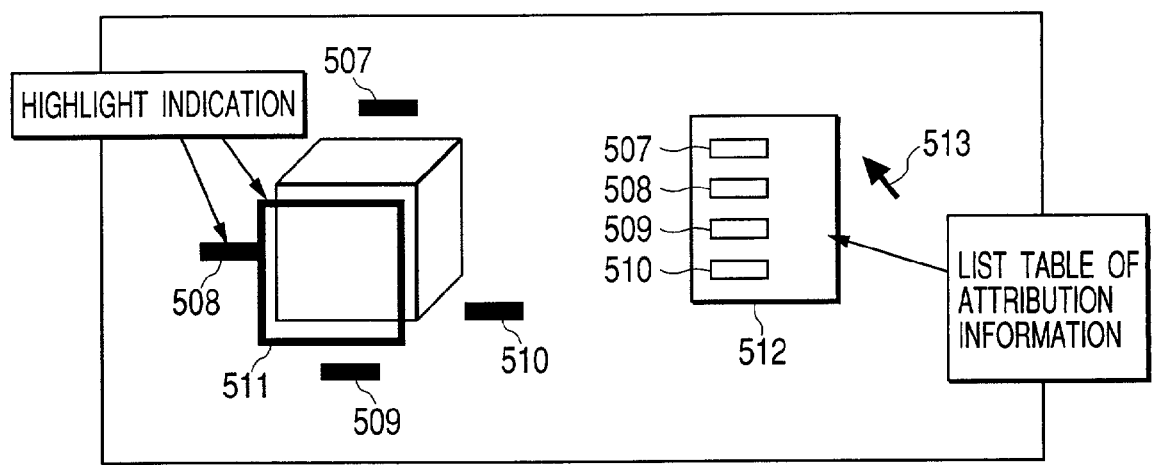
FIGS. 36A and 36B are diagrams showing the state wherein attribution information is correlated with an attribution allocation plane.
Figure 36B:
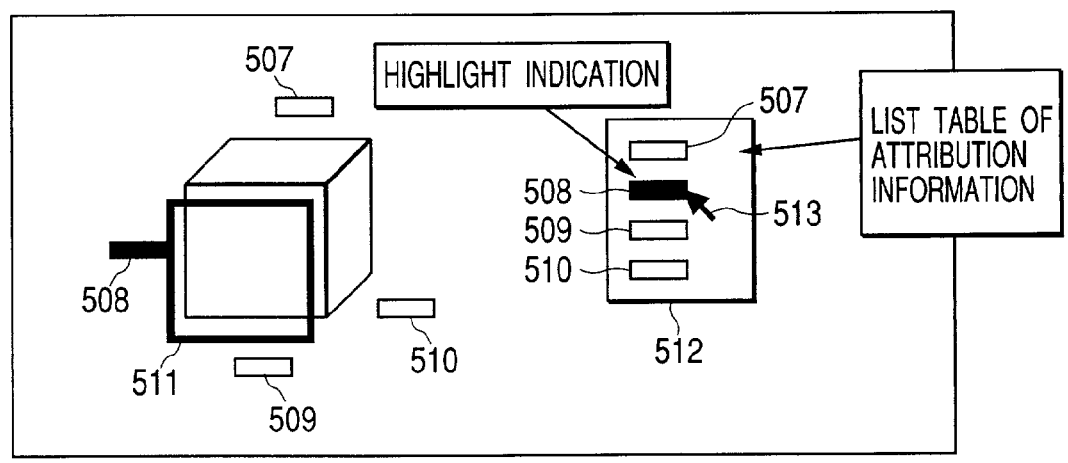

FIGS. 36A and 36B are diagrams showing the state wherein attribution information correlated with an attribution allocation plane is displayed. In FIG. 36A, when a list of attribution allocation planes is displayed in accordance with an attribution allocation plane selection command, and when one attribution allocation plane 511 is selected on the list, a list 512 of attribution information sets correlated with the attribution allocation plane 511 is displayed. When the attribution allocation plane 511 is selected, the list 512 is displayed, and at the same time, all the attribution information sets related to the attribution information sets 507 to 510 and the frame of the attribution allocation plane 511 are highlighted. In FIG. 36B, when a pointer 513 is moved to the name of the attribution information 508 on the list 512, only the attribution information 508 is highlighted on the screen.

Figure 37:
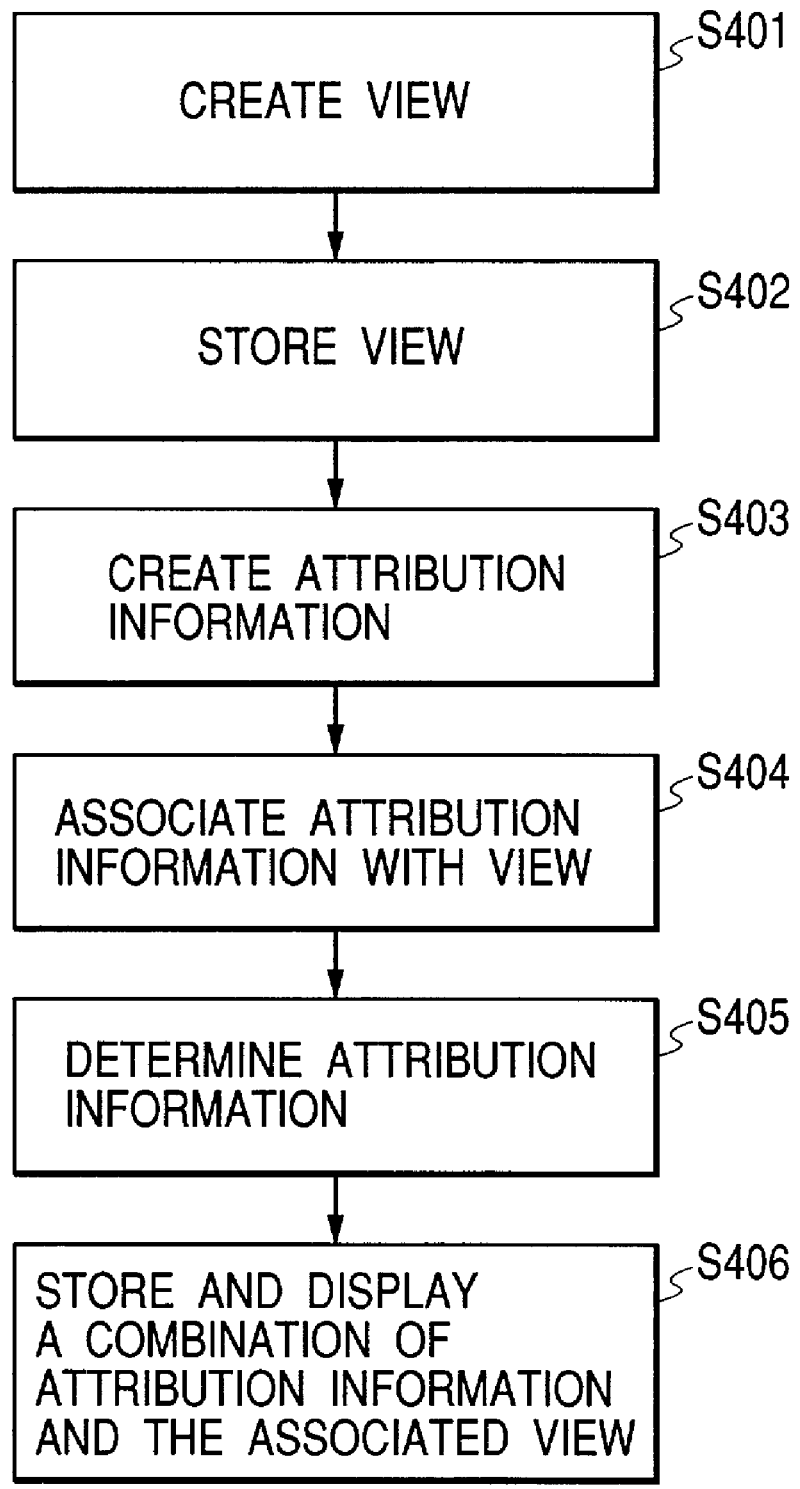
FIG. 37 is a flowchart showing the processing for generating a new view and for correlating attribution information with the new view.

FIG. 37 is a flowchart showing the processing for generating attribution information and correlating it with a view. First, a view is created (step S401) and the direction and the position of the view are stored in the storage means (step S402). Then, attribution information is generated (step S403) and is correlated with the view (step S404). The direction of the attribution information is arranged at the position of the correlated view (step S405). The pair consisting of the attribution and the correlation view, and the direction of the attribution information are stored in the storage means, and are displayed (step S406).

Once the view attribution information is to be correlated with is set, all the attribution information that is generated is correlated with the pertinent view, until the setting is changed.

Figure 44:
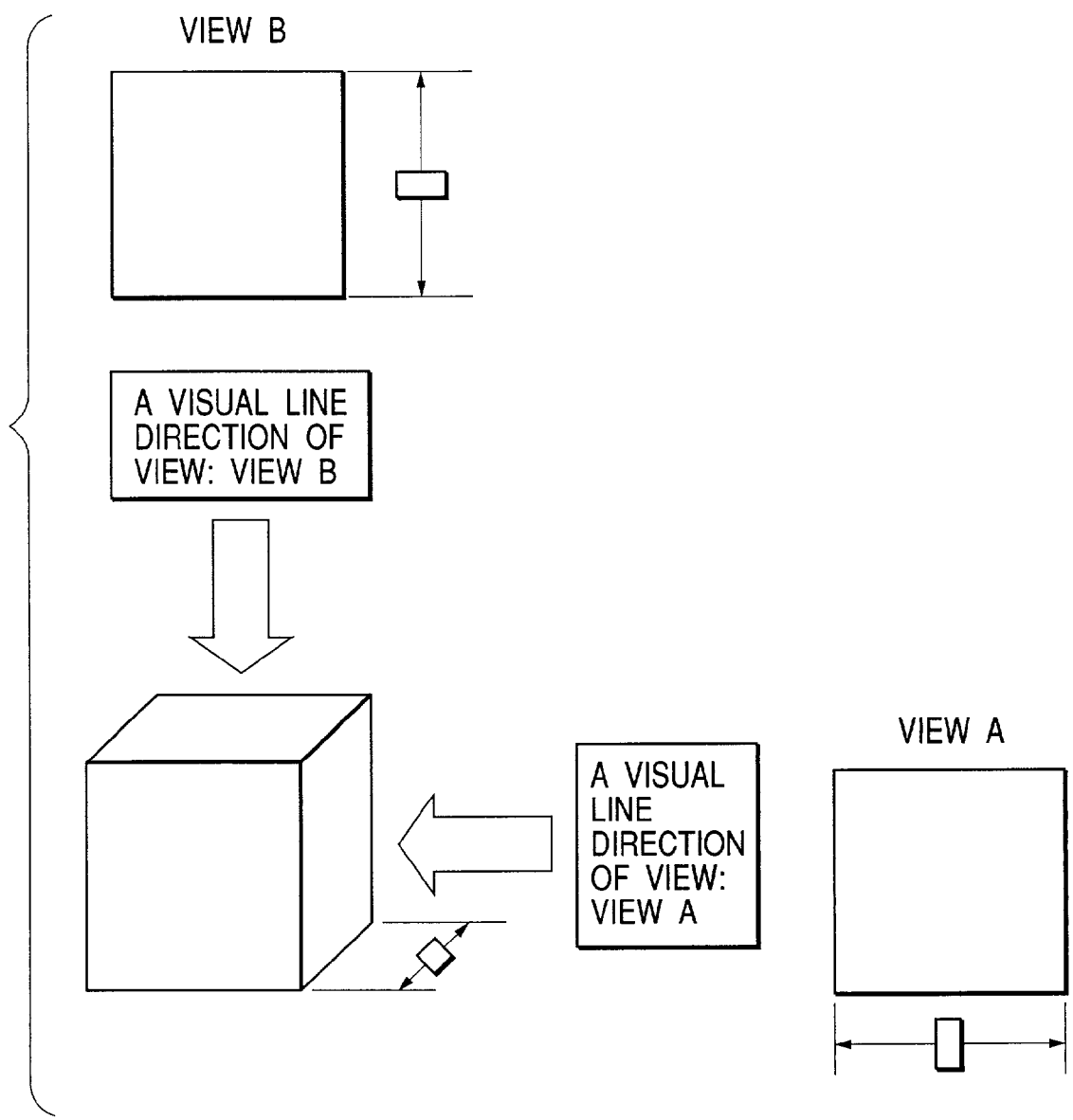
FIG. 44 is a diagram showing the state presented when attribution information is correlated with a plurality of views.

One attribution information set need not be correlated with only one view, and can be correlated with a plurality of views and displayed (FIG. 44).

Figure 45:
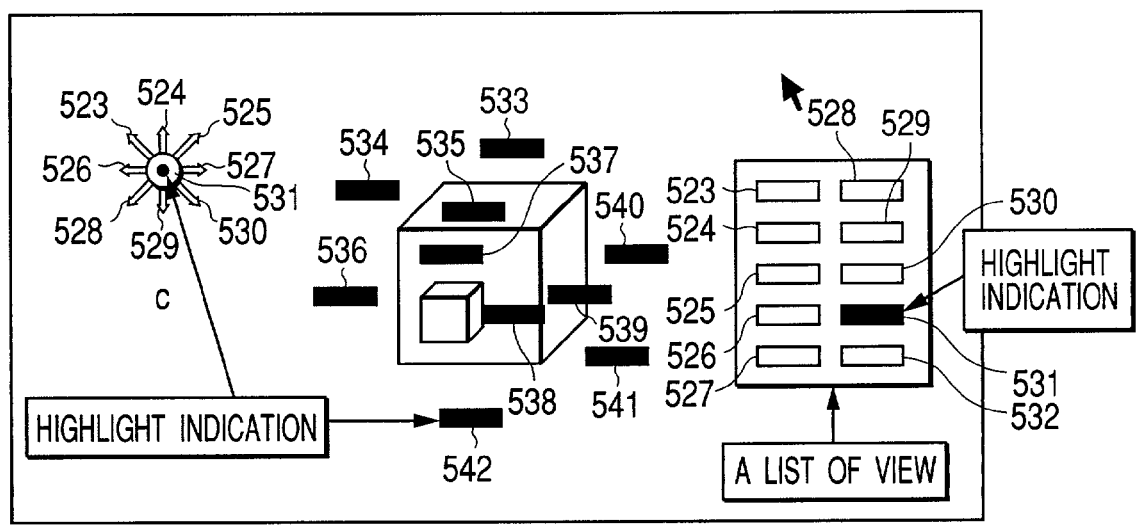
FIG. 45 is a diagram showing the state wherein attribution information can be correlated not with only a view currently displayed on a screen, but also with another desired view.

Further, the attribution information need not only be correlated with a view currently displayed on the screen, but also with another desired view. In FIG. 45, for example, a view 531 is currently displayed; however, on this screen, attribution information can be correlated with a view 523.

Figure 38:
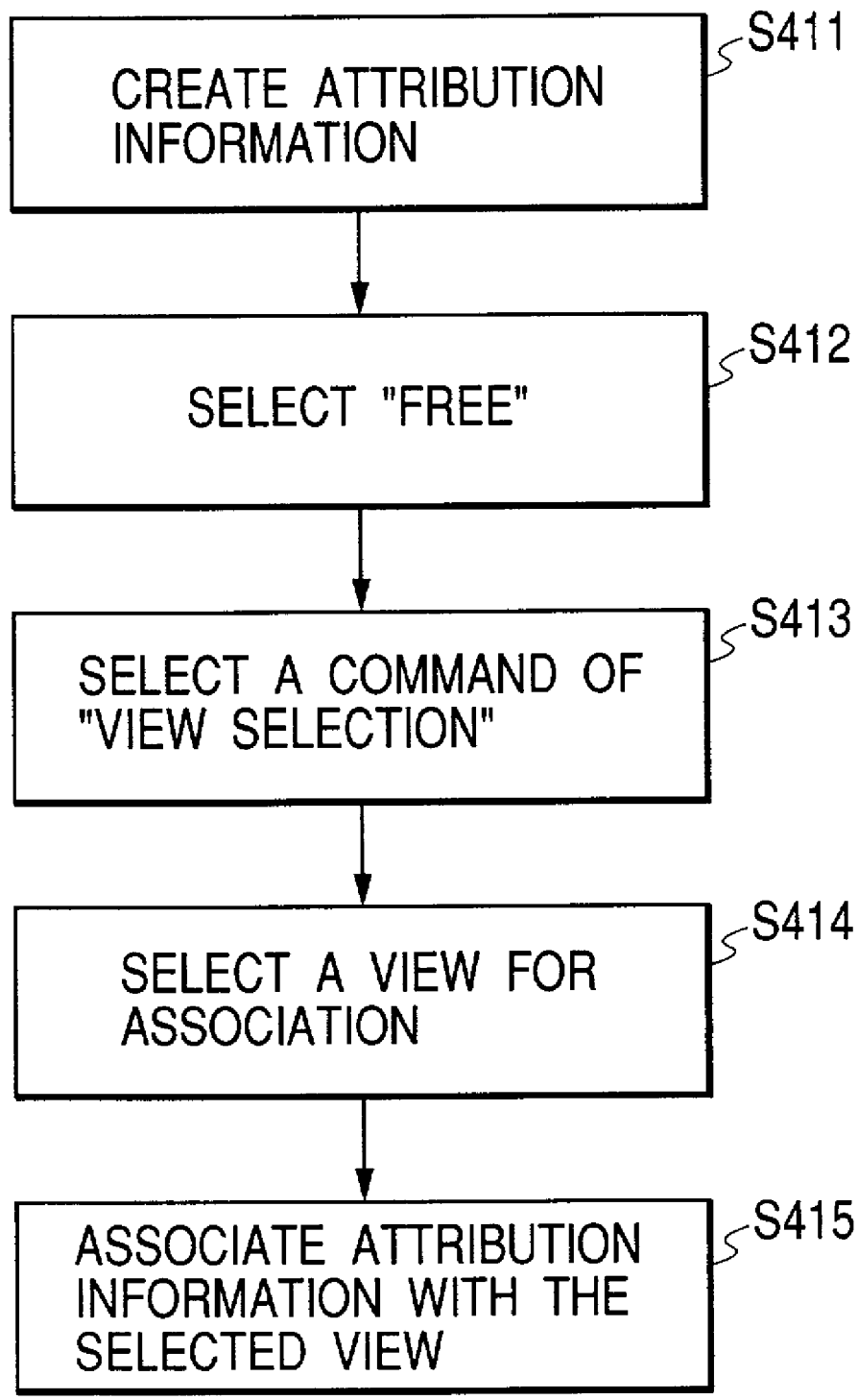
FIG. 38 is a flowchart showing the processing for, when attribution information is generated, automatically correlating attribution information with the view that is generated.
Figure 39:
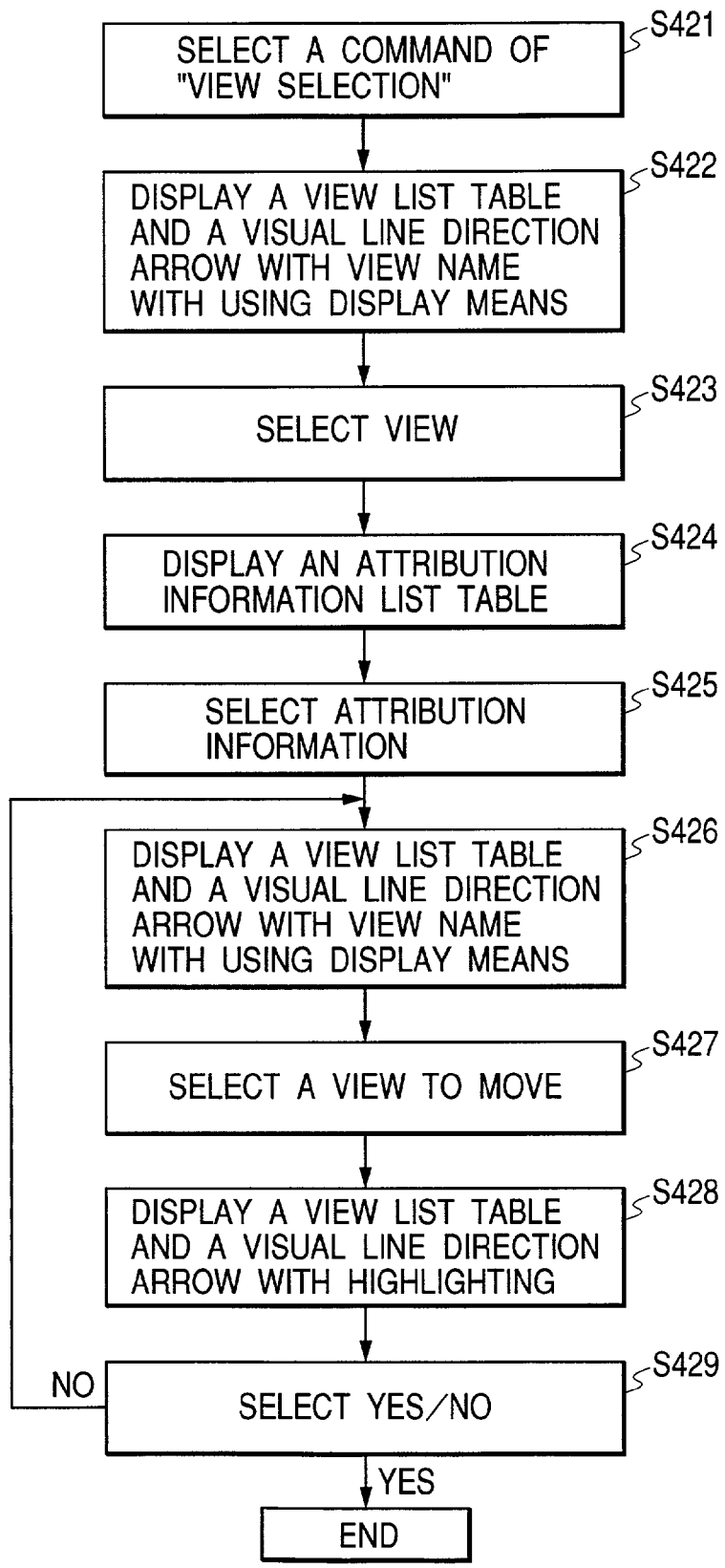
FIG. 39 is a flowchart showing the processing for changing one view to another view for the correlation of attribution information.
Figure 40:
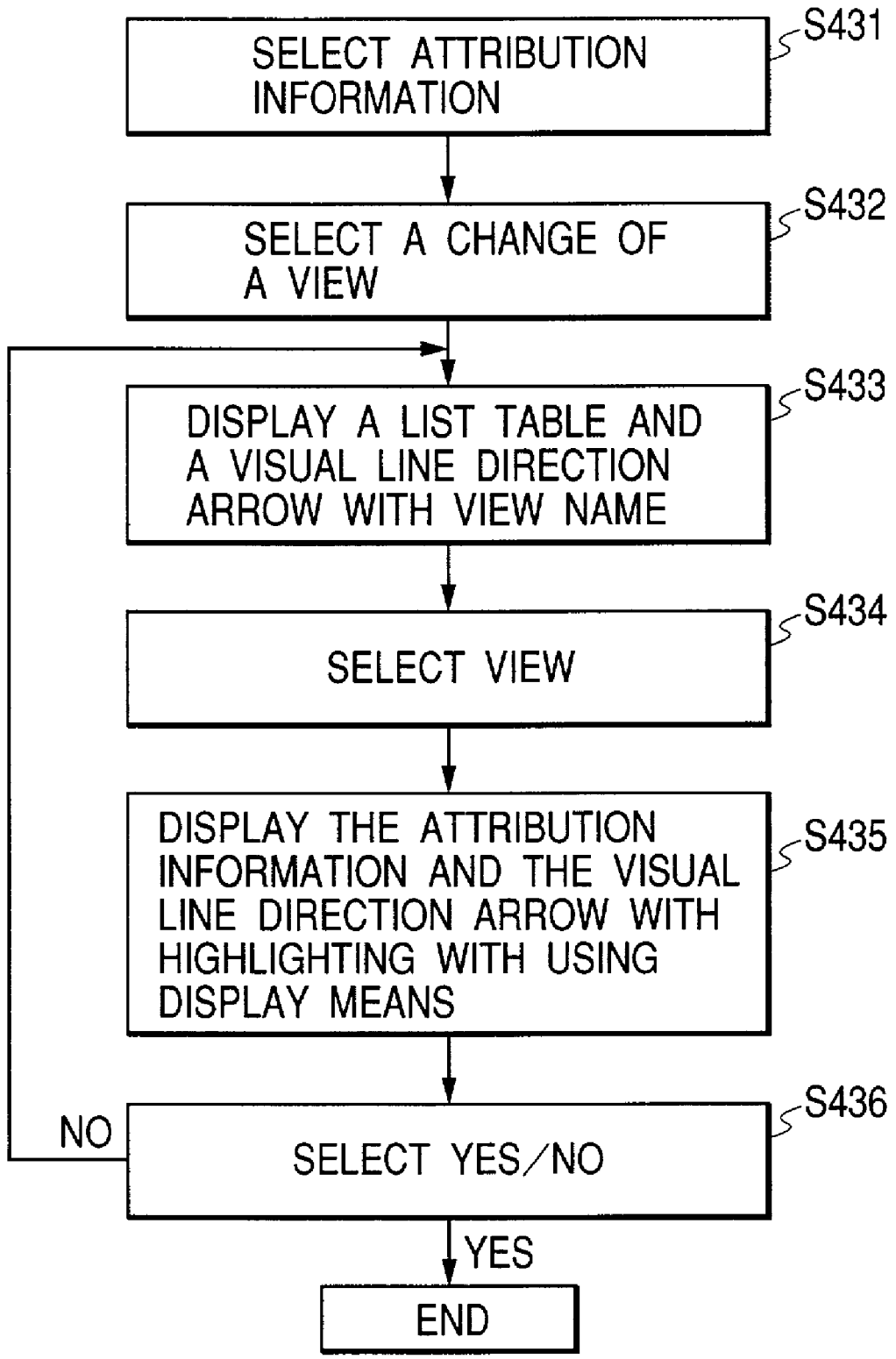
FIG. 40 is a flowchart showing the processing for employing another method to change one view into another view for correlation with attribution information.

FIG. 38 is a flowchart showing the processing for generating attribution information, for maintaining the free state of the attribution information instead of correlating it with a view, and for, at any time later, correlating the attribution information with a desired view. First, attribution information is created (step S411), and in the process for determining a view with which the attribution information is to be correlated, the free state is selected (step S412). When another operation has been performed and a specific time has elapsed, a view selection command is selected in order to correlate the generated attribution information with a desired view (step S413). A list of views is displayed when an attribution information correlation command is selected from among view selection commands included in an attribution information command, and a desired view with which attribution information is to be correlated is selected (step S414). The correlation of the attribution information and the view is stored in the storage means and is displayed (step S415).

In this case, the attribution information in the free state is always temporarily stored in correlation with the dedicated attribution allocation plane for the free attribution information. It should be noted that when the free attribution information has been correlated with the dedicated attribution allocation plane for the free attribution information a warning is displayed as needed to request correlation with a desired attribution allocation plane.

When a warning command is selected in advance, each time the storage of attribution information in the free state is instructed a function is executed for displaying a warning indicating that free attribution information is present. If the warning command is not selected, the warning is not displayed and the attribution information in the free state is permanently correlated with the dedicated attribution allocation plane for the free attribution information. So long as the attribution information is temporarily correlated with the dedicated attribution allocation plane for the free attribution information, even when the most suitable attribution allocation plane for the attribution information to be correlated with is not visually identified during the attribution information generation process, an attribution allocation plane that is visually most suitable can be selected after the entire arrangement (the positioning of the 3D model and the attribution allocation plane) is determined.

Figure 41A:
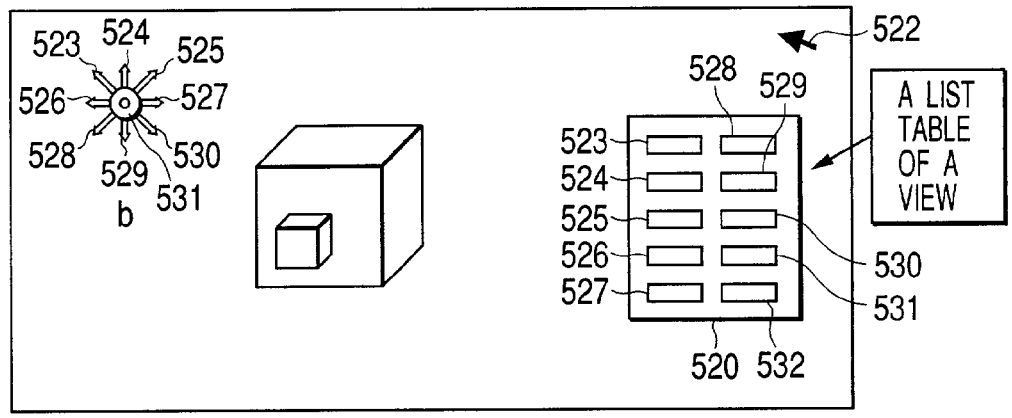
FIGS. 41A, 41B, 41C, 41D, 41E and 41F are diagrams showing the processing in FIG. 39.
Figure 41B:
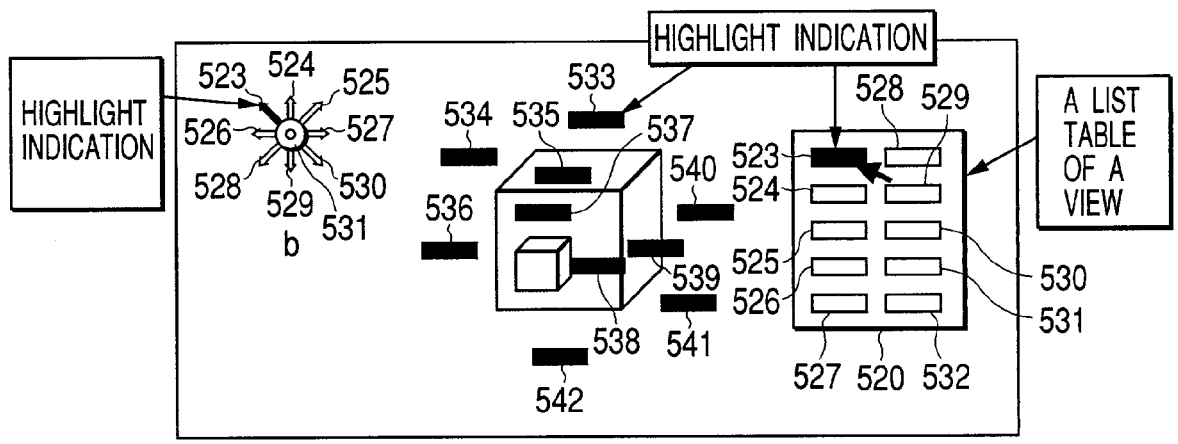
Figure 41C:
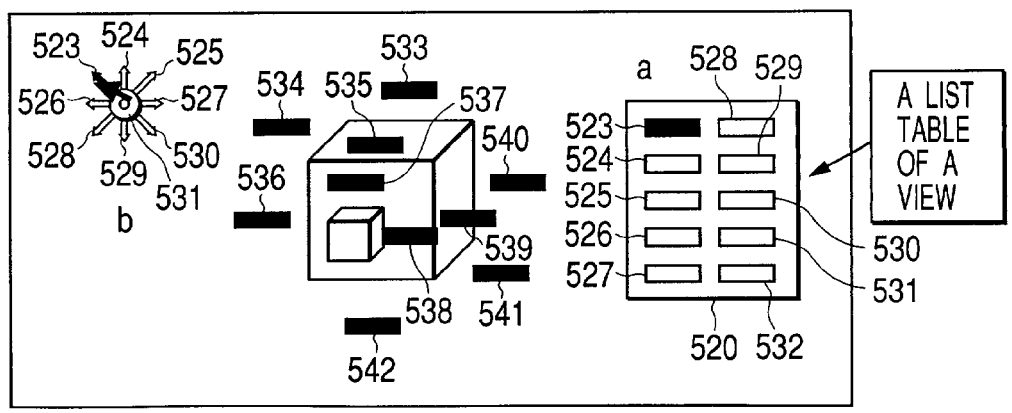
Figure 41D:
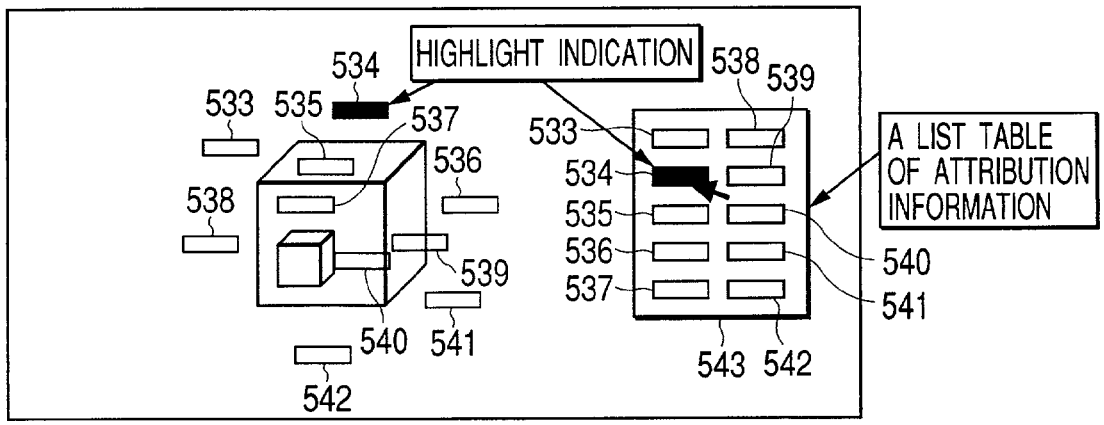
Figure 41E:
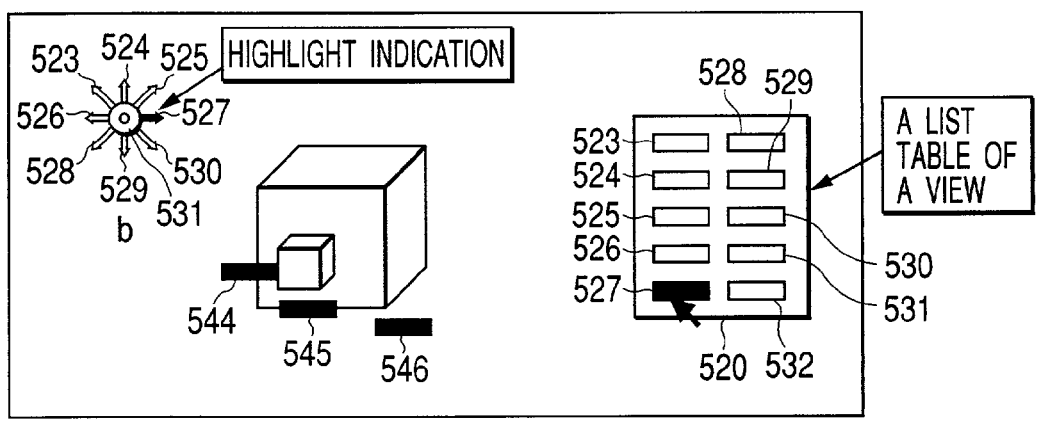
Figure 41F:
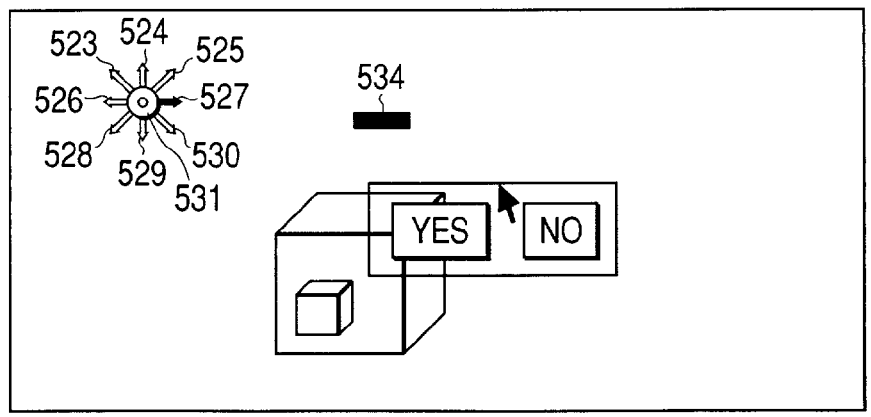
Figure 42A:
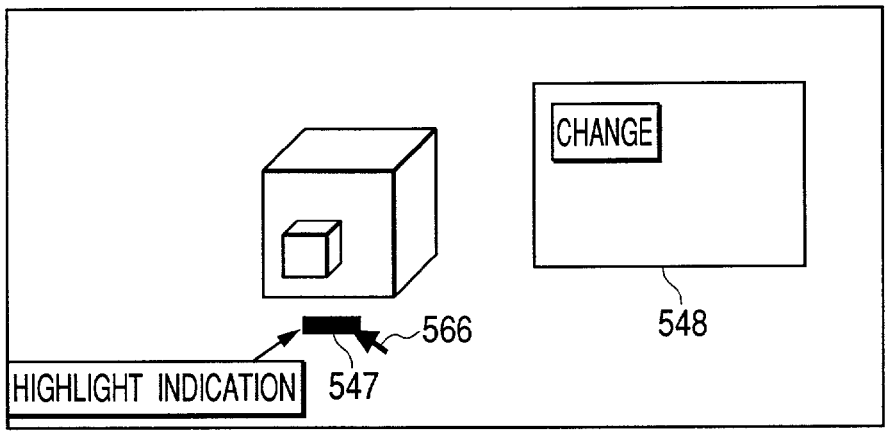
FIGS. 42A, 42B, 42C and 42D are diagrams showing the processing in FIG. 40.
Figure 42B:
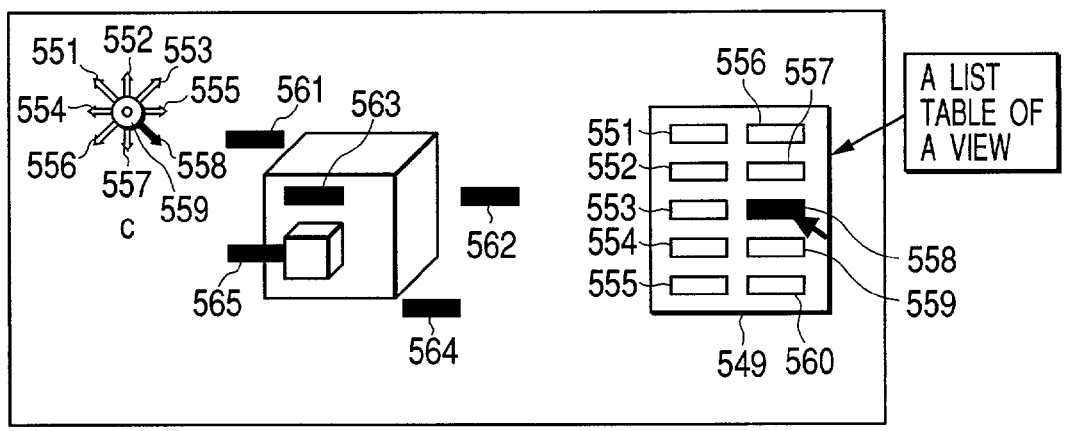
Figure 42C:
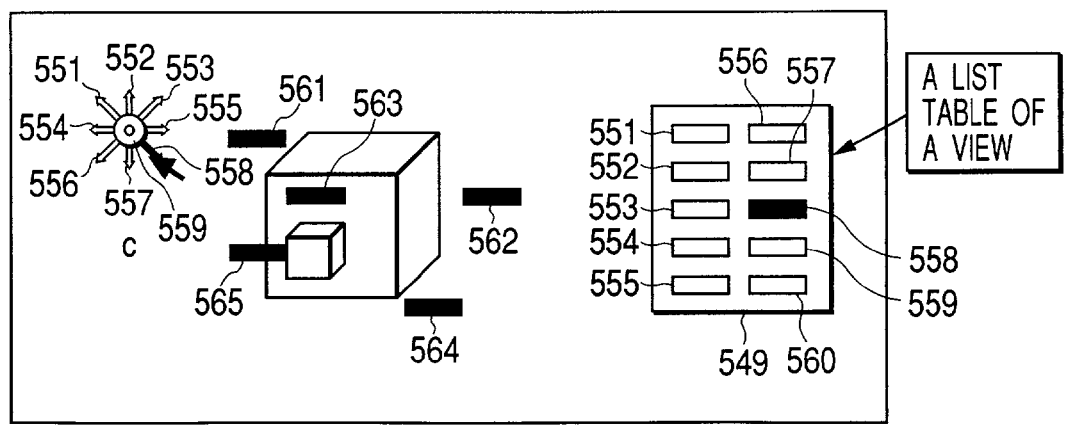
Figure 42D:
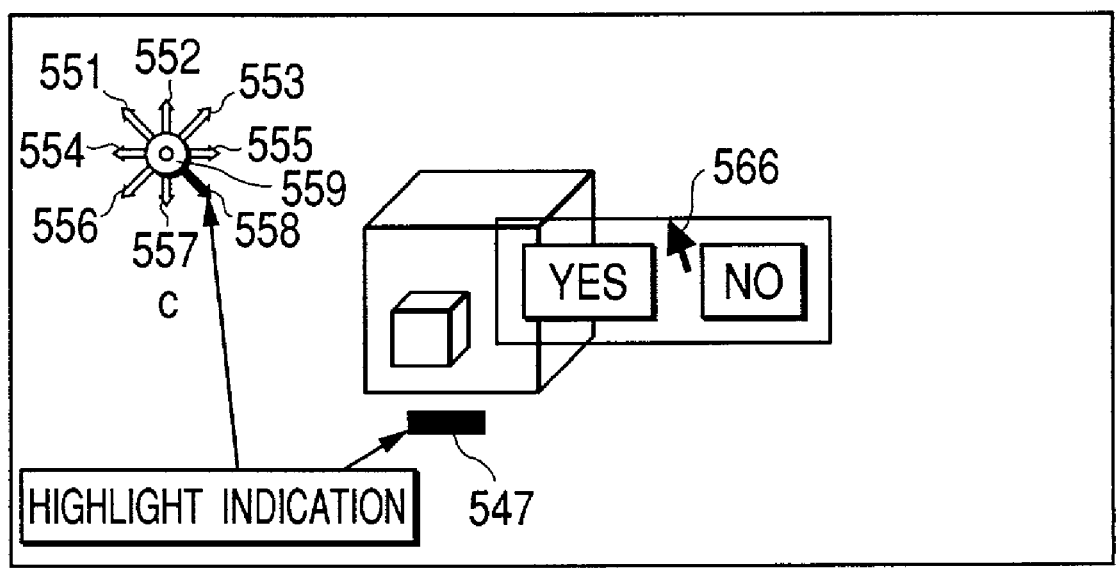

FIG. 39 and FIGS. 41A to 41F are respectively a flowchart and diagrams showing the processing for changing a view correlated with attribution information into another view. First, a view selection command included in an attribution information command is selected (step S421). A view list 520 and arrows b indicating the names of all the visual directions are displayed on the screen (FIG. 41A). At this time, when a pointer 522 is moved to one of view names 523 to 532 in the list 520 on the screen or to the arrow b indicating the visual direction of the view 523, the attribution information 533 to 542 correlated with the view 523 that is pointed to, and the arrow b corresponding to the view 523 are highlighted (step S422) (FIGS. 41B and 41C). Then, the view 523 is selected (step S423). At this time, the view 523 may be selected using the list 520, or it be selected using the arrow b (FIGS. 41B and 41C). When a list 543 of attribution information sets 533 to 542 correlated with the selected view 523 is displayed on the screen, and when the pointer 522 is moved to attribution information 534 on the list 543, the attribution information 534 is highlighted on the screen (step S424) (FIG. 41D). During the process for selecting the attribution information 534 for which a correlated view is to be changed, a plurality of attribution information sets may be selected (step S425). The view list 520 and the arrow b indicating the visual direction of a view are displayed on the screen (step S426). At this time, when the pointer 522 is moved to one of the view names 523 to 532 on the list 520 or an arrow b 527 indicating the visual direction, the attribution information sets 544 to 546 correlated with the view 527 are highlighted (FIG. 41E). When the pointer 522 is moved away from the view name or the arrow, the pertinent view name or arrow is not displayed. One view with which the attribution information 534 is to be correlated is selected from the list 520 or by using the arrow b indicating the visual direction with the view name (step 427). During this selection process, a plurality of views may be selected, and the attribution information may at one time be correlated with these views. The arrow b 527, which indicates the visual direction of the newly correlated view, and the attribution information 534, for which the correlated view is changed, are highlighted (step S428). When a plurality of attribution views are used for correlation, all the arrows in the visual directions of the correlated views are displayed. Then, in the Yes/No selection, Yes is selected and established (step S429) (FIGS. 41A to 41F).

The means indicating the visual direction of the view is not limited to the arrows shown in FIGS. 41A to 41F and FIGS. 42A to 42D. So long as the visual direction of the view is displayed so it is easily understood, a leader line may be extended to near the model to represent the visual direction of the view near the model, or another means may be employed.

FIG. 40 and FIGS. 42A to 42D are respectively a flowchart and diagrams showing the processing, for another method for changing a correlated view, for correlating attribution information in the free state with a desired view. The attribution information 547 for which a view correlated on the screen is to be changed, or the attribution information 547 in the free state is selected (step S431) (FIG. 41A). When the change of a view is selected from a menu 548 (step S432), a view list 549 and arrows c indicating the visual directions of all the views are displayed. At this time, when a pointer 566 is moved to one view 558 on the list 549, or to the arrow c indicating a visual direction 558, all the attribution information sets 561 to 565 correlated with the view 558 are highlighted (step S433) (FIGS. 41B and 41C). One view 558 is selected from the list 549 or by designating one arrow c (step S434) (FIGS. 41B and 41C). In this selection process, a plurality of views 551 to 560 may be selected and the attribution information 547 can at one time be correlated with these views. Further, the arrow c indicating the visual direction of the view 558 that is newly correlated, and the attribution information 547 for which the view has been changed are highlighted (step S435). When a plurality of views to be correlated are employed, arrows indicating all the correlated views are highlighted. Then, in the Yes/No selection, Yes is selected and established (step S436) (FIG. 41D).

In this case, the attribution information in the free state is always temporarily stored in correlation with a dedicated view for free attribution information. It should be noted that when the free attribution information has been correlated with the dedicated view for the free attribution information a warning is displayed as needed to request correlation with a desired view.

When a warning command is selected in advance, each time the storage of attribution information in the free state is instructed, a function for displaying a warning indicating that free attribution information is present is executed. If the warning command is not selected, the warning is not displayed and the attribution information in the free state is permanently correlated with the dedicated view for the free attribution information. So long as the attribution information is temporarily correlated with the dedicated view for the free attribution information, even when the most suitable view for attribution information to be correlated with is not visually identified during the attribution information generation process, a view visually most suitable can be selected after the entire arrangement (the positioning of the 3D model and the view) has been determined.

Figure 43:
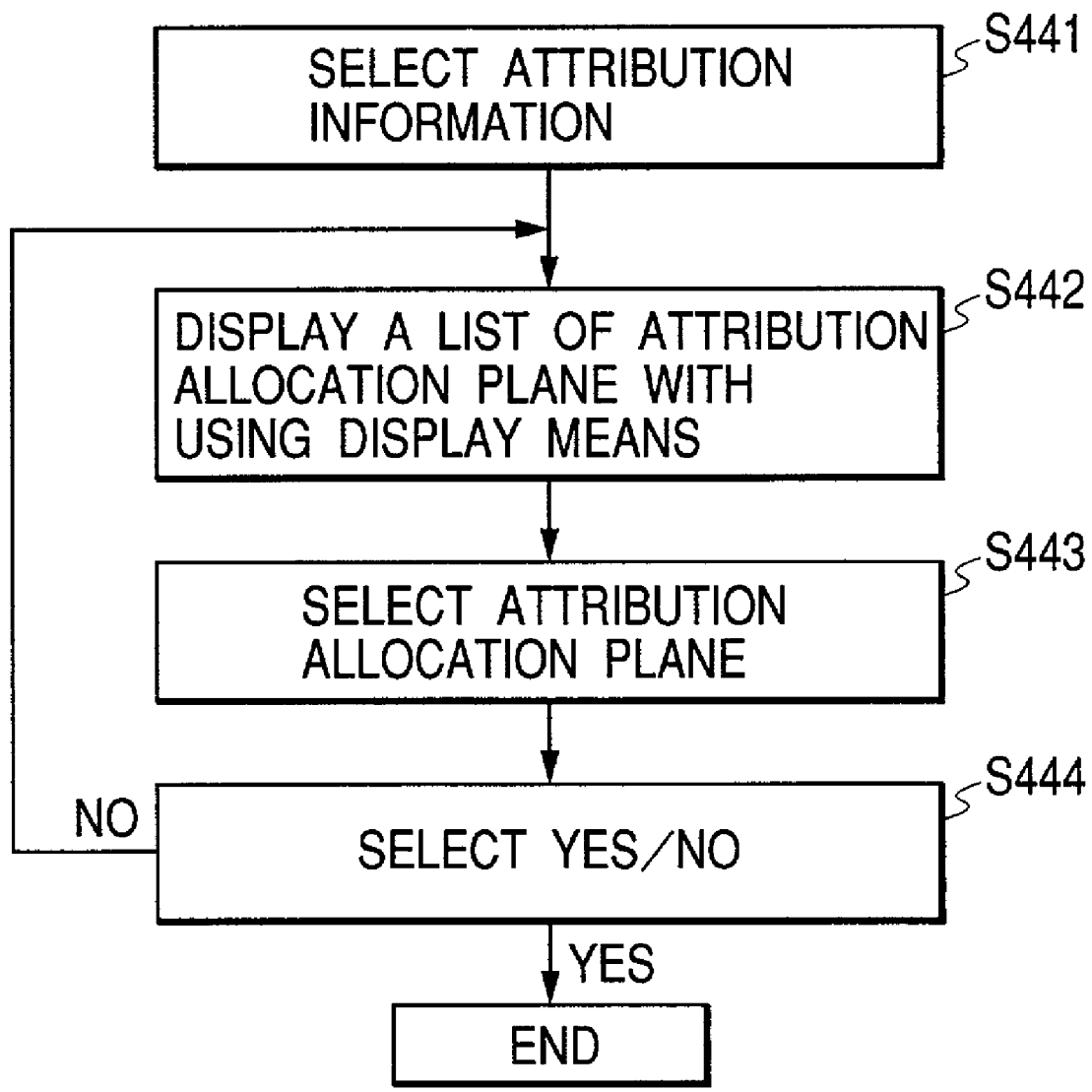
FIG. 43 is a flowchart showing the processing for correlating attribution information with a plurality of attribution allocation planes and for correlating attribution information in the free state with one of the attribution allocation planes.

FIG. 43 is a flowchart showing the processing performed when attribution information correlated with a specific attribution allocation plane is to be correlated with other multiple attribution allocation planes, and when attribution information in the free state is to be correlated with a desired attribution allocation plane. First, attribution information is selected (step S441), a list of attribution allocation planes is displayed (step S442), and an attribution allocation plane is selected from the list (step S443). At this time, when a pointer is moved to one of the attribution allocation planes on the list, so long as the allocation attribution plane is set in the display state, the designated attribution allocation plane and all the attribution information correlated therewith are highlighted.

When the pointer is removed, the highlight indication is canceled. When the attribution allocation plane is set in a non-displayed state, and when the pointer is moved to one of the attribution allocation planes on the list, the designated attribution allocation plane and the attribution information correlated therewith are highlighted. When the pointer is removed, the attribution allocation information and the attribution information are not displayed. During this selection process a plurality of attribution allocation planes may be selected, and attribution information may at one time be correlated with these attribution allocation planes. Finally, while all the selected attribution allocation planes and the correlated attribution information have been highlighted, Yes is selected, and the correlation process is terminated (step S444).

Figure 46:
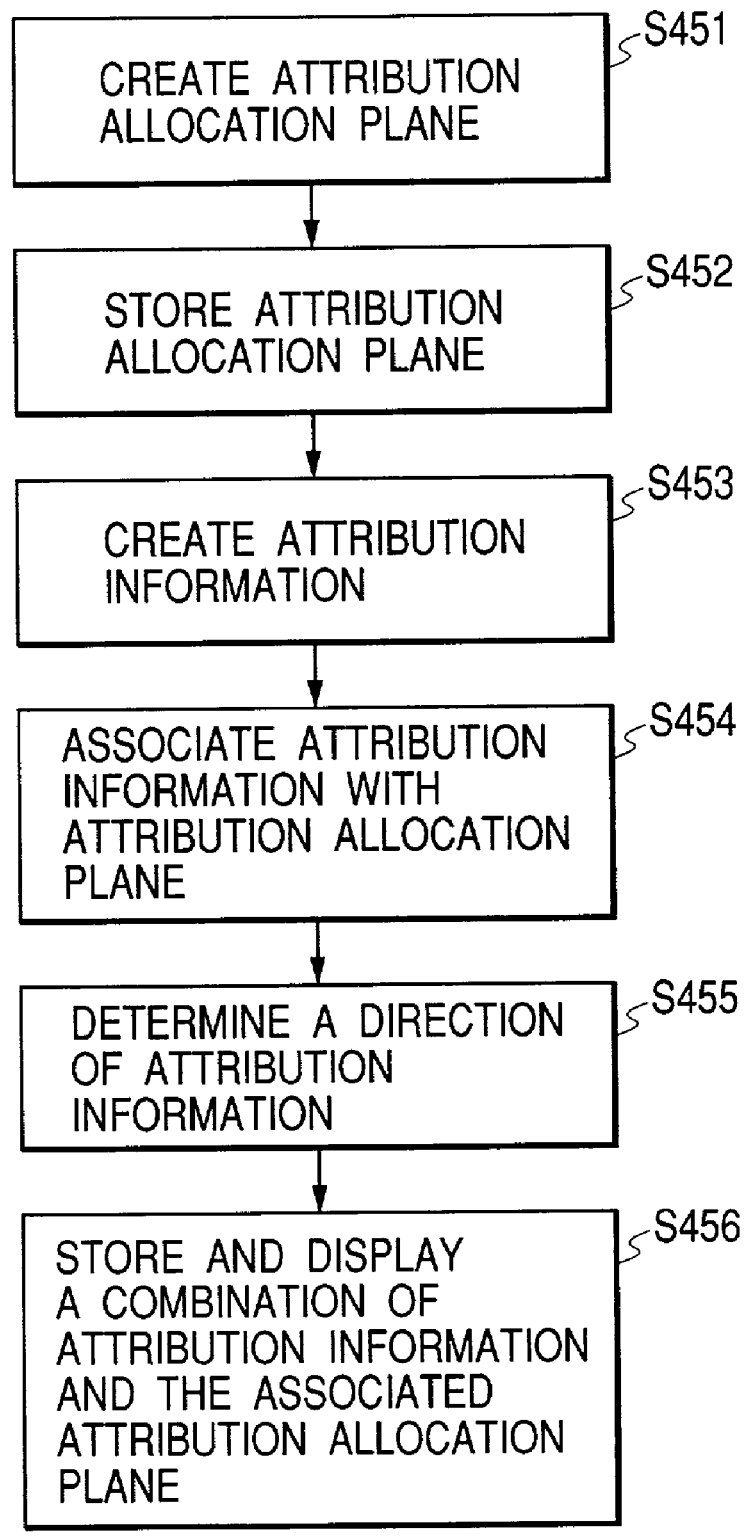
FIG. 46 is a flowchart showing the processing for generating attribution information and for correlation of the attribution information with an attribution allocation plane.

FIG. 46 is a flowchart showing the processing for generating attribution information and for correlating it with the attribution allocation plane. First, the attribution allocation plane is created (step S451), and the normal direction of the attribution allocation plane and its position are stored in the storage means (step S452). Then, the attribution information is prepared (step S453) and is correlated with the attribution allocation plane (step S454). The direction of the attribution information is determined to be on the correlated attribution allocation plane (step S455). The attribution information and the correlation attribution allocation plane, and the direction of the attribution information are stored in the storage means and are displayed (step S456).

Once the attribution allocation plane to be correlated is set, all the attribution information that is prepared can be correlated with the attribution allocation plane until the setting is changed.

Figure 47:
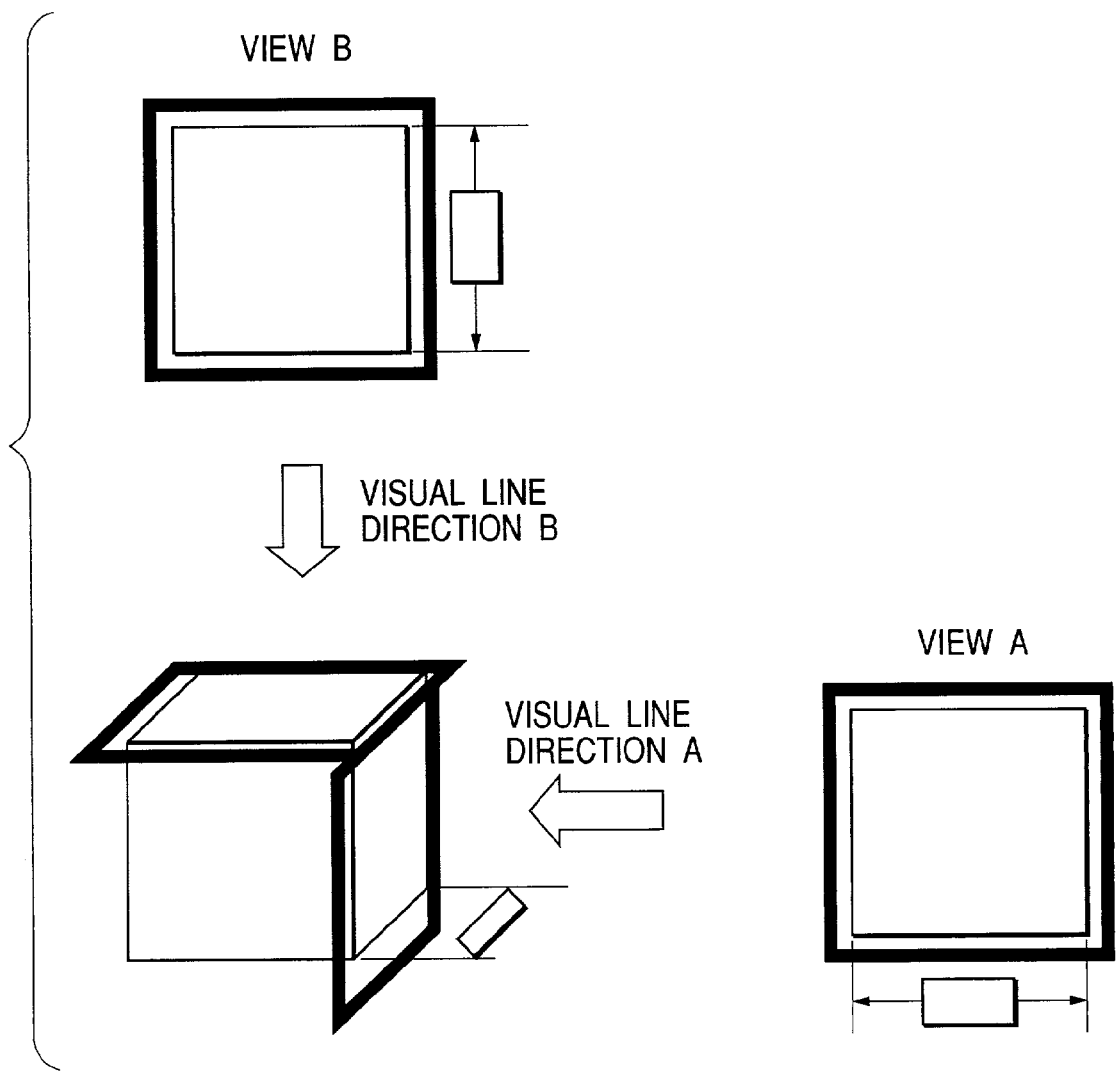
FIG. 47 is a diagram showing the state wherein attribution information is correlated with a plurality of attribution allocation planes.

The attribution information may not always be correlated with only one attribution allocation plane, but may also be correlated with a plurality of attribution allocation planes, and the attribution information and these planes can be stored and displayed (FIG. 47).

Figure 48:
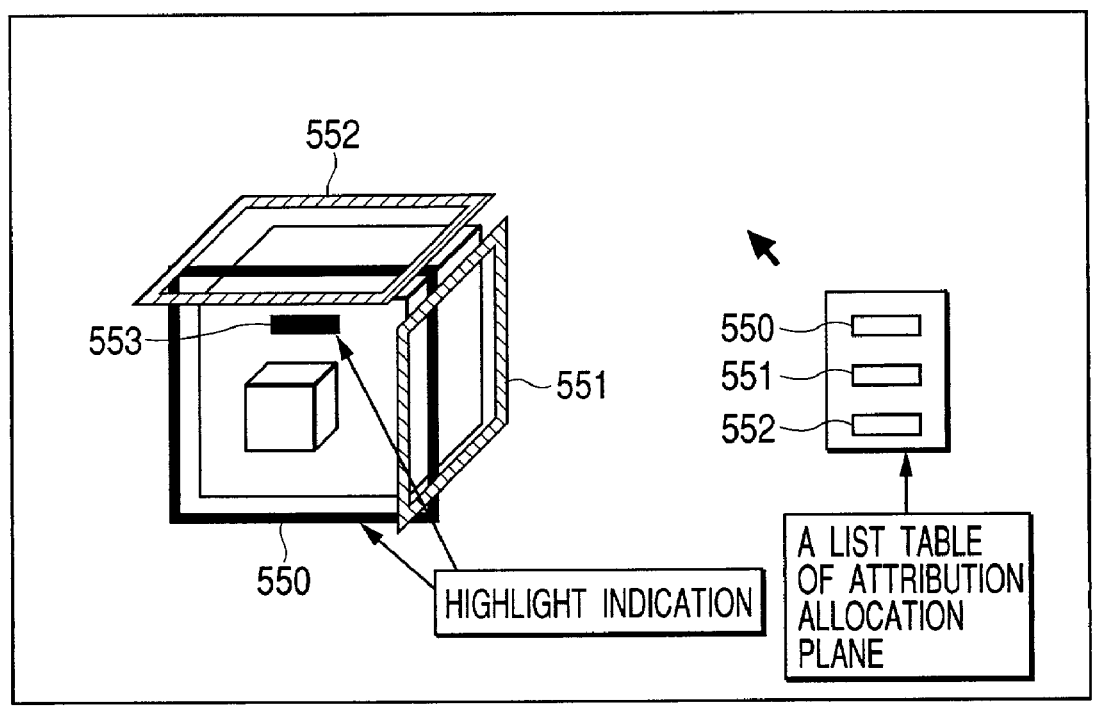
FIG. 48 is a diagram showing the state wherein attribution information can also be correlated with an attribution allocation plane in the non-active state.

Furthermore, the attribution information can be correlated not only with an attribution allocation plane that is currently displayed, but also with a desired attribution allocation plane. For example, in FIG. 48, an attribution allocation plane 550 is currently displayed; however, regardless of the plane on the screen, attribution information 553 can be correlated with desired attribution allocation planes 550 to 552.

Figure 49:
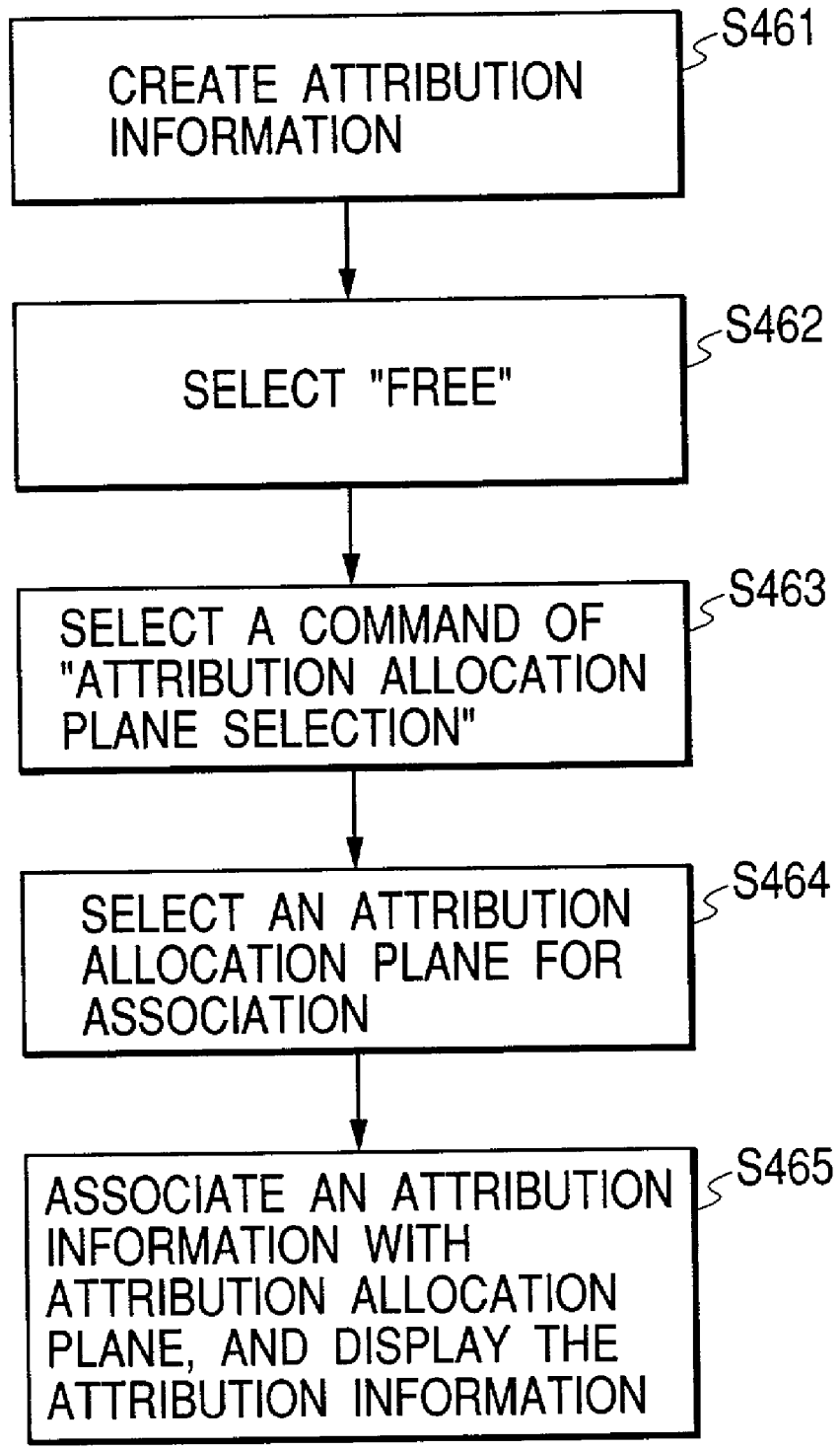
FIG. 49 is a flowchart showing the processing for correlating generated attribution information with a desired attribution allocation plane at any time.
Figure 50:
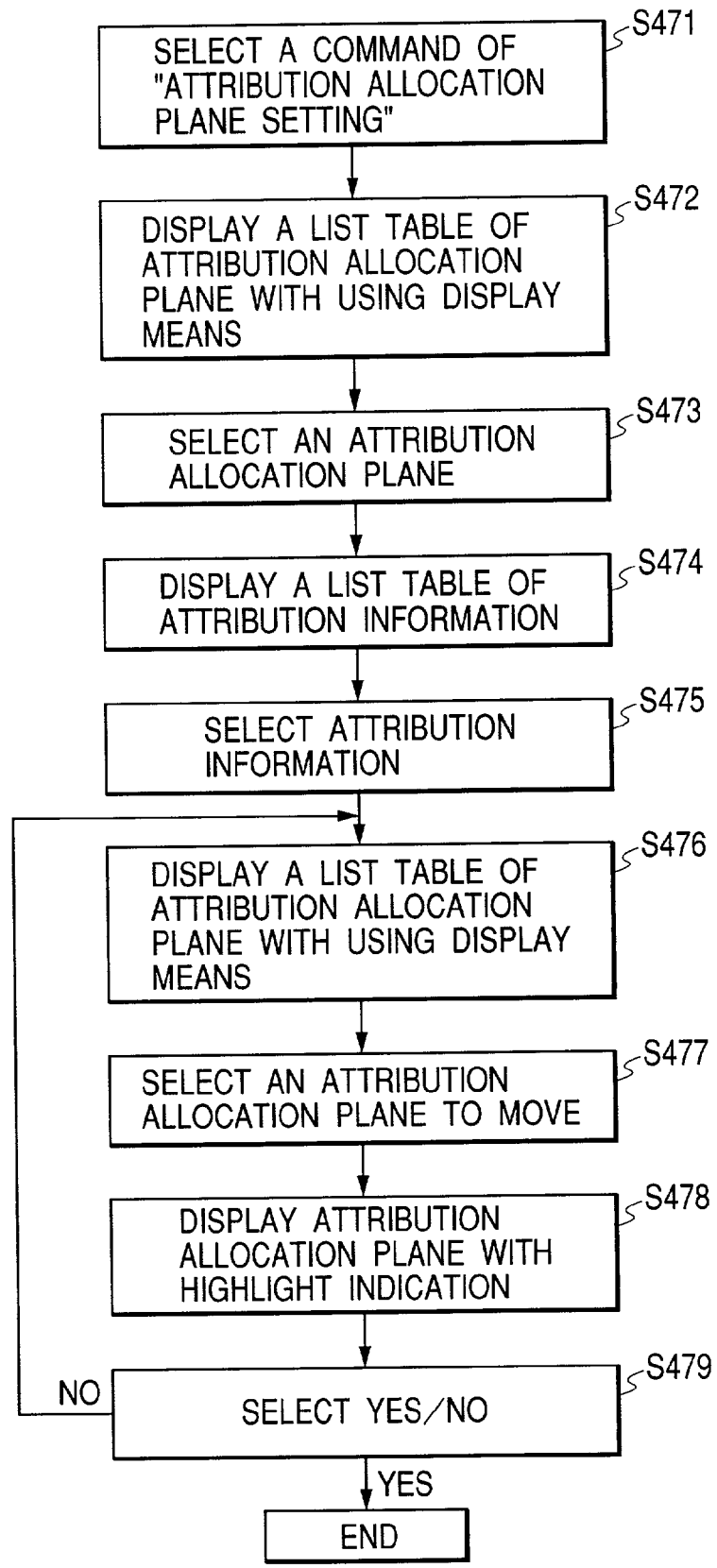
FIG. 50 is a flowchart showing the processing for changing or adding an attribution allocation plane with which attribution information is correlated.

FIG. 49 is a flowchart showing the processing for generating attribution information, for maintaining the free state of the attribution information instead of immediately correlating it with an attribution allocation plane, and for, at any time later, correlating the attribution information with a desired view. First, attribution information is created (step S461), and in the process for determining an attribution allocation plane with which the attribution information is to be correlated, the free state is selected (step S462). When another operation has been performed and a specific time has elapsed, a view selection command is selected in order to correlate the above generated attribution information with a desired attribution allocation plane (step S463). A list of attribution allocation planes is displayed when an attribution information correlation command and a desired attribution allocation plane with which attribution information is to be correlated are selected (step S464). At this time, a plurality of attribution allocation planes may be selected. The correlation of the attribution information and the attribution allocation plane is stored in the storage means and is displayed (step S465).

Figure 51A:
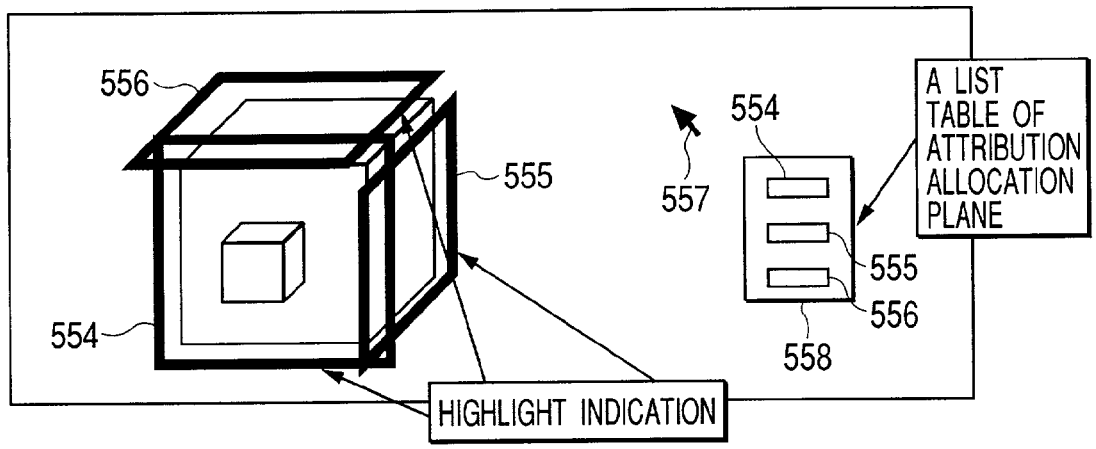
FIGS. 51A, 51B, 51C, 51D and 51E are diagrams showing the processing for changing or adding an attribution allocation plane for which attribution information is correlated.
Figure 51B:
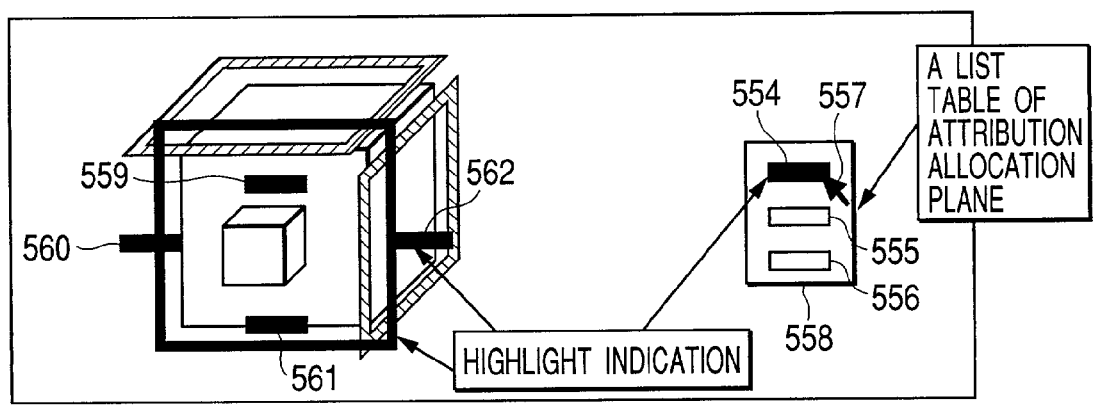
Figure 51C:
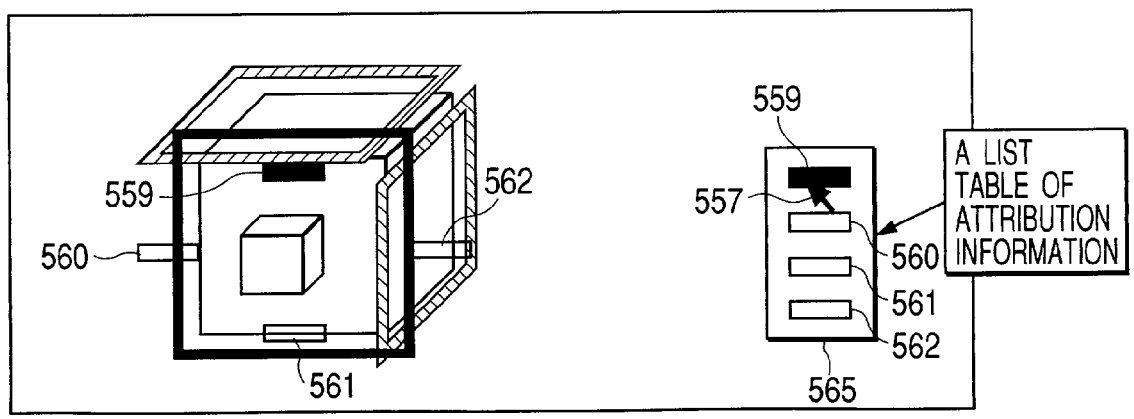
Figure 51D:
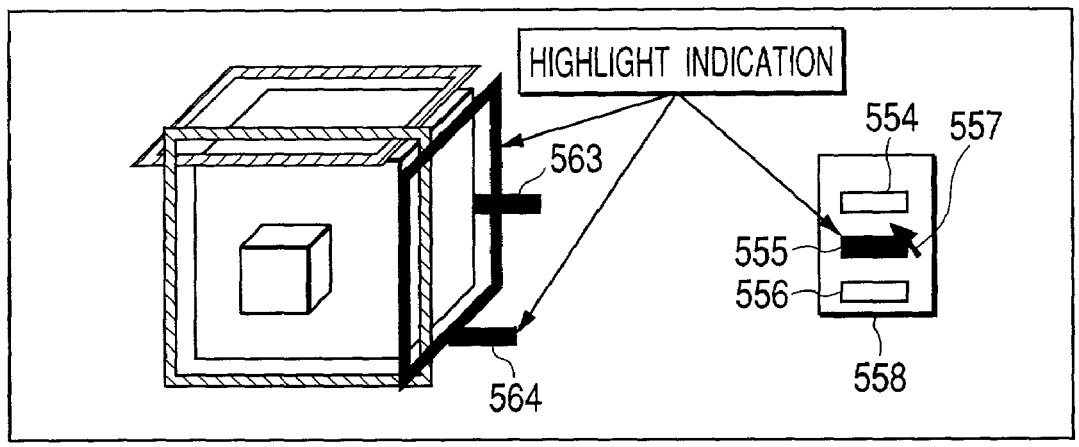
Figure 51E:
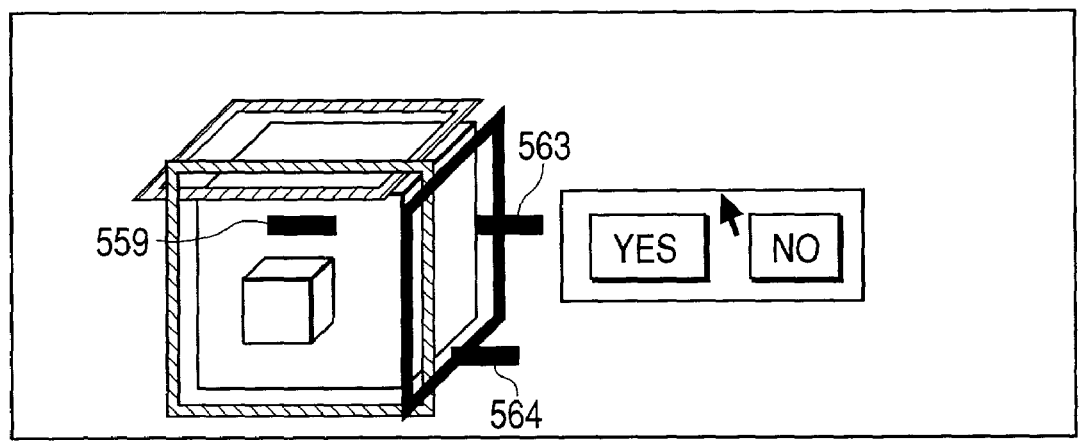

FIG. 50 and FIGS. 51A to 51E are respectively a flowchart and diagrams showing the processing for changing an attribution allocation plane correlated with attribution information to another attribution allocation plane. First, an attribution allocation selection command included in an attribution information command is selected (step S471). A view list 558 of attribution allocation planes and all the generated attribution allocation planes 554 to 556 are highlighted on the screen (FIG. 51A). At this time, when a pointer 557 is moved to the attribution allocation plane 554 on the list 558 on the screen, the attribution allocation plane 554 and the attribution information 559 to 562 correlated therewith are highlighted (step S472) (FIG. 51B). Then, the attribution allocation plane 554 is selected (step S473). When the pointer 557 is moved to the attribution information 559 on the list 565, only the attribution information 559 is highlighted on the screen (step S474) (FIG. 51C). Further, the selected attribution allocation plane 554 is maintained in the highlighted state. The attribution information 559 is selected for which the correlated attribution allocation plane is to be changed (step S475), and the list 558 of the attribution allocation planes is displayed on the screen (step S476). Also at this time, when the pointer 557 is moved to the attribution allocation plane 555 on the list 558, the attribution allocation plane 555 and the attribution information sets 563 and 564 correlated therewith are highlighted on the screen. When the pointer 557 is moved away, the image is set in the non-displayed state (FIG. 51D). The attribution allocation plane 555 with which the attribution information is to be correlated is then selected from the list 558 (step S477). At this time, a plurality of attribution allocation planes 554 to 556 may be selected. Then, the attribution information 559 for which the correlated attribution allocation plane is changed is highlighted (step S478). Then, in the Yes/No selection, Yes is selected and established (step S479) (FIG. 51E).

FIG. 52 is a diagram showing a menu to be displayed when automation is selected. For the automation of the correlation of attribution information, the column "the view on current display" is included in the columns provided for the selection of a view to be correlated. Once that column is selected and the direction of the view displayed on the screen is changed, a new view is generated in the new direction on the screen and the attribution information that is thereafter generated, changed or added is correlated with the new view. Further, as a view is being generated, the number of views available for selection using the column is increased.

With this function, since correlation with the view is not required each time attribution information is generated, the period required for the creation of a drawing can be reduced.

FIG. 53 is a diagram showing a menu to be displayed when automation is selected. For the automation of the correlation of attribution information, the column "the attribution allocation plane on current activation" is included in the columns provided for the selection of attribution allocation plane to be correlated. Once that column is selected, regardless of the screen display, the attribution information that is thereafter generated, changed or added is correlated with the attribution allocation plane that is active when the attribution information is generated. Further, as a view is being generated, the number of views available for selection using the column is increased.

With this function, since correlation with the attribution allocation plane is not required each time attribution information is generated, the period required for the creation of a drawing can be reduced.

An explanation will now be given for another embodiment for the correlation of attribution information in the free state.

When attribution information in the free state is present, by merely monitoring all the attribution allocation planes or views, this information is possibly missed. Therefore, free attribution information must be searched for, and this greatly deteriorates the efficiency attained for each job. To avoid this problem, it is preferable that, as in the invention, all the attribution information be correlated with a desired attribution allocation plane or view. The correlation process is not limited to the method described in the embodiment, and the following method may also be employed.

This method prevents the production of drawings while there is any free attribution information remaining. During the processing, when attribution information is generated, an allocation attribution plane to be used for correlation is immediately selected. With this arrangement, if the attribution allocation plane to be correlated with the attribution information is not determined, the generation of attribution information can not be continued.

An explanation will now be given for the embodiment for the correlation of free attribution information.

In this embodiment, it is assumed that a dedicated attribution allocation plane for free attribution information is not present.

That is, in this embodiment, the temporary presence of attribution information in the free state is permitted.

If a correlated attribution allocation plane is not selected while attribution information is being generated, a warning is issued, and the generated attribution information is stored as free information that is not correlated with any attribution allocation plane. Unlike the previous embodiment, the free attribution information is not stored in correlation with a dedicated attribution allocation plane for the free attribution information, but instead is stored as separate attribution information.

However, while the free attribution information can be stored during the generation process, a warning is issued each time. And even when a user ascertains that the preparation of drawings has been completed and prepares to store them, the drawings can not be stored as a complete set because the system includes means for finding free attribution information that has not been correlated with an attribution allocation plane and for designating such drawings as incomplete. Further, the system includes means for refusing to progress to the next step (processing and confirming the drawings). Therefore, in order to complete the drawings, all the free attribution information must be correlated with the attribution allocation plane correlated with the model.

The above described arrangement can be also employed for the view.

As is described above, when the attribution information is entered or is read, the view or the attribution allocation plane is positioned on the screen as needed, and the 3D model and the attribution allocation information are arranged and displayed on the screen. That information can be transmitted efficiently to be easily understood.

(Another Embodiment)

The scope of the present invention also includes a configuration wherein, to achieve the functions of the embodiment, software program code that implements the functions of the embodiment is supplied to an apparatus or a system computer that is connected to various devices, and the devices are operated in accordance with a program stored in the computer (a CPU or an MPU) of the system or the apparatus.

In this case, invention functions are provided by the software program code, and the program code also constitutes the present invention. The storage medium for supplying the program code can be a communication medium for a computer network (LAN or the Internet) system that acts as a carrier for the transmission of program information.

Further, means for supplying the program code to a computer, e.g., a storage medium on which the program code is stored (a floppy disk, a CD-ROM, a magnetic tape, a nonvolatile memory card, a ROM, a hard disk, an optical disk, a magneto-optical disk, etc.), constitutes the present invention.

In addition, with the present invention it is not only possible for the functions of the previous embodiment to be provided through the execution of program code by a computer, but also, the program code can interact with an OS (Operating System) or with another software application running on the computer to provide the functions described in the above embodiment.

As many apparently widely different embodiments for the present invention can be devised without departing from the spirit and scope thereof, it is to be understood that the invention is not limited to the specific embodiments presented herein except as defined in the appended claims.

What is claimed is:

1. An information processing apparatus comprising:
    display control means for controlling a display of a 3D model and a plurality of virtual planes in the same 3D space, wherein the 3D model is projected on each of the virtual planes;
    virtual plane selecting means for selecting a virtual plane of the plurality of virtual planes, and
    allocating means for allocating attribution information including at least one of dimensions and dimensional tolerance of the 3D model on the selected virtual plane in response to an input of the attribution information,
    wherein the display control means controls a display of the attribution information allocated on the selected plane in the 3D space.

2. The apparatus according to claim 1, wherein the display control means controls a display to position the allocated attribution information corresponding to a selection of a virtual plane, normally on a screen.

3. An information processing method comprising:
    a display control step of controlling a display of a 3D model and a plurality of virtual planes in the same 3D space, wherein the 3D model is projected on each of the virtual planes;
    a virtual plane selecting step of selecting a virtual plane of the plurality of virtual planes; and
    an allocating step of allocating attribution information including at least one of dimensions and dimensional tolerance of the 3D model on the selected virtual plane in response to an input of the attribution information; and
    an attribution information display control step of controlling a display of the attribution information allocated on the selected plane in the 3D space.

4. The method according to claim 3, further comprising positioning step of positioning the allocated attribution information corresponding to a selection of a virtual plane, normally on a screen.

5. A computer executable program product stored in a computer readable memory comprising:
- code for controlling a display of a 3D model and a plurality of virtual planes in the same 3D space, wherein the 3D model is projected on each of the virtual planes;
- code for selecting a virtual plane of the plurality of virtual planes;
- code for allocating attribution information including at least one of dimensions and dimensional tolerance of the 3D model on the selected virtual plane in response to an input of the attribution information; and
- code for controlling a display of the attribution information allocated on the selected plane in the 3D space.

6. The computer executable program product according to claim 5, further comprising
- positioning step of positioning the allocated attribution information corresponding to a selection of a virtual plane, normally on a screen.

* * * * *